US007138173B2

(12) United States Patent
Wheatley et al.

(10) Patent No.: US 7,138,173 B2
(45) Date of Patent: Nov. 21, 2006

(54) RED-GREEN-BLUE POLYMERIC INTERFERENCE FILM

(75) Inventors: John A. Wheatley, Lake Elmo, MN (US); Andrew J. Ouderkirk, Woodbury, MN (US); Timothy J. Nevitt, Red Wing, MN (US); Michael F. Weber, Shoreview, MN (US)

(73) Assignee: 3MInnovative Properties Company, St. Paul, MN (US)

( * ) Notice: Subject to any disclaimer, the term of this patent is extended or adjusted under 35 U.S.C. 154(b) by 0 days.

(21) Appl. No.: 10/952,335

(22) Filed: Sep. 27, 2004

(65) Prior Publication Data

US 2005/0079333 A1 Apr. 14, 2005

Related U.S. Application Data

(63) Continuation of application No. 10/188,175, filed on Jul. 1, 2002, now Pat. No. 6,797,366, which is a continuation of application No. 09/006,591, filed on Jan. 13, 1998, now Pat. No. 6,531,230.

(51) Int. Cl.
*B32B 7/02* (2006.01)
(52) U.S. Cl. .................. 428/212; 428/343; 428/354
(58) Field of Classification Search ................ 428/212, 428/213, 343, 354, 355 R
See application file for complete search history.

(56) References Cited

U.S. PATENT DOCUMENTS

| 540,768 A | 6/1895 | Western |
|---|---|---|
| 2,803,552 A | 8/1957 | Stedman |
| 3,022,178 A | 2/1962 | Park et al. |
| 3,051,452 A | 8/1962 | Nobel |
| 3,075,228 A | 1/1963 | Elias |
| 3,124,639 A | 3/1964 | Kahn |
| 3,182,965 A | 5/1965 | Sluijters |
| 3,195,865 A | 7/1965 | Harder |
| 3,212,909 A | 10/1965 | Leigh |
| 3,565,985 A | 2/1971 | Schrenk et al. |
| 3,576,707 A | 4/1971 | Schrenk et al. |
| 3,610,729 A | 10/1971 | Rogers |
| 3,687,589 A | 8/1972 | Schrenk |
| 3,711,176 A | 1/1973 | Alfrey, Jr. et al. |
| 3,737,882 A | 6/1973 | Furuoya |
| 3,759,647 A | 9/1973 | Schrenk et al. |
| 3,801,429 A | 4/1974 | Schrenk et al. |
| 3,819,522 A | 6/1974 | Zmoda et al. |
| 3,860,036 A | 1/1975 | Newman, Jr. |
| 3,884,606 A | 5/1975 | Schrenk |
| 3,897,356 A | 7/1975 | Pociluyko |
| 4,249,011 A | 2/1981 | Wendling |
| 4,446,305 A | 5/1984 | Rogers et al. |
| 4,478,909 A | 10/1984 | Taniguchi et al. |
| 4,520,189 A | 5/1985 | Rogers et al. |
| 4,521,588 A | 6/1985 | Rogers et al. |
| 4,525,413 A | 6/1985 | Rogers et al. |
| 4,720,426 A | 1/1988 | Englert et al. |
| 4,735,869 A | 4/1988 | Morita |
| 4,937,134 A | 6/1990 | Schrenk et al. |
| 5,008,143 A | 4/1991 | Armanini |
| 5,084,351 A | 1/1992 | Philips et al. |
| 5,089,318 A | 2/1992 | Shetty et al. |
| 5,094,788 A | 3/1992 | Schrenk et al. |
| 5,094,793 A | 3/1992 | Schrenk et al. |
| 5,103,337 A | 4/1992 | Schrenk et al. |
| 5,122,905 A | 6/1992 | Wheatley et al. |
| 5,122,906 A | 6/1992 | Wheatley |
| 5,126,880 A | 6/1992 | Wheatley et al. |
| 5,154,765 A | 10/1992 | Armanini |
| 5,188,760 A | 2/1993 | Hikmet et al. |
| 5,211,878 A | 5/1993 | Reiffenrath et al. |
| 5,217,794 A | 6/1993 | Schrenk |
| 5,235,443 A | 8/1993 | Barnik et al. |
| 5,269,995 A | 12/1993 | Ramanathan et al. |
| 5,294,657 A | 3/1994 | Melendy et al. |
| RE34,605 E | 5/1994 | Schrenk et al. |
| 5,316,703 A | 5/1994 | Schrenk |
| 5,319,478 A | 6/1994 | Fijnfschilling et al. |
| 5,360,659 A | 11/1994 | Arends |
| 5,389,324 A | 2/1995 | Lewis et al. |
| 5,437,931 A | 8/1995 | Tsai et al. |
| 5,448,404 A | 9/1995 | Schrenk et al. |
| 5,451,449 A | 9/1995 | Shetty et al. |
| 5,486,935 A | 1/1996 | Kalmanash |
| 5,486,949 A | 1/1996 | Schrenk et al. |
| 5,540,978 A | 7/1996 | Schrenk |
| 5,568,316 A | 10/1996 | Schrenk et al. |
| 5,569,535 A | 10/1996 | Phillips et al. |
| 5,570,847 A | 11/1996 | Phillips et al. |
| 5,612,820 A | 3/1997 | Schrenk et al. |

(Continued)

FOREIGN PATENT DOCUMENTS

EP 0 404 463 12/1990

(Continued)

OTHER PUBLICATIONS

Songer, Larry, Multilayer Coatings Aid Display Design, Photonics Spectra, Nov. 1994, pp. 88-89.

(Continued)

*Primary Examiner*—Rena Dye
*Assistant Examiner*—Lawrence Ferguson
(74) *Attorney, Agent, or Firm*—Milena G. Higgins

(57) ABSTRACT

Multilayer polymeric films and other optical bodies are provided which is useful in making colored mirrors and polarizers. The films are characterized by a change in color as a function of viewing angle.

18 Claims, 28 Drawing Sheets

U.S. PATENT DOCUMENTS

| | | | |
|---|---|---|---|
| 5,628,950 | A | 5/1997 | Schrenk et al. |
| 5,629,055 | A | 5/1997 | Revol et al. |
| 5,644,432 | A | 7/1997 | Doany |
| 5,686,979 | A | 11/1997 | Weber et al. |
| 5,699,188 | A | 12/1997 | Gilbert et al. |
| 5,721,603 | A | 2/1998 | De Vaan et al. |
| 5,744,534 | A | 4/1998 | Ishiharada et al. |
| 5,751,388 | A | 5/1998 | Larson |
| 5,759,467 | A | 6/1998 | Carter et al. |
| 5,767,935 | A | 6/1998 | Ueda et al. |
| 5,770,306 | A | 6/1998 | Suzuki et al. |
| 5,783,120 | A | 7/1998 | Ouderkirk et al. |
| 5,783,283 | A | 7/1998 | Klein et al. |
| 5,793,456 | A | 8/1998 | Broer et al. |
| 5,808,794 | A | 9/1998 | Weber et al. |
| 5,808,798 | A | 9/1998 | Weber et al. |
| 5,825,542 | A | 10/1998 | Cobb, Jr. et al. |
| 5,825,543 | A | 10/1998 | Ouderkirk et al. |
| 5,867,316 | A | 2/1999 | Carlson et al. |
| 5,882,774 | A | 3/1999 | Jonza et al. |
| 5,940,149 | A | 8/1999 | Vanderwerf |
| 5,962,114 | A | 10/1999 | Jonza et al. |
| 5,965,247 | A | 10/1999 | Jonza et al. |
| 5,976,424 | A | 11/1999 | Weber et al. |
| 5,976,686 | A | 11/1999 | Kaytor et al. |
| 5,999,316 | A | 12/1999 | Allen et al. |
| 5,999,317 | A | 12/1999 | Whitney |
| 6,012,820 | A | 1/2000 | Weber et al. |
| 6,024,455 | A | 2/2000 | O'Neill et al. |
| 6,045,894 | A | 4/2000 | Jonza et al. |
| 6,053,795 | A | 4/2000 | Whitney et al. |
| 6,082,876 | A | 7/2000 | Hanson et al. |
| 6,088,067 | A | 7/2000 | Willet et al. |
| 6,111,697 | A | 8/2000 | Merrill et al. |
| 6,113,811 | A | 9/2000 | Kausch et al. |
| 6,120,026 | A | 9/2000 | Whitney et al. |
| 6,124,971 | A | 9/2000 | Ouderkirk et al. |
| 6,157,486 | A | 12/2000 | Benson, Jr. et al. |
| 6,157,490 | A | 12/2000 | Wheatley et al. |
| 6,179,948 | B1 | 1/2001 | Merrill et al. |
| 6,207,260 | B1 | 3/2001 | Wheatley et al. |
| 6,288,172 | B1 | 9/2001 | Goetz et al. |
| 6,297,906 | B1 | 10/2001 | Allen et al. |
| 6,368,699 | B1 | 4/2002 | Gilbert et al. |
| 6,455,140 | B1 | 9/2002 | Whitney et al. |
| 6,459,514 | B1 | 10/2002 | Gilbert et al. |
| 6,475,609 | B1 | 11/2002 | Whitney et al. |
| 6,506,480 | B1 | 1/2003 | Liu et al. |
| 6,531,230 | B1 | 3/2003 | Weber et al. |
| 6,534,158 | B1 | 3/2003 | Huang et al. |
| 6,565,982 | B1 | 5/2003 | Ouderkirk et al. |
| 6,569,515 | B1 | 5/2003 | Hebrink et al. |
| 6,590,705 | B1 | 7/2003 | Allen et al. |
| 6,831,720 | B1 * | 12/2004 | Jiang et al. ............ 349/115 |
| 6,952,312 | B1 * | 10/2005 | Weber et al. ............ 359/630 |
| 2002/0141194 | A1 | 10/2002 | Wortman et al. |

FOREIGN PATENT DOCUMENTS

| | | |
|---|---|---|
| EP | 491 551 | 6/1992 |
| EP | 591 055 | 9/1993 |
| EP | 592 284 | 9/1993 |
| EP | 802 034 | 10/1997 |
| JP | HEI 6-41335 | 2/1994 |
| WO | WO 95/27919 | 4/1995 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 96/18691 | 6/1996 |
| WO | WO 96/19347 | 6/1996 |
| WO | WO 97/01440 | 1/1997 |
| WO | WO 97/01726 | 1/1997 |
| WO | WO 97/01774 | 1/1997 |
| WO | WO 97/01778 | 1/1997 |
| WO | WO 97/01780 | 1/1997 |
| WO | WO 97/32226 | 9/1997 |
| WO | WO 99/36248 | 7/1999 |
| WO | WO 99/36262 | 7/1999 |
| WO | WO 99/36804 | 7/1999 |

OTHER PUBLICATIONS van, Renesse, Rudolf L., ed., Optical Document Security, Artech House, ISDN 0-89006-619-1, 1993, pp. 251-253.

Schrenk et al., "Nanolayer polymeric optical films," Tappi Journal, Jun. 1992, pp. 169-174.

Boese, D. et al., "Chain Orientation and Anisotropies in Optical and Dielectric Properties in Thin Films of Stiff Polyimides," J. Poly. Sci.: Part B, 30:1321 (1992).

J. W. Braun, et al., "Distribution of Foliage and Fruit in Association with Light Microclimate in the Red raspberry Canopy", 64(5) Journal of Horticultural Science 565-72 (1989).

Kirk Othmer Encyclopedia of Chemical Technology, vol. 8, pp. 652-661 (4th Ed. 1993).

Weber et al., "Giant Birefringent Optics in Multilayer Polymer Mirrors", Science, vol. 287, Mar. 31, 2000, pp. 2451-2456.

Ferry, Viscoelastic Properties of Polymers, John Wiley & Sons, New York, 1970, pp. 314-318.

* cited by examiner

RED-GREEN-BLUE POLYMERIC INTERFERENCE FILM

CROSS REFERENCE TO RELATED APPLICATIONS

This application is a continuation of U.S. application Ser. No. 10/188,175, filed Jul. 1, 2002, issued as U.S. Pat. No. 6,797,366; which is a continuation of U.S. application Ser. No. 09/006,591, filed Jan. 13, 1998, issued as U.S. Pat. No. 6,531,230.

FIELD OF THE INVENTION

The present invention relates generally to optical films, and more specifically to optical films that change color as a function of viewing angle.

BACKGROUND OF THE INVENTION

The present invention pertains to optical films that are useful in colored displays. Such displays are frequently used as a means to display information in an eye-catching manner, or to draw attention to a specific article on display or for sale. These displays are often used in signage (e.g., outdoor billboards and street signs), in kiosks, and on a wide variety of packaging materials.

It is particularly advantageous if a display can be made to change color as a function of viewing angle. Such displays, known as "color shifting displays", are noticeable even when viewed peripherally, and serve to direct the viewer's attention to the object on display.

In the past, color has usually been imparted to displays by absorbing inks which are printed onto card stock or onto a transparent or translucent substrate. However, such inks are typically not color shifting (i.e., the colors of such inks do not normally change as a function of viewing angle).

Some color shifting inks have also been developed, chiefly for use in security applications. However, in addition to their considerable expense, some inks of this type are opaque and are therefore not suitable for backlit applications. Furthermore, such inks are typically based on multilayer stacks of isotropic materials, and hence lose color saturation as viewing angle increases.

Color shifting pigments are also known. For example, a family of light interference pigments are commercially available from Flex Products, Inc. under the trade name CHROMAFLAIR®, and these pigments have been used to make decals. The product literature accompanying these decals describes them as consisting of color shifting pigments in a commercial paint formulation, which is then applied to a vinyl substrate. However, the color shifting effect provided by these materials is only observable at fairly large oblique angles, and is limited to a shift between two colors. Also, these materials, which are apparently described in U.S. Pat. No. 5,084,351 (Phillips et al.), U.S. Pat. No. 5,569,535 (Phillips et al.), and U.S. Pat. No. 5,570,847 (Phillips et al.), all assigned to Flex Products, exhibit fairly low color intensity (see, e.g., FIGS. 7–9 of U.S. Pat. No. 5,084,351). Similar materials are described in U.S. Pat. No. 5,437,931 (Tsai et al.).

An iridescent plastic film is currently sold under the trade name BLACK MAGIC™ by the Engelhard Corporation. The film has been advertised in *Cosmetics & Personal Care Magazine* (September-October 1997) as a black tinted, translucent film 0.7 mil thick but containing more than 100 layers which provides an effect similar to that seen with neon tetra fish, peacock feathers and oil films. The plastic film is a multilayer stack of optically thin films. Thickness variations in the films results in color variations across the area of the film. Although the deviations of the thickness caliper from its average value are not large, they are significant in terms of the color differences in adjacent areas. The various versions of the film are not labeled as a single reflectance color, but instead as dual colored films. For example, the film is commercially available in blue/green and red/green color combinations, among others.

Other color shifting films have also been developed. Some such films are based on multilayer films of metals, metal salts, or other inorganic materials. Thus, U.S. Pat. No. 4,735,869 (Morita) describes titanium dioxide multilayer films which exhibits various combinations of reflection and transmission colors (e.g., green reflection with magenta colored transmission).

Other multilayer color shifting films are known which are polymeric. Thus, U.S. Pat. No. 5,122,905 (Wheatley et al.), in describing the films of U.S. Pat. No. 3,711,176 (Alfrey, Jr. et al.), notes that the color reflected by those films is dependent on the angle of incidence of light impinging on the film. However, these films are not well suited to color displays, since the color shift observed in these films is very gradual and the color saturation is very poor, particularly at acute angles. There is thus a need in the art for a color shifting film useful in display applications which exhibits sharp color shifts as a function of viewing angle, and which maintains a high degree of color saturation. There is also a need in the art for uniformly colored polymeric interference filters.

Various birefringent optical films have been produced using strain hardening (e.g., semicrystalline or crystalline) materials. These materials have proven advantageous in the production of multilayer optical films, since desired matches and mismatches in the refractive indices of these materials can be achieved through orientation. Such films are described, for example, in WO 96/19347.

There is also a need in the art for a polymeric multilayer optical film having good color uniformity. Multilayer films made from extruded polymeric materials have been found to be highly susceptible to distortions in layer thickness and optical caliper, which result in color variations and impurities across the width of the film. This problem was commented on in *Optical Document Security*, 251–252 (Ed. R. van Renesse, 1994). In describing the multilayer polymeric films produced to date by Dow Chemical Company and their licensee, Mearl Corporation, the reference notes that control of thickness variations of the individual layers in these films is very difficult and that, as a result, the films exhibit "countless narrow streaks of varying color, few of which are wider than 2–3 mm." Id. At 251. This problem was also noted in Dow's patent U.S. Pat. No. 5,217,794 (Schrenk) at Col. 11, Lines 19–32, where it is noted that the processes used to make the films described therein can result in layer thickness variations of 300% or more. At Col. 10, Lines 17–28, the reference notes that it is characteristic of multilayer polymeric bodies having optically thin layers (i.e., layers whose optical thickness is less than about 0.7 micrometers) to exhibit nonuniform streaks and spots of color. A similar comment is made at Col. 2, Lines 18–21, with respect to the films of U.S. Pat. No. 3,711,176 (Alfrey, Jr. et al.). As demonstrated by these references, there is a long-standing need in the art for polymeric multilayer optical films (and a method for making the same) which have high color uniformity.

Other polymeric multilayer optical films are known which rely on optically thick or optically very thin layers for their primary reflection band. Such films avoid some of the iridescence problems encountered with other multilayer polymeric films, primarily because the bands of iridescence are too close to be discerned by the human eye. However, since the reflection of visible light is provided by higher order harmonics of primary reflection bands located in the infrared region of the spectrum, the ability of the films to produce high reflectivities of visible light is compromised. There is also a need in the art for multilayer polymeric optical films (and a method for making the same) whose primary reflection bands arise from optically thin layers (e.g., layers having an optical thickness between 0.01 micrometers and 0.45 micrometers) and which exhibit highly uniform color.

These and other needs are met by the color shifting films of the present invention, as hereinafter described.

SUMMARY OF THE INVENTION

In one aspect, the present invention pertains to multilayer birefringent color shifting films and other optical bodies having particular relationships between the refractive indices of successive layers for light polarized along mutually orthogonal in-plane axes (the x-axis and the y-axis) and along an axis perpendicular to the in-plane axes (the z-axis). In particular, the differences in refractive indices along the x-, y-, and z-axes ($\Delta x$, $\Delta y$, and $\Delta z$, respectively) are such that the absolute value of $\Delta z$ is less than about one half the larger of the absolute value of $\Delta x$ and the absolute value of $\Delta y$ (e.g., $|\Delta z| < 0.5$ k, k=max $\{|\Delta x|, |\Delta y|\}$). Films having this property can be made to exhibit transmission spectra in which the widths and intensities of the transmission or reflection peaks (when plotted as a function of frequency, or $1/\lambda$) for p-polarized light remain substantially constant over a wide range of viewing angles. Also for p-polarized light, the spectral features shift toward the blue region of the spectrum at a higher rate with angle change than the spectral features of isotropic thin film stacks.

In another aspect, the present invention pertains to color shifting films having at least one reflection band. With the proper choice of the numeric signs of the layer birefringences, the z-index mismatch, and the stack f-ratio, either the short or long wavelength bandedges of the reflection bands for s- and p-polarized light are substantially coincident at all angles of incidence. Films of this type, when designed using the bandedge sharpening techniques described herein, exhibit the maximum color purity possible with a thin film stack designed for use over large angle and wavelength ranges. In addition to sharp color transitions and high color purity, such films are advantageous in applications requiring non-polarizing color beamsplitters.

In a further aspect, the present invention pertains to color shifting films having at least one optical stack in which the optical thicknesses of the individual layers change monotonically in one direction (e.g., increasing or decreasing) over a first portion of the stack, and then change monotonically in a different direction or remain constant over at least a second portion of the stack. Color shifting films having stack designs of this type exhibit a sharp bandedge at one or both sides of the reflection band(s), causing the film to exhibit sharp color changes as a function of viewing angle. The resulting film is advantageous in applications such as displays where sharp, eye-catching shifts in color are desirable.

In still another aspect, the present invention pertains to a film in which the main peaks in the transmission spectra are separated by regions of high extinction, and in which the high extinction bands persist at all angles of incidence for p-polarized light, even when immersed in a high index medium. The resulting film exhibits a high degree of color saturation at all angles of incidence.

In yet another aspect, the present invention pertains to a film which reflects near IR radiation with high efficiency, but does not reflect a significant amount of visible light at normal incidence. Such a film may comprise a two material component quarterwave stack, or may comprise three or more materials to make an optical stack that suppresses one or more of the higher order harmonics of the main reflection band or bands, which in turn may be achieved by utilizing an optical repeating unit comprising polymeric layers A, B and C arranged in an order ABCD and by effecting a certain relationship among the refractive indices of these materials. This relationship may be understood by assigning polymeric layer A refractive indices $n_x^a$ and $n_y^a$ along in-plane axes x and y, respectively, polymeric layer B refractive indices $n_x^b$ and $n_y^b$ along in-plane axes x and y, respectively, polymeric layer C refractive indices $n_x^c$ and $n_y^c$ along in-plane axes x and y, respectively, and polymeric layers A, B and C refractive indices $n_z^a$, $n_z^b$ and $n_z^c$, respectively, along a transverse axis z perpendicular to the in-plane axes. The proper relationship is then achieved by requiring $n_x^b$ to be intermediate $n_x^a$ and $n_x^c$ with $n_x^a$ being larger than $n_x^c$ (e.g., $n_x^a > n_x^b > n_x^c$), and/or by requiring $n_y^b$ to be intermediate to $n_y^a$ and $n_y^c$ with $n_y^a$ being larger than $n_y^c$ (e.g., $n_y^a > n_y^b > n_y^c$), and by requiring either that at least one of the differences $n_z^a - n_z^b$ and $n_z^b - n_z^c$ is less than 0 or that both said differences are essentially equal to 0 (e.g., max$\{(n_z^a - n_z^b), (n_z^b - n_z^c)\} \leq 0$). In addition to the above film stack construction, bandedge sharpening techniques may be applied to create a sharp transition from high transmission of visible light to high extinction of the near IR light.

In still another aspect, the present invention pertains to a multilayer color shifting film made from strain hardening materials which exhibits a high degree of color uniformity at a given angle of incidence, and to a method for making the same, wherein at least some of the primary reflection bands in the film arise from an optical stack within the film having optically thin layers (i.e., layers whose optical thickness is within the range 0.01 to 0.45 micrometers). The layers within the optical stack have a high degree of physical and optical caliper uniformity. In accordance with the method of the invention, the distortions in layer thickness and optical caliper encountered in prior art non-strain hardening films is avoided by biaxially stretching the cast web by a factor of 2×2 to 6×6, and preferably, about 4×4, which tends to make the lateral layer thickness variations, and therefore the color variations, much less abrupt. Furthermore, a narrower die can be used in making stretched film compared to making cast film of the same width, and this allows for the possibility of fewer distortions of the layer thickness distribution in the extrusion die because of the significantly less melt flow spreading occurring in the narrower die. Additional control over layer thickness and optical caliper is achieved through the use of a precision casting wheel drive mechanism having a constant rotation speed. The casting wheel is designed and operated such that it is free of vibrations that would otherwise cause web thickness chatter and subsequent layer thickness variations in the down-web direction. It has been found that, absent these controls, the normal vibrations encountered in the extrusion process are sufficient to noticeably affect color uniformity, due in part to the low tensile strength in the molten state of the strain hardening materials that are employed in making the optical films of the present invention. Consequently, the method of the invention has allowed the production, for the first time, of color shifting films made from polymeric materials which have a high degree of color uniformity at a particular viewing angle (e.g., films in which the wavelength values of the bandedges of the spectral bands of light which are transmitted or reflected at a particular angle of incidence vary by less than about 2% over an area of at least 10 cm$^2$. The films resulting from the method exhibit essentially uniform layer thickness and optical caliper within the optical stack, thereby resulting in color shifts that are sharper and more rapid as a function of viewing angle as compared to films having a lower degree of physical and optical caliper uniformity.

In a related aspect, the present invention pertains to color shifting films that are made with strain hardening materials (e.g., strain hardening polyesters). The reflectivity, or extinction, of a reflectance band increases as a function of both the number of layers tuned to that wavelength band and the index differential of the layer pairs. The use of strain hardening materials, which exhibit high indices of refraction after stretching, creates large index differentials when paired with selected low index polymers. The required number of layers decreases in direct proportion with an increase in the index differential. Additionally, the layer thickness uniformity can be improved as the number of layers is decreased, since a lower number of layers lessens the dependence on layer multipliers and large feedblock sizes to produce the required number of layers As a result, polymeric film stacks can be made with more precise control of layer thickness for improved spectral characteristics.

In yet another aspect, the present invention relates to color shifting films that behave as polarizers over one or more regions of the spectrum. Such films exhibit color shifts when viewed in transmission, or when viewed in reflection after being laminated to (or coated with) a white, diffusely reflective background such as cardstock. The color shifting polarizers may also be combined with other polarizers or mirrors to produce a variety of interesting optical effects.

The color shifting films of the present invention may be used advantageously as low absorbence materials in displays, providing bright display colors with high luminous efficiency. The display colors may be readily derived by coupling a source of broadband light to the optical film in such a way that various colors of the source light can be viewed in either transmission or reflection. In certain embodiments, the film may also be combined with a broadband mirror. Thus, for example, when the films are combined with a broadband mirror such that the film and the mirror are approximately parallel but are separated by a small distance, an article is obtained which exhibits 3-D "depth". The film may be formed into several different geometries and combined with different light sources to advantageously utilize the high spectral reflectivity and angular selectivity of the film.

DETAILED DESCRIPTION OF THE INVENTION

A. Introduction

Figure 1:
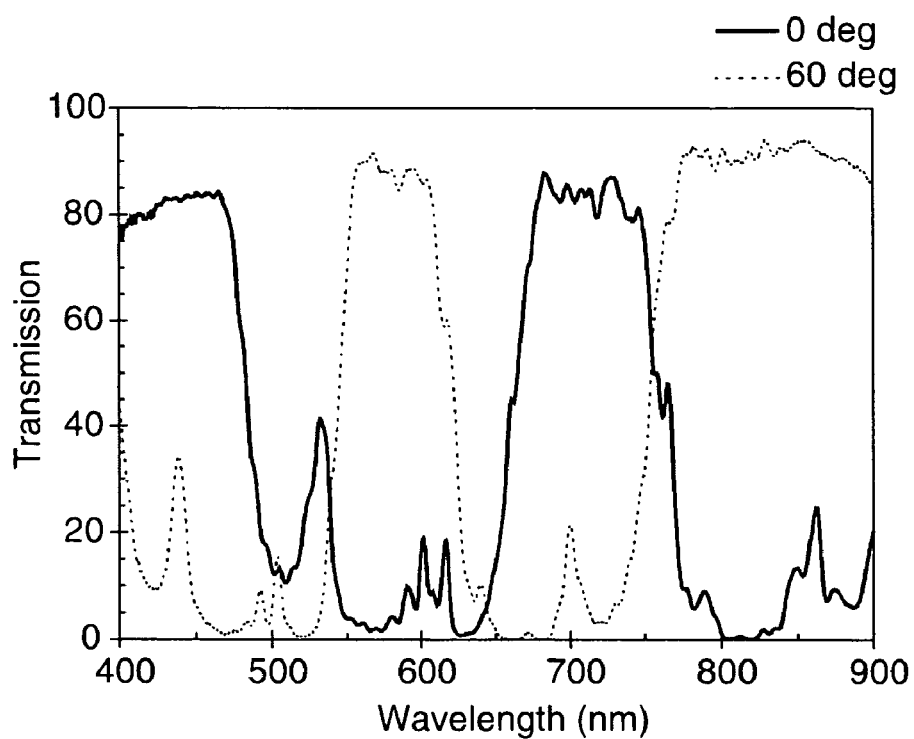
FIG. 1 is a transmission spectrum illustrating the optical behavior, at normal incidence and at 60°, towards p-polarized light for a film of the present invention.

The color shifting films of the present invention are optically anisotropic multilayer polymer films that change color as a function of viewing angle. These films, which may be designed to reflect one or both polarizations of light over at least one bandwidth, can be tailored to exhibit a sharp bandedge at one or both sides of at least one reflective bandwidth, thereby giving a high degree of color saturation at acute angles.

The layer thicknesses and indices of refraction of the optical stacks within the color shifting films of the present invention are controlled to reflect at least one polarization of specific wavelengths of light (at a particular angle of incidence) while being transparent over other wavelengths. Through careful manipulation of these layer thicknesses and indices of refraction along the various film axes, the films of the present invention may be made to behave as mirrors or polarizers over one or more regions of the spectrum. Thus, for example, the films of the present invention may be tuned to reflect both polarizations of light in the IR region of the spectrum while being transparent over other portions of the spectrum, thereby making them ideal for use in low-E type fenestrations.

In addition to their high reflectivities, the films of the present invention have two features that make them ideal for certain types of color displays. First, with particular material choices, the shape (e.g., the bandwidth and reflectivity values) of the optical transmission/reflection spectrum of the multilayer film for p-polarized light can be made to remain essentially unchanged over a wide range of angles of incidence. Because of this feature, a broadband mirror film having a narrow transmission band at, for example, 650 nm will appear deep red in transmission at normal incidence, then red, yellow, green, and blue at successively higher angles of incidence. Such behavior is analogous to moving a color dispersed beam of light across a slit in a spectrophotometer. Indeed, the films of the present invention may be used to make a simple spectrophotometer. Secondly, the color shift with angle is typically greater than that of conventional isotropic multilayer films.

The movement of variously shaped reflection bands across the spectrum as the angle of incidence is varied is the primary basis for the color change of the film as a function of viewing angle, and may be used advantageously to create a number of interesting articles and effects as are described herein. Many combinations of transmissive and reflective colors are possible. Details of various spectral designs are given below.

B. Optical Stack Designs

B1. Spectral Design Details

In general, the color shifting films of the present invention may be designed with a wide variety of reflective spectral features to produce varying optical effects. For example, bandedge sharpening may be used to render a more dramatic change in color with angle, or this feature may be combined with light sources that have one or more narrow emission bands. Alternatively, softer color changes may be achieved by increasing the bandedge slope, or by the use of films that do not reflect light of a given polarization state equally along orthogonal film planes. This is the case, for example, with asymmetrically biaxially stretched films, which have weaker reflectivity for light with the E-field along the minor stretch axis than for light with the E-field along the major stretch axis. In such films, the color purity of both transmitted and reflected light will be lessened.

If the material layer with high in-plane indices has a thickness axis (z-axis) index that is equal to the z-axis index of the low index material, and if index dispersion is neglected, then the shape of the transmission spectrum will not change with angle for p-polarized light when plotted in frequency space, i.e., when plotted as a function of reciprocal wavelength. This effect derives from the functional form of the Fresnel reflection coefficient for p-polarized light incident at the interface between uniaxially birefringent materials, and the functional form of the f-ratio for a quarterwave stack of birefringent films. The optical axes x, y, and z are assumed to be mutually orthogonal, with x and y being in the plane of the film stack and z being orthogonal to the film plane. For birefringent polymer films, x and y are typically the orthogonal stretch directions of the film, and the z axis is normal to the plane of the film. The Fresnel coefficients for s- and p-polarized light are given by EQUATIONS B1-1 and B1-2.

$$r_{pp} = \frac{n_{2z} * n_{20}\sqrt{n_{1z}^2 - n_0^2\sin^2\theta_0} - n_{1z} * n_{10}\sqrt{n_{2z}^2 - n_0^2\sin^2\theta_0}}{n_{2z} * n_{20}\sqrt{n_{1z}^2 - n_0^2\sin^2\theta_0} + n_{1z} * n_{10}\sqrt{n_{2z}^2 - n_0^2\sin^2\theta_0}}$$ EQUATION B1-1

$$r_{ss} = \frac{\sqrt{n_{10}^2 - n_0^2\sin^2\theta_0} - \sqrt{n_{20}^2 - n_0^2\sin^2\theta_0}}{\sqrt{n_{10}^2 - n_0^2\sin^2\theta_0} + \sqrt{n_{20}^2 - n_0^2\sin^2\theta_0}}$$ EQUATION B1-2 where $n_{10}$ and $n_{20}$ are the in-plane indices for materials 1 and 2, respectively, and $n_{1z}$ and $n_{2z}$ are their respective indices in the direction normal to the film plane. $q_0$ is the angle of incidence in the ambient medium which has index $n_0$. The equation for $r_{ss}$ is the same as for isotropic materials.

EQUATIONS B1-1 and B1-2 also are valid along the orthogonal stretch and nonstretch axes of uniaxially stretched films used to make biaxially birefringent reflective polarizers. EQUATION B1-1 is also valid along the in-plane optical axes of films in which these axes are not orthogonal, or are not coincident with the stretch directions of the film. Performance at azimuthal angles between such axes require more extensive mathematical descriptions, but the required mathematical modeling techniques are known in the art.

A particularly useful optical stack is one in which the two z-indices of refraction are equal, or nearly equal, compared to the in-plane index differential. As stated above, if $n_{1z}$ is set equal to $n_{2z}$ in EQUATION B1-1, then one gets the remarkable result that $r_{pp}$ is independent of the angle of incidence:

$$r_{pp} = \frac{n_{20} - n_{10}}{n_{20} + n_{10}}$$ EQUATION B1-3

The above equations for the Fresnel reflection coefficient are independent of layer thicknesses, and predict only interfacial effects. In a thin film stack, the magnitude of the achievable reflectance and bandwidth of a multilayer thin film stack depends greatly on the thickness of all the layers as the optical thickness of the layers determines the phasing required for constructive interference. Typically for maximum optical power, a two component quarterwave stack is used, having equal optical thickness for each layer in the half wave unit cell. This design is said to have an f-ratio of 0.5, where $$f = n_1 d_1/(n_1 d_1 + n_2 d_2)$$ EQUATION B1-4

$n_1$ and $n_2$ are the indices of refraction, $d_1$ and $d_2$ are the physical thickness of the two layers, and normal incidence is assumed. An f-ratio of 0.5 offers maximum bandwidth and reflectivity for a thin film optical stack. If the stack is designed to have an f-ratio of 0.5 at normal incidence, the f-ratio will increase at oblique angles for isotropic materials assuming the first material has the higher index. For birefringent materials, the f-ratio can increase, decrease, or remain constant as a function of angle of incidence, depending on the relationship of the z-indices to the in-plane indices of the two material components. To calculate the f-ratio for birefringent materials at any angle of incidence, an effective phase or bulk index can be calculated for each material with EQUATION B1-5

$$n_{phz}^{p\text{-}pol} = \frac{n_0}{n_z}(n_z^2 - n_0^2\sin^2\theta_0)^{1/2}$$ EQUATION B1-5 for p-polarized light, and EQUATION B1-6

$$n_{phz}^{s\text{-}pol} = (n_0^2 - n_0^2\sin^2\theta_0)^{1/2}$$ EQUATION B1-6 for s-polarized light. The optical thickness of each material can be calculated by multiplying its physical thickness by the effective phase index given by EQUATIONS B1-5 and B1-6. The f-ratio, for any incidence angle and either polarization, is obtained by inserting the appropriate effective phase thickness index values into the above f-ratio formula. It can be shown that if the z-indices of the materials are matched, that the f-ratio at all angles of incidence is given simply by:

$$f = n_{10}d_1/(n_{10}d_1 + n_{20}d_2)$$ EQUATION B1-7 which is independent of the angle of incidence. Thus, multilayer interference filters made with alternating layers of materials which satisfy the matched z-index relationship exhibit spectral features such as reflectivity and fractional bandwidth for p-polarized light which are independent of angle of incidence.

The constant spectral shape as a function of angle for p-polarized light is an important effect at work in many of the color shifting displays described herein, and can be utilized to produce colored multilayer interference films having high color purity at all angles of incidence. An example of a multilayer film exhibiting a constant reflectance spectrum for p-polarized light is shown in FIG. 1.

EXAMPLE B1-1

Figure 2:
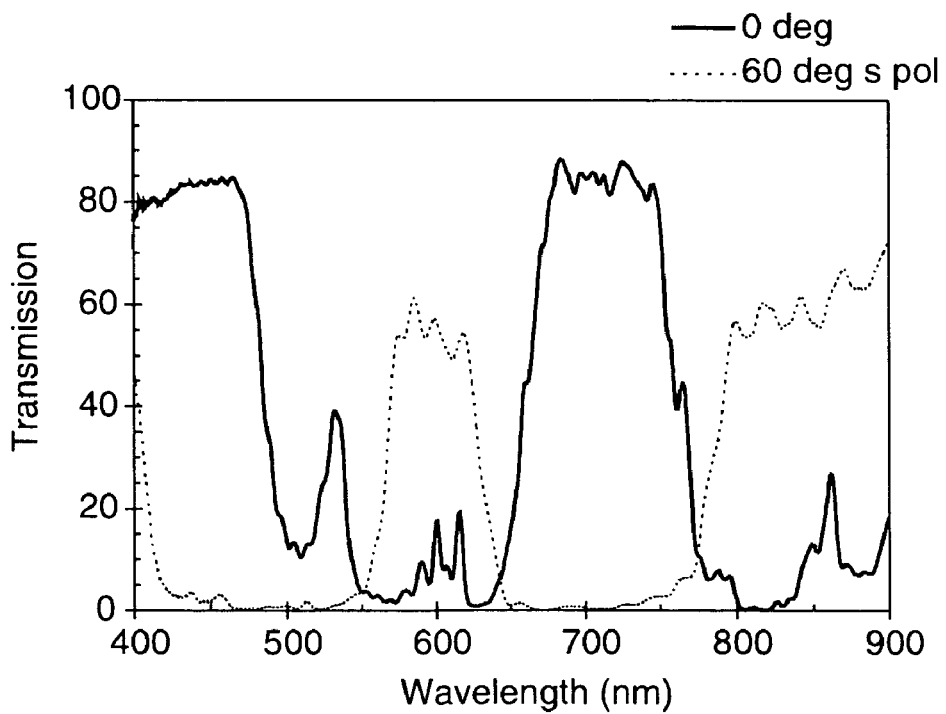
FIG. 2 is a transmission spectrum illustrating the optical behavior, at normal incidence and at 60°, towards s-polarized light for a film of the present invention.

A film was made in accordance with EXAMPLE E1-2, but with about a 30% slower casting wheel speed. The transmission spectrum at normal incidence and at 60° for p-polarized light is shown in FIG. 1. The transmission spectrum at normal incidence and at 60° for s-polarized light is shown in FIG. 2.

Using the definitions given below for bandedge and slope, the following values were measured for this example: the stop band near 600 nm at normal incidence has a bandwidth of 103 nm (543 to 646 nm) and an average transmission of 5.5% within that stopband. The blue bandedge has a slope of 0.66% per nm, while the red edge has a slope of 2.1% per nm. The passband at 700 nm at normal incidence has a bandwidth of 100 nm and a maximum transmission of 85%. The slopes of the passband bandedges are: 2.3 percent per nm on the blue side, and 1.9 percent per nm on the red side. Note that the shape of the entire spectral curve is substantially the same at a 60° angle of incidence as compared to normal incidence. The spectra of FIGS. 1 and 2 were obtained with light polarized parallel to the TD (crossweb direction). Although the indices of refraction of the quarter wave thick PET layers cannot be measured directly, it is thought that they will be approximately the same as the indices of the PET skin layers. The latter indices were measured for this example using a Metricon Prism coupler manufactured by Metricon Corporation of Pennington, N.J. The indices were measured for the crossweb (tentered or TD) direction, the downweb (Machine or MD) direction, also referred to as the Length Oriented or LO direction, and thickness or z axis direction. The indices of refraction of the PET skin layer for the TD direction were: nx=1.674; for the MD direction, ny=1.646; and the z axis index nz=1.490. The isotropic index of the Ecdel is about 1.52. A better balance of index values between the TD and MD directions for the PET can be obtained by adjusting the relative stretch ratios in those two directions.

The extinction bandwidth and magnitude for s-polarized light in a birefringent reflective multilayer film increases with angle of incidence just as in films made from conventional isotropic materials. Thus, a very narrow transmission band will shrink to zero bandwidth for s-polarized light at the higher angles of incidence. This will not greatly affect the color purity of the transmitted light, since only the intensity will be reduced as the s-polarization is extinguished while the p-polarized component is unchanged. For wider transmission bands, the difference in transmission for s- and p-polarizations becomes less important.

The average of the spectra for s- and p-polarized light will be observed in typical ambient lighting conditions. The differing behavior of s- and p-polarized light can be advantageously utilized in various applications.

B2. F-Ratios

The f-ratios of the optical films and devices of the present invention can be manipulated to produce band pass color filters or multiple reflectance bands tuned to particular regions of the spectrum using the extrusion equipment designed only to produce a graded stack of unit cells having a single reflectance band. For example, the F-ratios can be controlled to produce a narrow pass green filter with a highly saturated transmission color, while using only a simple thickness graded stack of layers.

Figure 3:
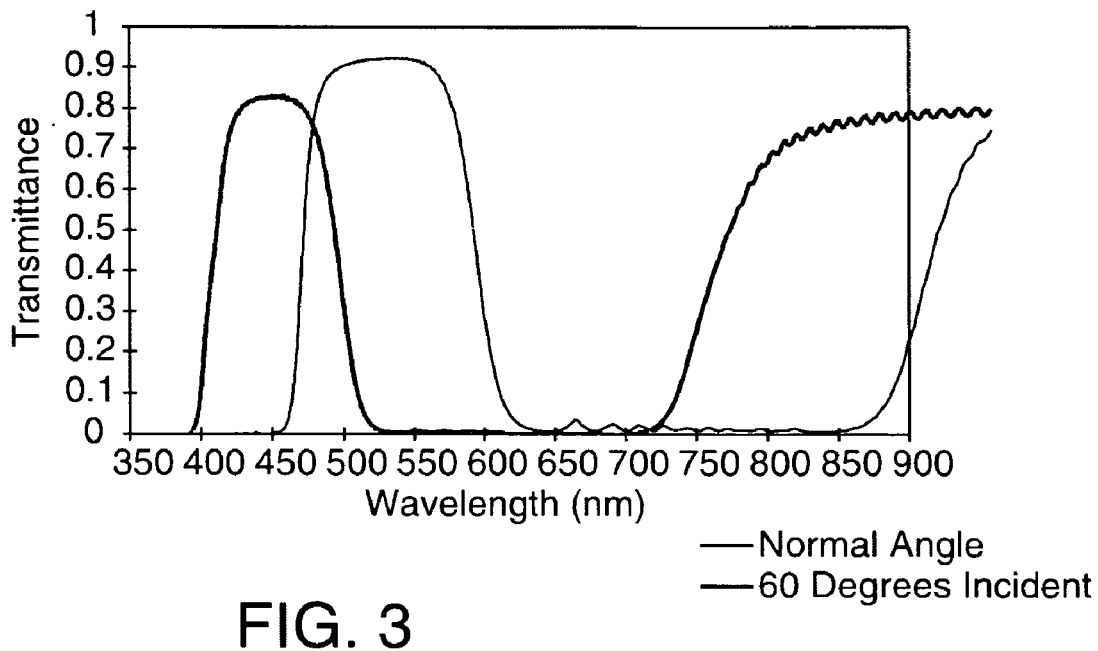
FIG. 3 is a transmission spectrum illustrating the optical behavior, at normal incidence and at 60°, for a computer modeled film of the present invention.
Figure 4:
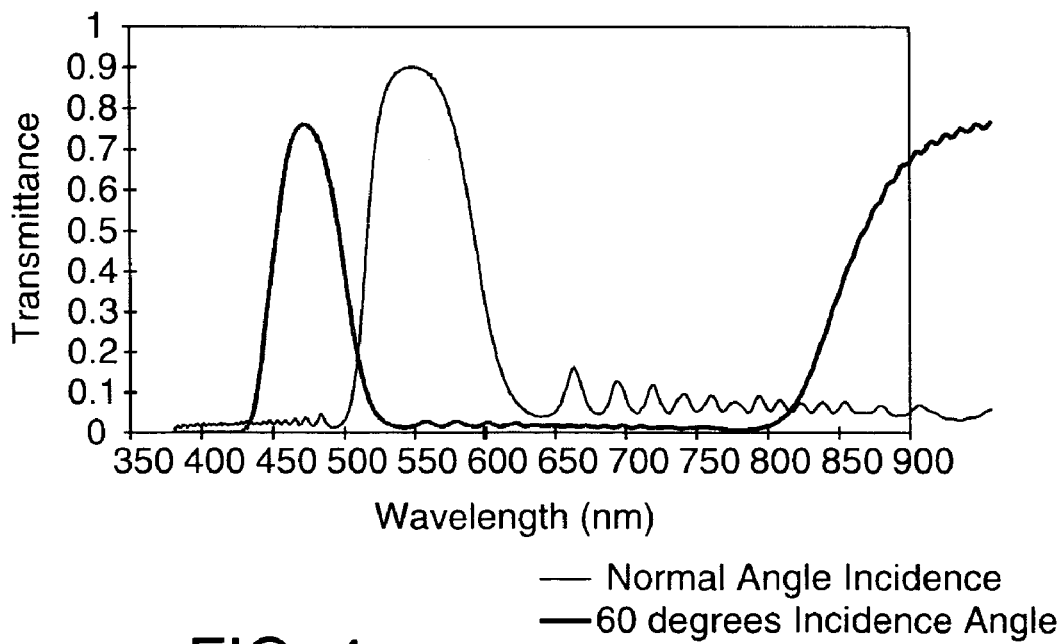
FIG. 4 is a transmission spectrum illustrating the optical behavior, at normal incidence and at 60°, for a computer modeled film of the present invention.

Quarter-wave unit cells (Q×Q) suppress the $2^{nd}$ order reflection harmonics, while maximizing the intrinsic bandwidth (reflection potential) of the $1^{st}$ harmonic. A unit cell design which has a relatively high intrinsic bandwidth for both the $1^{st}$ and $2^{nd}$ order harmonic reflection bands can be obtained by changing the F-ratio to a particular range of values, well away from the Q×Q design point. One example of such a system is a biaxially stretched PEN/PMMA system with F-ratios:

$$F_{PEN} = \frac{D_{PEN} \times N_{PEN}}{D_{PEN} \times N_{PEN} + D_{PMMA} \times N_{PMMA}} = 0.714$$

and $$F_{PMMA} = \frac{D_{PAMMA} \times N_{PMMA}}{D_{PEN} \times N_{PEN} + D_{PMMA} \times N_{PMMA}} = 0.286$$

where $D_{PMMA}$=46.7 nm, $N_{PMMA}$ is 1.49, $D_{PEN}$=100 nm, and $N_{PEN}$ is nx=1.75, ny=1.75 and nz=1.50, will have a $1^{st}$ harmonic intrinsic reflection bandwidth of approximately 8% and a $2^{nd}$ harmonic intrinsic bandwidth of approximately 5.1% at normal incidence. Thus, if a multilayer stack of polymer layers is designed with a linear gradient in layer thickness to make a broadband reflector and both the $1^{st}$ and $2^{nd}$ harmonics have strong reflection bands, the adjacent $1^{st}$ and $2^{nd}$ order reflectance bandedges will form a passband filter. If the layer pair thickness is adjusted so that the short wavelength bandedge of the $1^{st}$ order band is about 600 nm, a pass band in the middle of the visible spectrum will result, as shown in FIG. 3. This stack was designed to simulate a 224 layer PEN/PMMA stack which could be biaxially stretched as described in example E1-1 to give indices at 633 nm of nx=1.75, ny=1.75, and nz of 1.50 for the PEN layers. The PMMA has an isotropic index of about 1.50. Beginning with the thinnest layer pair, each successive layer pair in the stack was designed to be 0.46% thicker than the previous pair. If a larger gradient is used, such as 0.63%, the red bandedge of the $1^{st}$ order band is extended further into the IR, the red bandedge of the $2^{nd}$ order peak will also increase, resulting in a narrower pass band near 550 nm, as illustrated in FIG. 4.

It is to be noted that the F-ratios could be altered somewhat to better balance the strength of the 1 st and the $2^{nd}$ harmonic stop bands. Also, bandedge sharpening techniques can be used to sharpen the edges of the pass band (linear profiles were used in these calculation examples). Suitable bandedge sharpening techniques are described in U.S. Pat. No. 6,157,490 (Wheatley et al.) titled "Optical Film with Sharpened Bandedge", which is incorporated herein by reference. The cross web uniformity for such a film design will be significantly better than for a two-packet multiplier design such as in example E1-2, as no cross-web multiplier errors will be present. See EXAMPLE B7-1 for comparison to E1-2 as an example of the crossweb variation in multiplier performance.

Using the above principles, higher harmonics can be utilized to produce multiple reflection bands in the visible region of the spectrum without the need for two or more groups of layers. Various harmonic suppression designs can be used to create various spectral spacings and colors. For example, the relative peak heights of the first and higher order reflectance peaks can be modified compared to the first order peak at f=0.5 by adjusting the f-ratio to other values. The optical power of the harmonics at any f-ratio can be estimated to a good approximation by calculating an effective index differential for a given f-ratio and harmonic number which can be inserted in the formulas or optical modeling programs for a Q×Q (f=0.5) quarterwave stack. Only one modification of the formulas are required: when calculating the spectral response of a given order, and the stack (with modified f-ratio) is treated as a Q×Q stack having the effective index differential given in FIG. 5, the number of assumed layers must be multiplied by the order number. The effective indices relative to that of the Q×Q stack are given by the plots in FIG. 5. As a function of f-ratio, the first harmonic has one maximum (the Q×Q point), the second harmonic has two maxima, and so forth. The higher order bandwidths and peak reflectances of simple stacks, compared to the first order bandwidth, can be estimated from these values. Since calculating the peak reflectance of the nth higher order requires the assumption of n times as many layers, it is useful to replot FIG. 5 with each higher order curve multiplied by its order number. This plot is shown in FIG. 6. A number of important f-ratios can be obtained from these plots.

For example, all even orders have zero reflective power at f=0.5, while all odd orders have maxima at f=0.5. The third order has maxima at f=0.167 and 0.833, and the fourth order has maxima at f=0.125 and 0.875. The third order reflective power is zero at f=0.33 and 0.66, while the fourth order is zero at f=0.25 and 0.75. At the latter pair of f-ratios, the second order has maxima. At f=0.2 and 0.8, the first and fourth orders have equal peak heights, as do the second and third orders. Again at f=0.4 and 0.6, the first and fourth orders have equal peak heights, as do the second and third orders. The fifth order curves, not shown, have minima at f=0.2, 0.4, 0.6, and 0.8 and maxima at f=0.1, 0.3, 0.5, 0.7, and 0.9. For a given film design, the preferred f-ratio will depend on the application and the selected higher order peaks which one desires to suppress or enhance.

In addition to stack design, materials selection can be advantageously utilized to adjust the bandwidth of higher order harmonics, without being locked into a particular spacing between reflection bandwidths. The intrinsic reflection bandwidth for a Q×Q stack of a given material layer pair is approximately equal to the Fresnel reflection coefficient of their interface, which at normal incidence depends only on the in-plane index differential.

Materials selection can also be utilized to produce films and other optical bodies which exhibit a decrease in reflectivity as a function of angle. In particular, certain combinations of isotropic and birefringent layers can be used in which the spectral contribution of the isotropic layers decreases oblique angle. These designs are discussed below.

Besides the isotropic/birefringent stack combinations described below, other stack designs can also be used to produce a film or other optical body which exhibits color shifts in reflectance with respect to angle of incidence other than those created by the usual monotonic shift of a given spectrum towards shorter wavelengths. For example, a 3-material combination can be used to suppress higher order harmonics of p-polarized light at one angle but not at other angles. A similar effect for s-polarized light can be achieved with a two-layer design.

Where it is desirable to obtain films and other optical bodies exhibiting particularly pure colors such as, for example, a narrow band reflector, a large or small F-ratio can be used to limit the intrinsic bandwidth. Additional layers are then required to obtain the same reflectivity achievable with a Q×Q stack. (A Q×Q stack by definition has an f-ratio of 0.5.) Similarly, to make a broadband reflector with a sharp bandedge, a large or small f-ratio can be used and the reflective envelope can be filled out by using a large number of layers (e.g., a thousand or more) with the appropriate thickness gradient and/or materials which exhibit large refractive index mismatches. Alternatively a smaller in-plane refractive index difference to limit the intrinsic bandwidth, and the number of layers increased to compensate for the intensity loss.

In one particular application of the above design, a UV-reflective film can be made which has little or no reflection in the visible region of the spectrum at any angle, but which maintains a broad reflection band in the UV region close to 400 nm across a wide range of angles. This is achieved by arranging the layers into two film stacks or packets, a UV and an IR reflecting stack with the UV packet being first order in the UV, and the IR packet designed so it exhibits a higher order reflection peak in the UV region of the spectrum that exhibit a maximum in reflectivity at oblique angles. As the angle of incidence is varied from normality, and the first order UV peak shifts to shorter wavelengths, the unsuppressed higher order peak from the IR packet moves into the UV.

In other applications, the films and optical devices of the present invention may incorporate one or more dyes such that the reflectance band of the film coincides with the absorbance band of the dye for at least one angle of incidence. Since the absorption band(s) of the dye, unlike the reflect bands of the film, will not typically shift with angle of incidence, the film will then exhibit one color at the angle for which the bands coincide, but one or more different colors at other angles after the bands separate. Conversely, the absorption bands could be made to coincide with certain transmission bands in the optical stack at a given angle of incidence. In this way, the film could be made black for example at normal incidence, but at oblique angles, the pass band will move to shorter wavelengths where it will not be covered by the dye spectrum, and the film will become colored. Copper pthalocyanine pigment has rather sharp spectral features in the visible and is particularly suited for this embodiment.

In other embodiments of the present invention, the films and optical devices of the present invention may be combined with one or more beveled glass prisms. In one particular embodiment, a beveled glass prism strip is combined with a film to allow viewing of the colored mirror film at angles other than the spectral angle. A microprism material such as Optical Lighting Film available commercially from 3M Company can be placed adjacent or optically coupled to the multilayer film. The layered film transmits different colors at different angles, and since prisms redirect light, the two can be combined so that one can see a color at a given angle that would normally not be seen had the prism not redirected it toward the viewer. Additionally, if the prism is optically coupled to the film, it can change the angle which light is transmitted into the film, thus altering the color at that point. The film exhibits a 3-dimensional effect in which the colored mirror is visible at non-spectral angles. It also produced a variation in color between areas with and without the prisms.

In still other embodiments, a film or optical body having a spiky spectral distribution is used as a first element in combination with a second element comprising a broadband colored mirror film. The first element has the effect of converting a broadband light source used to illuminate the film to a spiky light source, thereby producing more vivid colors in the colored mirror film. Color changes made by illuminating interference films with spiky light sources have been found to produce color changes which are extraordinarily angularly sensitive.

In various embodiments of the present invention, iridescent color cancellation may be used to impart a decorative effect to the resulting device. For example, two films made in accordance with the present invention may be positioned such that the films are parallel at some points but not at others, or else a colored mirror film made in accordance with the invention may be combined with a broadband mirror film. If the films have complimentary colors, or if one of the films is a broadband mirror film and the other is a colored mirror film, the resulting combination will alter or neutralize the color of the top film in some places, but not in others.

B3. Combined Isotropic/Birefringent Film Stacks

Certain optical stack designs can be used to produce color shifts with angle of incidence differing from those created by the usual monotonic shift of a given spectrum with angle towards shorter wavelengths. In particular, the multilayer stacks of the present invention can be combined with multilayer stacks of the prior art to create some unusual angularity effects. For example, a birefringent colored film of the present invention, having one or more transmission peaks centered at given wavelengths at normal incidence, could be coated, coextruded, or laminated with a stack of isotropic layers which reflect at those given wavelengths at normal incidence. The combined article will then appear as a silvered mirror at normal incidence. However, at oblique angles, the isotropic films will leak p-polarized light, allowing the transmission peaks of the birefringent film to be visible, changing to a colored mirror at high angles of incidence. This assumes that the reflectance bandwidth of the birefringent stack extends far enough into the IR to block all red light at oblique angles. The greatest effect will appear for isotropic film stacks which have a Brewster angle at or near an oblique viewing angle. The birefringent stack could also be designed to transmit red at oblique angles if desired.

A variation of the above design technique includes a birefringent stack with more than one spectral passband in which not all of the passbands are blocked by isotropic reflectance stacks. The article will not be silver colored at normal incidence, and will change from one color to another from normal to oblique angles.

Conversely, the materials can be selected so that some layers have a z-index mismatch, wherein the z-index of the material having the higher in-plane indices of refraction is the lowest. One such combination is PEN/PETG. PETG, if stretched at temperatures above 120° Celsius has an isotropic index of about 1.57. PEN, if stretched as described in example E1-1, has nx≅1.75, ny≅1.75, and nz≅1.50. These layers will exhibit increased reflectivity at oblique angles for both polarizations so that, if used alone or in combination with z-index matched layers, the resulting film can be designed to appear colored at normal incidence and silver at oblique angles. Other copolyesters and polycarbonates with indices above 1.55 are suitable materials to use in combination with PEN to achieve this effect. While the above examples deal with making a composite film which is colorless for at least one angle of view, these same design techniques can be used to make unusual color shifts (desirable for decorative, security, etc.) which are not colorless at practically any angle of view.

B4. Blue Shift

Certain of the films made in accordance with the present invention, such as those containing uniaxially negative birefringent layers in the unit cell, can be made to exhibit a blue shift (i.e., a shift of spectral peaks toward the blue end of the spectrum as angle of incidence is varied) that is noticeably larger than that observed with conventional color shifting films. Furthermore, since, for a given (non-normal) angle of incidence, the magnitude of the blue shift will be larger than that observed with conventional films for p-polarized light, the differential of the color shift with respect to the angle of incidence will be greater for the films of the present invention than for conventional films. This latter feature has the effect of making the color shifts in the films of the present invention more noticeable, which in turn makes them more suitable for color shifting displays.

The magnitude of the blue shift with angle of incidence in any thin film stack can be derived from the basic wavelength tuning formula for an individual layer:

$$L/4 = nd\cos\theta \qquad \text{FORMULA B4-1}$$

where L is the wavelength tuned to the given layer, $\theta$ is the angle of incidence measured from normality in that layer, n is the effective index of refraction for the material layer for the given direction and polarization of the light traveling through the layer, and d is the physical thickness of the layer. In an isotropic thin film stack, only the value of $\cos\theta$ decreases as $\theta$ increases. However, in the uniaxially negative birefringent films of the present invention, both n and $\cos\theta$ decrease for p-polarized light as $\theta$ increases. When the unit cell includes one or more layers of a uniaxially negative birefringent material or biaxially birefringent layers composed of, for example, PEN or PET, wherein the p-polarized light senses a z-index value instead of only the higher in-plane values of the index, the result is a decreasing effective index of refraction for higher angles of incidence. Accordingly, the effective low z-index caused by the presence of negatively birefringent layers in the unit cell creates a secondary blue shift in addition to the blue shift present in an isotropic thin stack. The compounded effects result in a greater blue shift of the spectrum compared to film stacks composed entirely of isotropic materials. The magnitude of the blue shift will be determined by the thickness weighted average change in L with angle of incidence for all material layers in the unit cell. Thus, the blue shift can be enhanced or lessened by adjusting the relative thickness of the birefringent layer(s) to the isotropic layer(s) in the unit cell. This will result in f-ratio changes that must first be considered in the product design. The maximum blue shift in mirrors is attained by using negatively uniaxially birefringent materials in all layers of the stack.

Alternatively, whenever the z-index of one of the alternating thin film materials in the film is much higher than its in-plane index, and the other material has a low birefringence, the extinction bands for p-polarized light move to the blue at a slightly lower rate with angular change than do the same bands for s-polarized light. Thus, the minimum blue shift is attained by using only uniaxially positive birefringent materials in the optical stack.

For polarizers, biaxially birefringent materials are used, but for the simple case of light incident along one of the major axes of a birefringent thin film polarizer, the analysis is the same for both uniaxial and biaxial birefringent films. For directions between the major axes of a polarizer, the effect is still observable but the analysis is more complex. In general, however, the blue shift of the transmission spectrum for light incident at azimuthal angles between the major axes will have a value intermediate that for light incident along either of the optic axes of the film. For most oriented polymer films, the optics axes are either aligned with or orthogonal to the stretch axes of the film.

For mirror films made with PEN with high stretch ratios along the two major axes of the film, using conditions similar to those of the examples given below, the in-plane/z-axis index differential of the PEN layers is about 0.25 (1.75–1.50). This index differential is less for PET-based films (i.e., about 1.66–1.50). For PEN based polarizers, with light incident with the plane of polarization along the extinction axis, the effect is even more pronounced because the difference in the PEN in-plane index compared to the PEN z-axis index can be much greater (i.e., about 1.85–1.50), resulting in an even greater blue shift for p-polarized light than that observed in biaxially stretched multilayer film stacks.

If only uniaxially positive birefringent materials, or the same in conjunction with isotropic materials were used in the stack, the blue shift would be diminished compared to isotropic optical films. The z-index differential of the two materials must be substantially smaller than the in-plane index differentials if high reflectivity is desired for p-polarized light at all angles of incidence. An example would be a uniaxially positive birefringent material such as biaxially oriented syndiotactic polystyrene which has a z-index of about 1.63 and in-plane indices of about 1.57. The other material could be an isotropic coPEN with an index of about 1.63.

B5. Color Saturation

As noted previously, the birefringent color shifting films of the present invention exhibit improved color saturation, especially as compared to prior art isotropic multilayer films. Multilayer color shifting films with isotropic refractive indices suffer from a degradation in their color purity (in either transmission or reflection) as viewing angle through the films is increased from normal-angle to oblique angles (e.g., grazing angles). This is due in part to the fact that the fraction of randomly polarized light that is p-polarized is less efficiently reflected as the propagation angle through the film is increased. Accordingly, the reflection band, while shifting to shorter wavelengths at off-normal angles, also becomes weaker, allowing unwanted spectral components to contaminate the overall transmission spectrum. The problem is especially serious when the films are immersed in glass via cemented prisms or other media with indices substantially higher than 1.0.

The multilayer birefringent color shifting films of the present invention, on the other hand, can maintain their color saturation with increasing viewing angle so long as the refractive indices of the optical layers are appropriately matched along the z-axis (the axis normal to the plane of the film). A calculational example of the way color and color saturation changes with increasing viewing angle, for both an isotropic multilayer film and a birefringent multilayer film, is shown below. Color purity will increase as the bandwidth narrows toward that of a spike. However, the color purity of the reflected light from a polymeric multilayer stack may be reduced by the broadband reflection from the air/polymer skin layer interface. In this case it may be desirable to provide the polymer film with an anti-reflection coating.

EXAMPLES B5-1 AND B5-2

The transmission color for an 80-layer optical stack consisting of alternating layers of materials A and B, with in-plane refractive index values $N_a$=1.75 and $N_b$=1.50 and designed to provide a saturated "blue" transmission spectrum (given a uniform white illumination source) at normal angle, was calculated as a function of angle from 0 degrees to 80 degrees. Transmission color was calculated using both the CIE x-y chromaticity coordinates and the La*b* color space. For each color system, color saturation increases as the color coordinate values move away from the illumination source color values: (0,0) for La*b*, and (0.333,0.333) for the x-y system.

Figure 7:
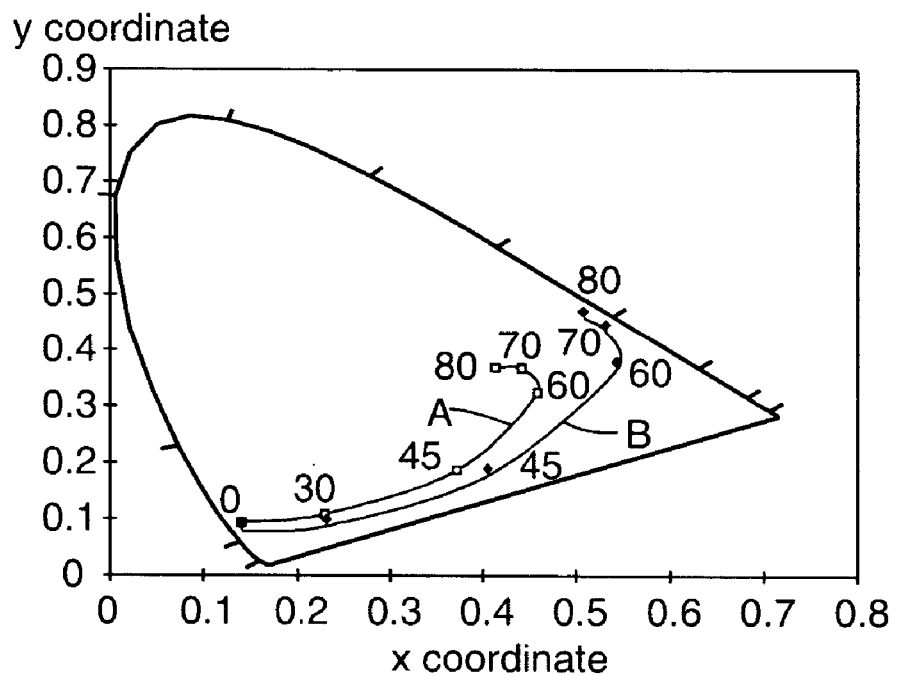
FIG. 7 is a chromaticity diagram using CIE x-y chromaticity coordinates for a PEN/PMMA multilayer stack.
Figure 8:
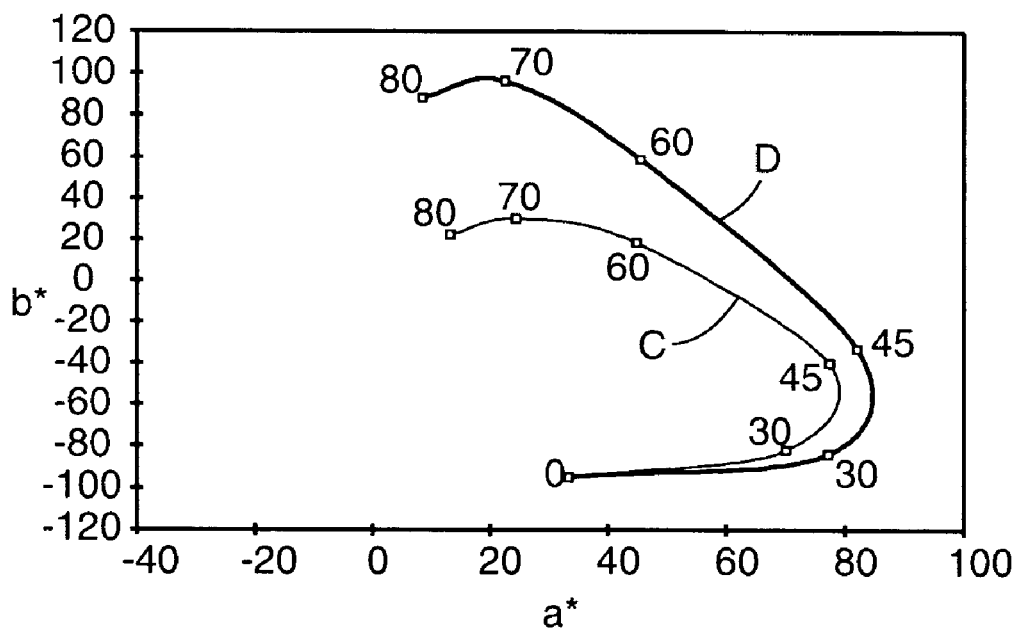
FIG. 8 is a chromaticity diagram in La*b* color space for a PEN/PMMA multilayer stack.

For each color coordinate system, a comparison in color values versus viewing angle was made for a multilayer system where the refractive indices along the z-axis have values $n_z^a$=1.75, $n_z^b$=1.50 (EXAMPLE B5-1, the isotropic, z-index mismatched case) and $n_z^a$=1.50, $n_z^b$=1.50 (EXAMPLE B5-2, the z-index matched, birefringent case). A PEN/PMMA multilayer stack can be made which approximates the latter case. The results are shown in FIGS. 7 and 8. As seen in these figures, the birefringent, z-index matched system of EXAMPLE B5-2 has high-angle color values that are highly saturated, while the isotropic system of EXAMPLE B5-1 has strongly decreasing color saturation with increasing viewing angle.

B6. Spectral Definitions

While the present invention is frequently described herein with reference to the visible region of the spectrum, various embodiments of the present invention can be used to operate at different wavelengths (and thus frequencies) of electromagnetic radiation through appropriate adjustment of various parameters (e.g., optical thickness of the optical layers and material selection).

Of course, one major effect of changing wavelength is that, for most materials of interest, the index of refraction and the absorption coefficient change. However, the principles of index match and mismatch still apply at each wavelength of interest, and may be utilized in the selection of materials for an optical device that will operate over a specific region of the spectrum. Thus, for example, proper scaling of dimensions will allow operation in the infrared, near-ultraviolet, and ultra-violet regions of the spectrum. In these cases, the indices of refraction refer to the values at these wavelengths of operation, and the optical thicknesses of the optical layers should also be approximately scaled with wavelength. Even more of the electromagnetic spectrum can be used, including very high, ultrahigh, microwave and millimeter wave frequencies. Polarizing effects will be present with proper scaling to wavelength and the indices of refraction can be obtained from the square root of the dielectric function (including real and imaginary parts). Useful products in these longer wavelength bands can be specularly reflective polarizers and partial polarizers.

A reflectance band is defined in general as a spectral band of reflection bounded on either side by wavelength regions of low reflection. With dielectric stacks, the absorption is typically low enough to be ignored for many applications, and the definition is given in terms of transmission. In those terms, a reflectance band, or stop band is defined in general as a region of low transmission bounded on both sides by regions of high transmission.

In one preferred embodiment, a single reflectance band or stop band for p-polarized light has a continuous spectrum between any two successive wavelengths at which the transmission is greater than 50 percent, and including such successive wavelengths as endpoints, and where the average transmission from one endpoint to the other is less than 20 percent. Such preferred reflectance band or stop band is described in the same way for unpolarized light and light of normal incidence. For s-polarized light, however, the transmission values in the preceding description are calculated in a way that excludes the portion of light reflected by an air interface with the stack or the stack's skin layers or coatings. For such a preferred embodiment, the bandwidth is defined to be the distance, in nm, between the two wavelengths within the band which are nearest each 50 percent transmission point, at which the transmission is 10 percent. In commonly used terms, the bandwidths are defined by the 10 percent transmission points. The respective blue and red (i.e., short and long wavelength) bandedges are then taken to be the wavelength at the above defined 10% transmission points. The transmission of the preferred stop band is taken to be the average transmission between the 10 percent transmission points.

The slope of a bandedge of a stop band as described in the preceding paragraph is taken from the 50 percent and 10 percent transmission/wavelength points, and is given in units of % transmission per nm. If a reflectance band does not have high enough reflectivity to satisfy the definitions of bandwidth and bandedge slopes of the preferred embodiment, then the bandwidth is taken to mean the Full Width at Half Maximum reflectivity.

A pass band is defined in general as a spectral transmitting band bounded by spectral regions of relatively low transmission. With the multilayer color shifting film, the passband is bounded by reflective stopbands. The width of the pass band is the Full Width at Half Maximum (FWHM) value. Bandedge slopes are calculated from the two points on a given bandedge nearest the peak transmission point, the transmission values of which are 50 and 10 percent of the peak transmission value.

In one preferred embodiment, the passband has a transmission band having low transmission regions on both sides of the transmission peak with transmission minima of 10 percent or less of the transmission value of the peak transmission point. For example, in this preferred embodiment, a pass band having a 50 percent transmission maximum would be bounded on both sides by reflectance bands having 5 percent or lower transmission minima. More preferably, the transmission minima on both sides of the passband are less than 5 percent of the peak transmission value of the passband.

It is preferred that the bandedge slopes for a pass band be greater than about 0.5 percent transmission per nm. More preferably, the bandedge slopes are greater than about 1 percent per nm, and even more preferably, the slopes are greater than about 2 percent per nm.

B7. Nonpolarizing Color Filters

With regard to s-polarized light, the bandwidth and reflectivity of the birefringent thin film stacks described herein both increase with angle of incidence in the same manner as for conventional isotropic materials. The same effects can be produced for p-polarized light if materials of the proper indices are chosen. In that case, the spectra for s- and p-polarized light can be made to behave similarly or even identically as a function of the angle of incidence. For a detailed discussion of this topic, see U.S. Pat. No. 5,808,798 (Weber et al.) titled "Nonpolarizing Beamsplitter". The multilayer films described therein have a relatively large z-index mismatch, of the opposite sign as the in-plane index mismatch. The phenomenon therein is independent of filter bandwidth and reflectivity. Although materials are available to achieve this effect, the selection of compatible materials which provide good interlayer adhesion is limited, and in material selection, one must usually sacrifice the magnitude of the in-plane index differential to achieve the required z-index differential.

We have subsequently discovered that birefringent multilayer stacks which have a relatively small z-index mismatch can function as non polarizing color filters in certain special cases. In these cases, only one of the bandedges (short or long wavelength edge) of the reflectance band of a simple graded QxQ stack will be nonpolarizing, but not both. Certain color filters, such as, e.g., blue or cyan transmitting filters, can have their red bandedges sufficiently far into the IR portions of the spectrum that the polarizing effects there are of no consequence to the intended application. If computer optimization is utilized to adjust layer thickness values then either, or both, bandedges of a thin film stack having an approximate z-index match at the interfaces of two or more materials could be made nonpolarizing to a degree superior to that of an isotropic thin film stack. Two examples are given below of birefringent stacks which display an essentially nonpolarizing effect at their blue bandedges, and have simple layer thickness profiles. Such thin film stacks would provide a significant improvement over the art for nonpolarizing color beamsplitters, an example of which is given by L. Songer, Photonics Spectra, November 1994, page 88. The five layer ABCBA optical repeating unit stacks of Songer were designed to work at 37.5 degrees in BK-7 glass, which has an index of about 1.52.

EXAMPLE B7-1

Figure 9:
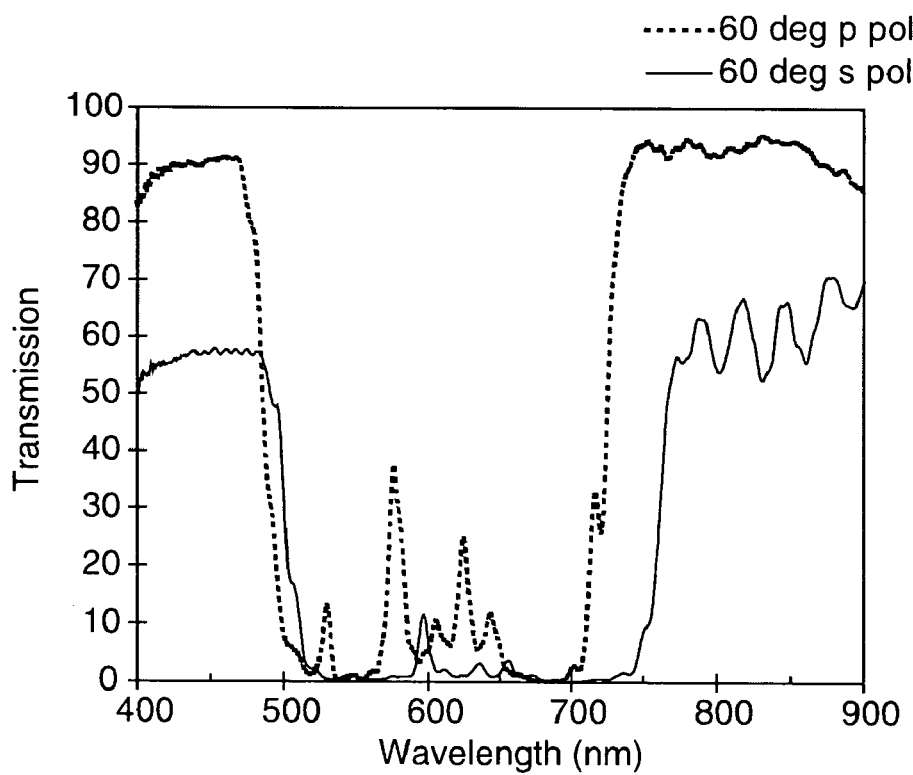
FIG. 9 is a transmission spectrum illustrating the optical behavior, at normal incidence and at 60°, towards s- and p-polarized light for a film of the present invention.

The transmission spectra for s and p-polarized light of a 417 layer coextruded PET/Ecdel film are shown in FIG. 9. Both spectra were taken at 60 degrees angle of incidence in air, which is equivalent to about 35 degrees in glass having an index of 1.52 such as e.g., BK-7 glass., This multilayer film was made as described in EXAMPLE E1-2. As described in that example, the process used to make this multilayer sample utilized an asymmetric two times layer multiplier which doubles the number of layers produced in the feedblock. The multiplier was designed so that the two sets of layers are tuned to reflect separate wavelength bands, centered at wavelengths separated by the multiplier ratio. However, the multipliers do not produce the exact same multiplication ratio at all points across the meltstream. In particular, there is often a considerable change in ratio near one or both edges of the film. For convenience, the sample of this example was taken near one edge of the film described in EXAMPLE E1-2. The crossweb position of B7-1 was about one-half meter from the crossweb position where the spectra of EXAMPLE E1-2 was obtained. At the cross web position on the film of example B7-1, the multiplier ratio is much reduced, the two reflectance bands having substantially merged into a single wider reflectance band. In FIG. 9 note that the bandedges of this single band, for s and p-polarized light near 525 nm, are coincident to within about 10 nm, while the red bandedges near 800 nm are separated by about 40 nm. The transmission values below 500 nm and above 700 nm for the s-polarization are determined primarily by the polymer/air interfaces of the film, and can be improved with anti-reflection coatings, or by immersion in a high index medium such as cementing between glass prisms. The average transmission of the stopband for p-polarized light (500 nm to 710 nm) is about 6 percent. The slopes of the all the bandedges in this example are about 2.5 percent per nm.

The reflection band of EXAMPLE B7-1 for p-polarized light has several significant spectral leaks, the average transmission from 500 nm to 710 nm being 6 percent, this example is presented only to illustrate the nonpolarizing bandedges of this optical stack. One skilled in the art could easily produce a wide reflectance band filter composed of PET and Ecdel which transmits an average of less than 5 percent or even less than 2 percent across over the bandwidth of the stop band. The spectra for FIG. 9 were obtained with light polarized parallel to the TD direction, which is also referred to as the x direction in this example. The measured indices of refraction of the PET skin layer are nx=1.666, ny=1.647, nz=1.490. The low index material is Ecdel and the index of Ecdel is about 1.52.

EXAMPLE B7-2

The second example of a birefringent stack with a non-polarizing blue bandedge is found in EXAMPLE E1-1, which is a multilayer stack of PEN and PMMA. Note in FIG. 21 that the bandedges of the transmission spectra for s and p-polarized light are essentially coincident near 410 nm, while the red bandedges near 600 nm are separated by almost 40 nm. The z-index of the PEN in this example is fairly well matched to that of the PMMA, both being about 1.49 at 700 nm. PEN has a higher dispersion than PMMA, and near 400 nm nzPEN≅1.53 while nPMMA≅1.51. The average transmission within the stop band for p-polarized light is 1.23 percent. At 60 degrees, the red bandedge slope is about 4.2 percent per nm and the blue bandedge slope is about 2.2 percent per nm. The slope of the red bandedge at normal incidence is about 5.5 percent per nm.

To obtain the nonpolarizing effect with a birefringent stack that has a z-index match condition, the optical stack must also provide for high reflectance so that only several percent or less of the p-polarized light of the undesired wavelengths is transmitted. This is necessary as the s-polarization will be more highly reflected than the p-polarization since the Fresnel reflection coefficients will be greatly different at high angles of incidence for the two polarizations. Preferably the average transmission of p-polarized light within the reflectance band of a nonpolarizing color filter, at the nominal design angle, is less than 10 percent, more preferably less than 5 percent, and even more preferably, less than 2 percent. For good color rendition, it also preferable that the bandedges exhibit a high slope. Sharp bandedges also are desirable in obtaining saturated colors of high purity. Preferably the slopes are at least about 1 percent per nm, more preferably greater than about 2 percent per nm, and even more preferably greater than about 4 percent per nm. To obtain sharp bandedges, a computer optimized layer thickness distribution may be utilized, or a band sharpening thickness profile as described in U.S. Pat. No. 6,157,490 (Wheatley et al.) titled "Optical Film with Sharpened Bandedge", may be applied to the layer thickness distribution design.

Without wishing to be bound by theory, it is thought that the coincidence of the blue bandedges in the two examples given above is due to a combination of differing bandwidths for s and p-polarized light, and the different rate of spectral shift with angle of the spectra for those polarizations. The fractional bandwidth increases for s-polarized light as the incidence angle is increased from zero. The fractional bandwidth for p-polarized light does not change with angle because matching the z-indices produces an angle independent Fresnel reflection coefficient for each interface, but the entire band moves slightly faster to the blue, as described above, than does the same band for s-polarized light. The two effects nearly cancel on the blue side of the band, with the result that the blue bandedges for both s and p-polarized light remaining nearly coincident at all angles of incidence. The two effects add on the red side, with the bandedges for s- and p-polarized light becoming separated. The resulting red bandedge becomes an average of the two plots, resulting in slightly lower color purity on the red side in this case for unpolarized light.

Alternatively, whenever the z-index of one of the alternating thin film materials in the film is much higher than its in-plane index, and the other material has a low birefringence, the extinction bands for p-polarized light move to the blue at a slightly lower rate with angular change than do the same bands for s-polarized light. Such an film stack can be used to maintain a sharp bandedge on the red side of an extinction band for unpolarized light, such as, for example, non polarizing yellow and red transmitting filters. Alignment of the blue or red bandedges for s and p-polarized light can be fined tuned by adjustments to the f-ratio of the material layers, or by adjusting the z-index mismatch.

Figure 10:
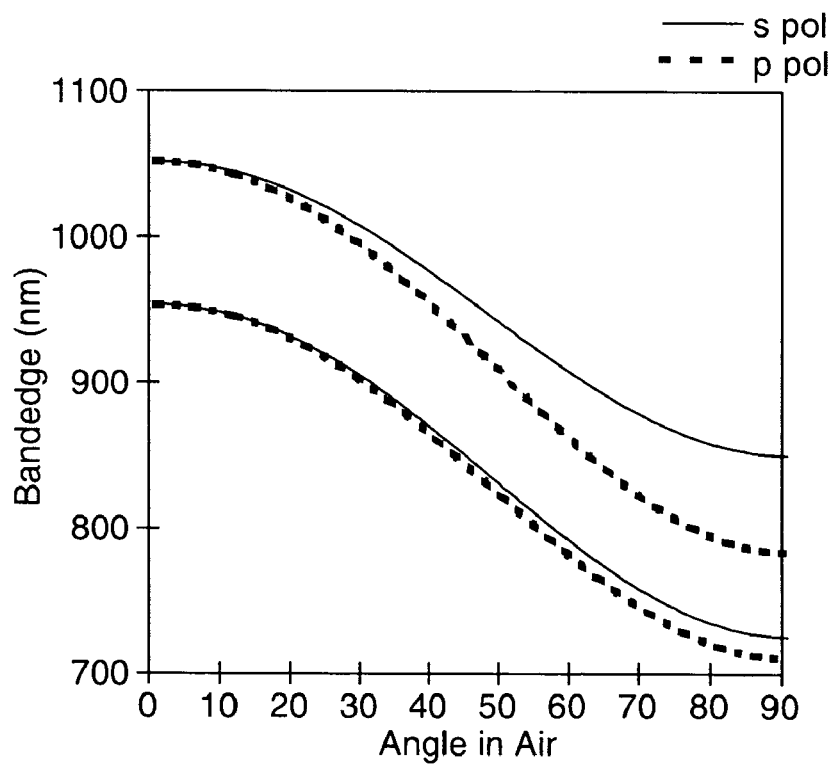
FIG. 10 is a graph illustrating the variation in bandedge as a function of angle of incidence (in air) for a PEN/PMMA quarter wave stack at an f-ratio of 0.5.

The f-ratio of a thin film stack can be adjusted to aid in aligning the s and p-polarization bandedges of a reflectance band of the present invention. Assuming the following details for a PEN:PMMA quarterwave stack ($n_{1x}$=1.75, $n_{1z}$=1.50, $n_{2x}$=1.50, $n_{2z}$=1.50) at 1000 nm, for an f-ratio of 0.50 at normal incidence, with layer thicknesses of $d_1$=142.86 nm and $d_2$=166.67 nm, the bandedge positions can be calculated as a function of the angle of incidence. The hi and low bandedges are at 953 nm and 1052 nm at normal incidence. The p-pol bandedges shift more than the s-pol ones, particularly for the hi bandedge. The p-pol band narrows from 99 nm to 73 nm while the s-pol band widens to 124 nm. By evaluating this result at intermediate angles, the information in FIG. 10 can be generated.

The chart shows a decreasing width for the p-pol reflection band, but if the bandedge values were plotted in terms of reciprocal wavelength, the bandwidth of p-pol band would remain constant. Also note that, while the bandedges on the low wavelength side do not exactly match for the s and p-polarizations, at 60 degrees in air, the difference is only about 10 nm, which is sufficient for many nonpolarizing color filter applications. The p-pol bandedge does shift further to the blue than the corresponding bandedge for the s-polarization which contrasts greatly with the behavior of isotropic quarter wave stacks.

Figure 11:
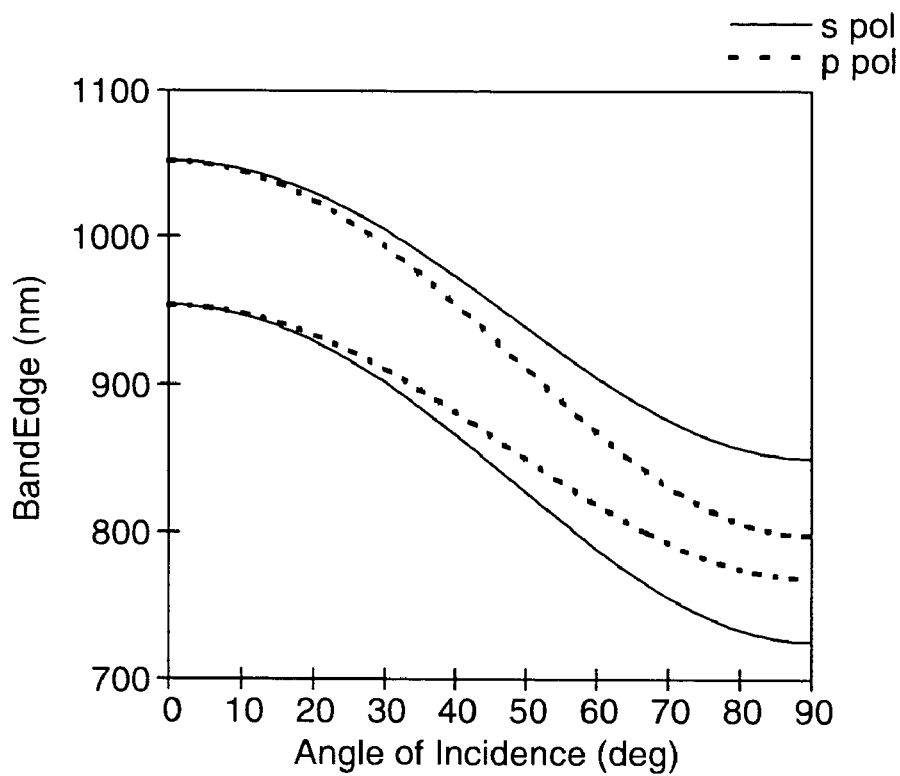
FIG. 11 is a graph illustrating the variation in bandedge as a function of angle of incidence for an isotropic quarter wave stack at an f-ratio of 0.50.

The same calculations were made for an isotropic stack, using $n_{1x}$=1.75 and $n_{1z}$=1.75, with $n_{2x}$=1.50 and $n_{2z}$=1.50. The results are given in FIG. 11. For an f-ratio of 0.50, the layer thicknesses are $d_1$=142.86 mm and $d_2$=166.67 mm. The hi and low bandedges are at 953 nm and 1052 run at normal incidence, the same as the anisotropic material. With angle, the p-pol bandedges narrow dramatically, while the s-pol bandedges are identical to the anisotropic ones. The p-pol band narrows from 99 nm to 29 nm while the s-pol band widens to 124 mm. The center of the isotropic band is the same for s-pol and p-pol, while for anisotropic material, the center of the p-pol band decreases more than the center of the s-pol band. The separation of the s-pol and p-pol bandedges at 60° in air is greater than 30 nm. As the index differential of the isotropic materials is increased, the separation of the s and p-pol bandedges also increases. Separations of 50 nm are typical. See, for example, L. Songer, Photonics Spectra, November 1994, page 88.

Figure 12:
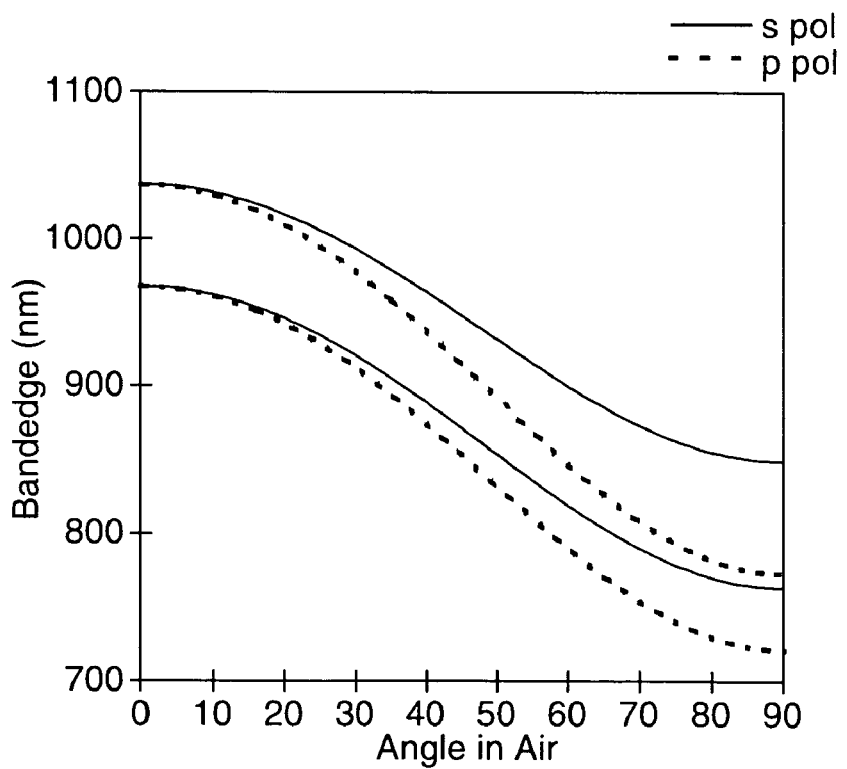
FIG. 12 is a graph illustrating the variation in bandedge as a function of angle of incidence (in air) for a PEN/PMMA quarter wave stack at an f-ratio of 0.75.

The relative shift of the p-pol bandedges compared to the shift of the s-pol bandedges is substantially affected by the amount of birefringent materials in the stack as well as their absolute birefringence values. For example, increasing the f-ratio of a PEN/PMMA stack will increase the relative amount of material having an in-plane index of 1.75, and will promote a small blue shift in the s-pol reflection band. For an f-ratio of 0.75, and using $n_{1x}$=1.75 and $n_{1z}$=1.50, with $n_{2x}$=1.50 and $n_{2z}$1.50, and layer thicknesses of $d_1$=214.29 mm and $d_2$=83.33 mm, the high and low bandedges are at 967 mm and 1037 mm at normal incidence. As shown in FIG. 12, this band is not as wide as the Q×Q stack one. There is also less shift with angle for the s-pol bandedges than for the p-pol edges. The p-pol band narrows from 70 mm to 52 nm while the s-pol band widens to 86 mm. While this stack design will not provide a non polarizing filter, it will promote a larger color shift with angle than the Q×Q (f=0.5) stack.

Figure 13:
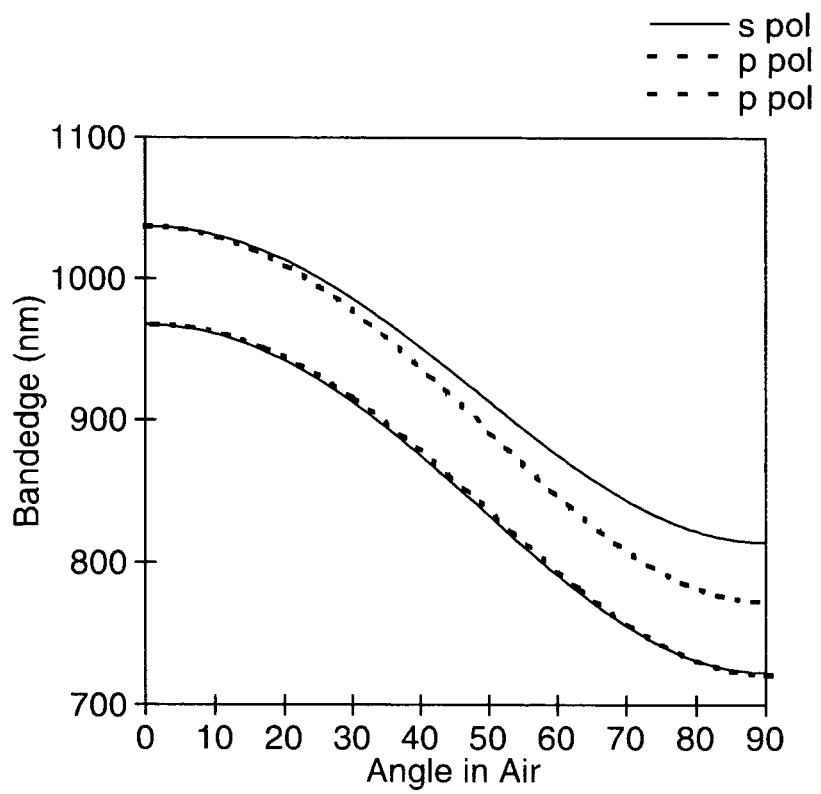
FIG. 13 is a graph illustrating the variation in bandedge as a function of angle of incidence (in air) for a PEN/PMMA quarter wave stack at an f-ratio of 0.25.

Pushing the f-ratio in the opposite direction for a stack of the same materials will bring the blue bandedge of the p-pol spectrum into alignment with the s-pol spectrum. At about an f-ratio of 0.25, the two are nearly coincident. For an f-ratio of 0.25, the layer thicknesses are $d_1=71.43$ mm and $d_2=250.00$ nm. The hi and low bandedges are at 967 nm and 1037 mm at normal incidence, the same as for the f-ratio=0.75. The p-pol bandedges shift the same as for f=0.75 because the amount of material with a z-index of 1.50 is unchanged, but the s-pol bands shift more. For this stack, the low wavelength bandedge shifts the same for s-pol and p-pol. The p-pol band narrows from 70 nm to 52 nm while the s-pol band widens to 91 nm. These results are shown in FIG. 13.

Figure 5:
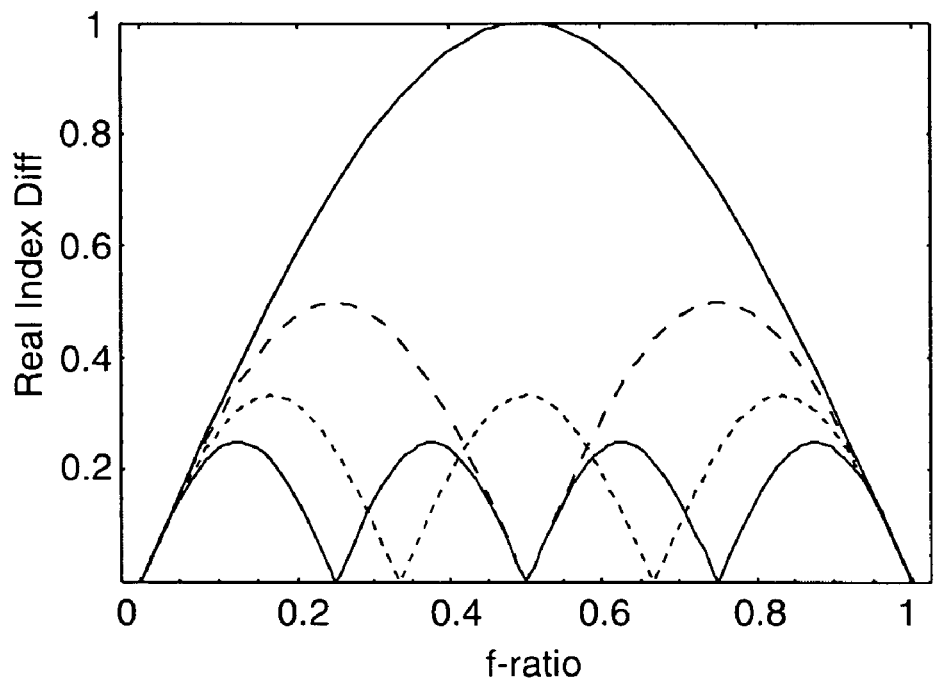
FIG. 5 is a graph illustrating the behavior of relative index difference as a function of f-ratio.
Figure 6:
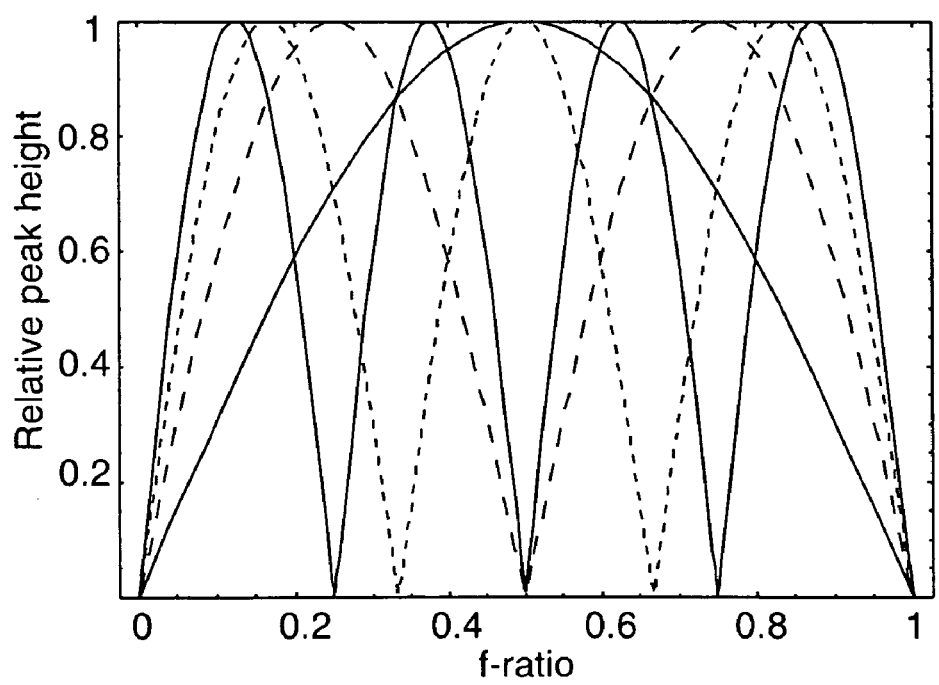
FIG. 6 is a graph illustrating the behavior of relative peak height as a function of f-ratio.
Figure 14:
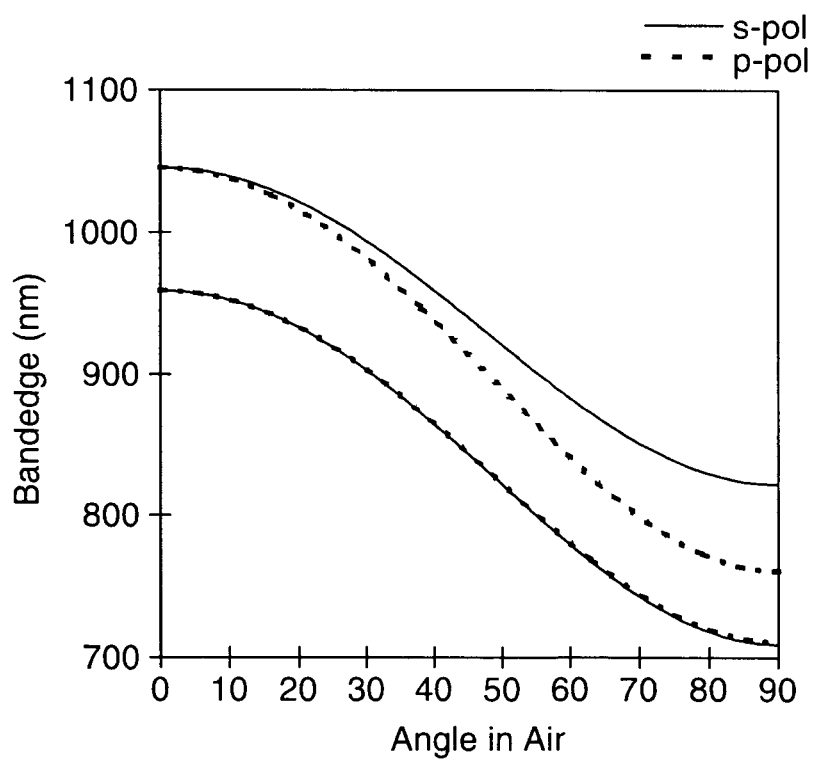
FIG. 14 is a graph illustrating the variation in bandedge as a function of angle of incidence (in air) for a quarter wave stack consisting of PET and an isotropic material.

A large reduction in the f-ratio to provide a match in the s and p-pol bandedges has the drawback of lowering the overall reflective power of the stack, as illustrated in FIG. 5. Another way to provide a match of the s and p blue bandedges at all angles of incidence is to introduce a mismatch in the z-indices. If PET with an in-plane index of 1.66 and a z-index of 1.50 is assumed in an alternating stack with a second material having an isotropic index of 1.45, we see from FIG. 14 that the s and p low wavelength bandedges are substantially coincident at all angles of incidence. Even though the z-indices are not matched (Dz=0.05), and the in-plane index differential is smaller than for the isotropic stack illustrated in FIG. 11 (0.21 vs 0.25), the p-pol band retains a much larger bandwidth at 90 degrees in this case than in the isotropic case. In other words, a film stack of this design retains exceptional reflectivity at all angles of incidence, and can be used in applications requiring color filters having high brightness and good color saturation. The same result of coincident s and p blue band edges were obtained with a modeled birefringent PEN/1.45 isotropic index material stack. These cases are examples of improving film performance by introducing a controlled z index mismatch. Film stacks having a Dz as large as 0.5 times that of the maximum in-plane index differential would also meet the requirements of many color filter applications.

The coincidence of the blue bandedges for the s- and p-polarization spectra is an important feature of the color shifting films disclosed herein, and has a utility beyond that of a nonpolarizing color filter. The coincidence of the s and p bandedges allows the fabrication of color shifting films having an abrupt change of color with viewing angle, and also the fabrication of certain color filters having a high degree of color purity. In one preferred embodiment, the separation of bandedges for the s- and p-polarizations is preferably less than about 30 nm, and more preferably less than about 20 nm. Even more preferably, the separation is less than about 10 nm.

The nonpolarizing color filters described above are useful as color beamsplitters in applications requiring equal bandwidth and reflectivity for s and p-polarizations of colored light. In particular, such films may find application as the color filters in a three prism color separator of the type described by Doany in U.S. Pat. No. 5,644,432 for LCD projection systems. A particularly preferred configuration for these films in that type of color separator is to have the light sequentially strike a red reflecting film (cyan transmitter) first, then a film which reflects both green and red (blue transmitter). The blue light traverses both films and strikes the blue LCD light modulator. The preferred angle of incidence in the glass prisms described by Doany was 30 degrees, and this angle is easily accommodated by the present invention. Typical angles of incidence in glass for a variety of applications are 30 degrees, 35 degrees, 37.5 degrees, and 45 degrees. These angles refer to the center ray of a cone of light. The half cone angle may be 5, 10, 15, or even 20 degrees, depending on the f number of the optical system. As an example, in a system with a half cone angle of 15 degrees, a beamsplitter positioned for a 35 degrees angle of incidence would encounter a range of angles from 20 degrees to 50 degrees angle of incidence on the thin film stack.

C. Process Details

C1. Process Considerations

The process used for making the coextruded polymeric multilayer optical films of the present invention will vary depending on the resin materials selected and the optical properties desired in the finished film product.

Moisture sensitive resins should be dried before or during extrusion to prevent degradation. This can be done by any means known in the art. One well-known means employs ovens or more sophisticated heated vacuum and/or desiccant hopper-dryers to dry resin prior to its being fed to an extruder. Another means employs a vacuum-vented twin-screw extruder to remove moisture from the resin while it is being extruded. Drying time and temperature should be limited to prevent thermal degradation or sticking during hopper-dryer or oven drying. In addition, resins coextruded with moisture sensitive resins should be dried to prevent damage to the moisture sensitive coextruded resin from moisture carried by the other resin.

Extrusion conditions are chosen to adequately feed, melt, mix and pump the polymer resin feed streams in a continuous and stable manner. Final melt stream temperatures are chosen within a range which avoids freezing, crystallization or unduly high pressure drops at the low end of the temperature range and which avoids degradation at the high end of the temperature range. For example, polyethylene naphthalate (PEN) is dried for 8 hours at 135° C. and then vacuum fed to an extruder with a final zone temperature, or melt temperature, ranging preferably between 270° C. and 300° C. and more preferably between 275° C. and 290° C.

It is often preferable for all polymers entering the multilayer feedblock to be at the same or very similar melt temperatures. This may require process compromises if two polymers, whose ideal melt processing temperatures do not match, are to be coextruded. For example, Polymethyl Methacrylate (PMMA) is typically extruded at a temperature between 235° C. and 250° C. However, it has been unexpectedly found that PMMA can be coextruded with PEN using PMMA melt temperatures as high as 275° C., provide that design considerations are made in the PMMA melt train to minimize the potential for stagnation points in the flow, and to hold to a minimum the overall residence time in the melt of the PMMA. Another technique found to be useful in this regard is to start up the PMMA melt train at the more conventional processing temperatures, and then to raise the melt train temperatures to the higher, PEN-compatible temperatures only when well-developed flow through the entire process has been attained.

Conversely, the PEN processing temperature may be reduced so as to match it to the typical melt processing temperatures for PMMA. Thus, it has also been unexpectedly found that the melting point, and hence, the processing temperature, of PEN may be reduced by the addition of comonomers into the PEN polymer with only a very slight accompanying reduction of the ability of the PEN to develop birefringence upon drawing. For example, a PEN copolymer made using DiMethyl Isophthalate (DMI) in place of 3 mol % of the 2,6-DiMethyl Naphthalate (DMN) monomer has been found to have a reduction in birefringence of only 0.02 units, and a reduction of glass transition temperature of only about 4 or 5° C., while the melt processing temperature is reduced by 15° C. Small amounts of DiMethyl Terephthalate (DMT) or other diacid or diol comonomers may also be useful in this regard. Esters or diesters of the diacid comonomers may also be used. The advantages of adding comonomers into the PEN polymer are more fully described in U.S. Ser. No. 09/006,601 titled "Modified Copolyesters and Improved Multilayer Reflective Film" (now abandoned) and U.S. Pat. No. 6,111,697 (Merrill et al.) titled "Optical Device with a Dichroic Polarizer and Multilayer Optical Film", the contents of which are incorporated herein by reference.

It will be evident to one skilled in the art that combinations of PEN process temperature reduction through copolymerization and PMMA melt temperature elevation via process design could be usefully employed, as could the combination of one, the other, or both techniques with still other techniques. Likewise, similar techniques could be employed for equal-temperature coextrusion of PEN with polymers other than PMMA, PMMA with polymers other than PEN, or combinations including neither of the two exemplary polymers.

Following extrusion, the melt streams are then filtered to remove undesirable particles and gels. Primary and secondary filters known in the art of polyester film manufacture may be used, with mesh sizes in the 1–30 micrometer range. While the prior art indicates the importance of such filtration to film cleanliness and surface properties, its significance in the present invention extends to layer uniformity as well. Each melt stream is then conveyed through a neck tube into a gear pump used to regulate the continuous and uniform rate of polymer flow. A static mixing unit may be placed at the end of the neck tube carrying the melt from the gear pump into the multilayer feedblock, in order to ensure uniform melt stream temperature. The entire melt stream is heated as uniformly as possible to ensure both uniform flow and minimal degradation during melt processing.

Multilayer feedblocks are designed to divide two or more polymer melt streams into many layers each, interleave these layers, and merge the many layers of two or more polymers into a single multilayer stream. The layers from any given melt stream are created by sequentially bleeding off part of the stream from a main flow channel into side channel tubes that feed layer slots for the individual layers in the feed block manifold. Many designs are possible, including those disclosed in U.S. Pat. Nos. 3,737,882; 3,884,606; and 3,687,589 to Schrenk et al. Methods have also been described to introduce a layer thickness gradient by controlling layer flow as described in U.S. Pat. Nos. 3,195,865; 3,182,965; 3,051,452; 3,687,589 and 5,094,788 to Schrenk et al, and in U.S. Pat. No. 5,389,324 to Lewis et al. In typical industrial processes, layer flow is generally controlled by choices made in machining the shape and physical dimensions of the individual side channel tubes and layer slots.

Through the present invention it has been unexpectedly discovered that the layer thickness distribution and uniformity needs of the optical films of the present invention can frequently be better and more economically met by choosing a fixed set of dimensions for all side channel tubes and layer slots and machining only the two or more main flow channels to provide appropriate pressure gradients for the formation of a given optical film. This enables a modular design for the feedblock, wherein only a module including the main flow channels and the entrances to the side channel tubes need be re-machined for each unique film construction, provided the overall numbers of components and layers remains constant. This module, called the gradient plate, must be machined so that the cross-section of each main flow channel has a central axis of symmetry, such as a circle, square, or equilateral triangle. Due to machining considerations, the square cross-section is preferably used. Along each main flow channel, the cross-sectional area may remain constant, or may change. The change may be an increase or decrease in area, and a decreasing cross-section is referred to as a taper. When the cross-sectional area is made to remain constant, a plot of layer thickness vs. layer number is non-linear and decreasing. For a given polymer flow, there exists at least one cross-sectional tapering profile which will result in a linear, decreasing dependency of layer thickness upon layer number, which is sometimes preferred. This taper profile may be found by one reasonably skilled in the art, using reliable rheological data for the polymer in question and polymer flow simulation software known in the art, and must be calculated on a case-by-case basis.

The side channel tubes and layer slots of the two or more melt streams are interleaved as desired to form alternating layers. The feed block's downstream-side manifold for the combined multilayer stack is shaped to compress and uniformly spread the layers transversely. Special thick layers known as protective boundary layers (PBLs) may be fed nearest to the manifold walls from any of the melt streams used for the optical multilayer stack, or by a separate feed stream, in order to protect the thinner optical layers from the effects of wall stress and possible resulting flow instabilities.

In optical applications, especially for films intended to transmit or reflect a specific color or colors, very precise layer thickness uniformity in the film plane is required. Perfect layer uniformity following this transverse spreading step is difficult to achieve in practice. The greater the amount of transverse spreading required, the higher the likelihood of non-uniformity in the resulting layer thickness profile. Thus, it is advantageous from the standpoint of layer thickness profile uniformity (or for film color uniformity) for the feedblock's layer slots to be relatively wide. However, increasing the widths of the layer slots results in a larger, heavier, and more expensive feedblock. It will be apparent that an assessment of the optimal layer slot widths must be made individually for each feedblock case, taking into consideration the optical uniformity requirements of the resulting film, and can be done using reliable rheological data for the polymer in question and polymer flow simulation software known in the art, along with a model for feedblock fabrication costs.

Control of layer thickness is especially useful in producing films having specific layer thicknesses or thickness gradient profiles that are modified in a prescribed way throughout the thickness of the multilayer film. For example, several layer thickness designs have been described for infrared films which minimize higher order harmonics which result in color in the visible region of the spectrum. Examples of such film include those described in U.S. Pat. No. RE 3,034,605, incorporated herein by reference, which describes a multilayer optical interference film comprising three diverse substantially transparent polymeric materials, A, B, and C and having a repeating unit of ABCB. The layers have an optical thickness of between about 0.09 and 0.45 micrometers, and each of the polymeric materials has a different index of refraction, ni. The film includes polymeric layers of polymers A, B, and C. Each of the polymeric materials have its own different refractive index, $n_A$, $n_B$, $n_C$, respectively. A preferred relationship of the optical thickness ratios of the polymers produces an optical interference film in which multiple successive higher order reflections are suppressed. In this embodiment, the optical thickness ratio of first material A, $f_A$, is 1/5, the optical thickness ratio of second material B, $f_B$, is 1/6, the optical thickness of third material C, $f_C$ is 1/3, and $n_B=\sqrt{n_A n_C}$.

For this embodiment, there will be an intense reflection at the first order wavelength, while the reflections at the second, third, and fourth order wavelengths will be suppressed. To produce a film which reflects a broad bandwidth of wavelengths in the solar infrared range (e.g., reflection at from about 0.7 to 2.0 micrometers), a layer thickness gradient may be introduced across the thickness of the film. Thus, the layer thicknesses may increase monotonically across the thickness of the film. Preferably, for the preferred three component system of the present invention, the first polymeric material (A) differs in refractive index from the second polymeric material (B) by at least about 0.03, the second polymeric material (B) differs in refractive index from the third polymeric material (C) by at least about 0.03, and the refractive index of the second polymeric material (B) is intermediate the respective refractive indices of the first (A) and third (C) polymeric materials. Any or all of the polymeric materials may be synthesized to have the desired index of refraction by utilizing a copolymer or miscible blend of polymers. For example, the second polymeric material may be a copolymer or miscible blend of the first and third polymeric materials. By varying the relative amounts of monomers in the copolymer or polymers in the blend, any of the first, second, or third materials can be adjusted so that there is a refractive index relationship where $n_B=\sqrt{n_A n_C}$.

Another suitable film includes the film described in U.S. Pat. No. 5,360,659, incorporated herein by reference, which describes a two component film having a six layer alternating repeating unit suppresses the unwanted second, third, and fourth order reflections in the visible wavelength region of between about 380–770 nm while reflecting light in the infrared wavelength region of between about 770–2000 nm. Reflections higher than fourth order will generally be in the ultraviolet, not visible, region of the spectrum or will be of such a low intensity as to be unobjectionable. The film comprises alternating layers of first (A) and second (B) diverse polymeric materials in which the six layer alternating repeat unit has relative optical thicknesses of about 0.778A.111B.111A.778B.111A.111B. The use of only six layers in the repeat unit results in more efficient use of material and simpler manufacture than previous designs. A repeat unit gradient may be introduced across the thickness of the film. Thus, in one embodiment, the repeat unit thicknesses will increase linearly across the thickness of the film. By linearly, it is meant that the repeat unit thicknesses increase at a constant rate across the thickness of the film. In some embodiments, it may be desirable to force the repeat unit optical thickness to double from one surface of the film to another. The ratio of repeat unit optical thicknesses can be greater or less than two as long as the short wavelength range of the reflectance band is above 770 nm and the long wavelength edge is about 2000 nm. Other repeat unit gradients may be introduced by using logarithmic and/or quartic functions. A logarithmic distribution of repeat unit thicknesses will provide nearly constant reflectance across the infrared band. In an alternative embodiment, the two component film may comprise a first portion of alternating layers comprising the six layer alternating layer repeating unit which reflects infrared light of wave lengths between about 1200–2000 nm. and a second portion of alternating layers having an AB repeat unit and substantially equal optical thicknesses which reflect infrared light of wavelengths between about 770–1200 nm. Such a combination of alternating layers results in reflection of light across the infrared wavelength region through 2000 mm. Preferably, the first portion of the alternating layers has a repeat unit gradient of about 5/3:1, and the second portion of alternating layers have a layer thickness gradient of about 1.5:1. This hybrid design may be provided as described for example in U.S. Pat. No. 5,360,659, but has broader application in that it is useful with any of the broadband infrared reflectors or multicomponent optical designs described herein.

In an alternate embodiment, the two component film may comprise a first portion of alternating layers comprising the six layer alternating layer repeating unit which reflects infrared light of wavelengths between about 1200–2000 nm. and a second portion of alternating layers having an AB repeat unit and substantially equal optical thicknesses which reflect infrared light of wavelengths between about 770–1200 nm. Such a combination of alternating layers results in reflection of light across the infrared wavelength region through 2000 nm, and is commonly known as a "hybrid design". Preferably, the first portion of the alternating layers has a repeat unit gradient of about 5/3:1, and the second portion of alternating layers have a layer thickness gradient of about 1.5:1.

Another useful film design is described in U.S. Pat. No. 6,207,260 (Wheatley et al.) titled "Multicomponent Reflective Film", which is incorporated herein by reference. Optical films and other optical bodies are described which exhibit a first order reflection band for at least one polarization of electromagnetic radiation in a first region of the spectrum while suppressing at least the second, and preferably also at least the third, higher order harmonics of the first reflection band, while the % reflection of the first order harmonic remains essentially constant, or increases, as a function of angle of incidence. This is accomplished by forming at least a portion of the optical body out of polymeric materials A, B, and C which are arranged in a repeating sequence ABC, wherein A has refractive indices $n_x^A$, $n_y^A$, and $n_z^A$ along mutually orthogonal axes x, y, and z, respectively, B has refractive indices $n_x^B$, $n_y^B$, and $n_z^B$ along axes x, y and z, respectively, and C has refractive indices $n_x^C$, $n_y^C$ and $n_z^C$ along axes x, y, and z, respectively, where axis z is orthogonal to the plane of the film or optical body, wherein $n_x^A > n_x^B > n_x^C$ or $n_y^A > n_y^B > n_y^C$, and wherein $n_z^C \geq n_z^B \geq n_z^A$. Preferably, at least one of the differences $n_z^A - n_z^B$ and $n_z^B - n_z^C$ is less than about −0.05.

As described above, a hybrid design can also be used wherein a first portion of the multilayer stack is designed to reflect at wavelengths above about 1200 nm and a second portion of alternating layers having an AB repeat unit and substantially equal optical thicknesses which reflect infrared light of wavelengths between about 770–1200 nm. Such a combination of alternating layers results in reflection of light across the infrared wavelength region through 2000 nm.

By designing the film or optical body within these constraints, at least some combination of second, third and fourth higher-order reflections can be suppressed without a substantial decrease of the first harmonic reflection with angle of incidence, particularly when the first reflection band is in the infrared region of the spectrum. Such films and optical bodies are particularly useful as IR mirrors, and may be used advantageously as window films and in similar applications where IR protection is desired but good transparency and low color are important.

A modular feedblock of the type described herein, having a changeable gradient plate adaptable to easily vary the thickness of individual layer thicknesses or layer thickness profiles without necessitating changing or remachining the entire feedblock assembly is especially useful for modifying layer thickness profiles as described above.

The various layers in the film preferably have different thicknesses across the film. This is commonly referred to as the layer thickness gradient. A layer thickness gradient is selected to achieve the desired band width of reflection. One common layer thickness gradient is a linear one, in which the thickness of the thickest layer pairs is a certain percent thicker than the thickness of the thinnest layer pairs. For example, a 1.055:1 layer thickness gradient means that the thickest layer pair (adjacent to one major surface) is 5.5% thicker than the thinnest layer pair (adjacent to the opposite surface of the film). In another embodiment, the layer thickness could decrease, then increase, then decrease again from one major surface of the film to the other. This is believed to provide sharper bandedges, and thus a sharper or more abrupt transition from reflective to transmissive regions of the spectrum. This preferred method for achieving sharpened bandedges is described more fully in U.S. Pat. No. 6,157,490 (Wheatley et al.) titled "Optical Film with Sharpened Bandedge", the contents of which are herein incorporated by reference.

The method of achieving sharpened band edges will be briefly described for a multilayer film having layers arranged in an alternating sequence of two optical materials, "A" and "B". Three or more distinct optical materials can be used in other embodiments. Each pair of adjacent "A" and "B" layers make up an optical repeating unit (ORU), beginning at the top of the film with ORU1 and ending with ORU6, with the ORUs having optical thicknesses $OT_1$, $OT_2$, ... $OT_6$. These optical thicknesses are the same as the term "$D_r$" identified previously. For maximum first order reflectance (M=1 in equation I) at a design wavelength, each of the ORUs should have a 50% f-ratio with respect to either the A or B layer. The A layers can be considered to have a higher X-(in-plane) refractive index than the B layers, since the former are shown thinner than the latter. ORUs 1–3 may be grouped into a multilayer stack S1 in which the optical thickness of the ORUs decrease monotonically in the minus-Z direction, while ORUs 4–6 may be grouped into another multilayer stack S2 in which the optical thickness of the ORUs increase monotonically. Thickness profiles such as this are helpful in producing sharpened spectral transitions. In contrast, thickness profiles of previously known films typically increase or decrease monotonically in only one direction. If desired for some applications, a discontinuity in optical thickness can be incorporated between the two stacks to give rise to a simple notch transmission band spectrum.

Other thickness gradients may be designed which improve peak transmission and to make even steeper band edges (narrower transmission band). This can be achieved by arranging the individual layers into component multilayer stacks where one portion of the stacks has oppositely curved thickness profiles and the adjacent portions of the stacks have a slightly curved profile to match the curvature of the first portion of the stacks. The curved profile can follow any number of functional forms; the main purpose of the form is to break the exact repetition of thickness present in a quarter wave stack with layers tuned to only a single wavelength. The particular function used here is an additive function of a linear profile and a sinusoidal function to curve the profile with an appropriate negative or positive first derivative. An important feature is that the second derivative of the ORU thickness profile be positive for the red (long wavelength) band edge of a reflectance stack and negative for the blue (short wavelength) band edge of a reflectance stack. Note that the opposite sense is required if one refers to the band edges of the notched transmission band. Other embodiments of the same principle include layer profiles that have multiple points with a zero value of the first derivative. In all cases here, the derivatives refer to those of a best fit curve fitted through the actual ORU optical thickness profile, which can contain small statistical errors of less than 10% sigma one standard deviation in optical thickness values.

Other layer profiles are envisioned and the combination of a modular gradient plate feedblock and the layer multiplier of the present invention are especially suited to change between profile designs in a convenient manner.

The multilayer stack exiting the feedblock manifold may then directly enter a final shaping unit such as a die. Alternatively, the stream may be split, preferably normal to the layers, to form two or more multilayer streams that may be recombined by stacking. The stream may also be split at an angle other than that normal to the layers. A flow channeling system that splits and stacks the streams is called a multiplier or interfacial surface generator (ISG). The width of the split streams can be equal or unequal. The multiplier ratio is defined by the ratio of the wider to narrower stream widths. Unequal streams widths (i.e., multiplier ratios greater than unity) can be useful in creating layer thickness gradients. In the case of unequal streams, the multiplier should spread the narrower stream and/or compress the wider stream transversely to the thickness and flow directions to ensure matching layer widths upon stacking. Many designs are possible, including those disclosed in U.S. Pat. Nos. 3,565,985; 3,759,647; 5,094,788; and 5,094,793 to Schrenk et al. In typical practice, the feed to a multiplier is rectangular in cross-section, the two or more split streams are also rectangular in cross-section, and rectangular cross-sections are retained through the flow channels used to re-stack the split streams. Preferably, constant cross-sectional area is maintained along each split stream channel, though this is not required.

One type of multiplier useful for producing high quality multilayer optical films in accordance with the present invention utilizes asymmetric expansion of the flow stream to correct for differences in volumetric flow rates. Such a multiplier is depicted schematically in FIGS. 2 and 3. In this type of multiplier, the resin stream is divided into a plurality of branch streams, which are independently and asymmetrically expanded in a direction transverse to their directions of flow. The branch streams are then recombined into a composite stream. This type of multiplier allows for a prescribed ratio of layer thicknesses to be obtained in the composite stream, without introducing thickness variations or interfacial disturbances in the layers of the composite stream.

The multiplier is equipped with an inlet through which an incoming multilayer stream of resin from an extruder is introduced. The inlet is in open communication with two or more branch channels. As the incoming stream passes through the inlet, it is divided into a plurality of branch streams which proceed through the branch channels. Each branch stream is then independently expanded in a first direction transverse to its direction of flow, while being simultaneously or consecutively contracted in a second direction transverse to its direction of flow. The branch streams are then recombined into a single composite stream by means of an outlet.

The inlet of the multiplier divides the incoming stream among the branch channels in such a way that the greater portion of each branch stream flows initially in a direction essentially parallel to the direction of flow of the inlet stream (i.e., along the z-axis) without first having to travel in a transverse direction (i.e., along the x- or y-axes). This maintains the integrity of the layers in the branch streams by avoiding transverse motions that might result in layer distortion.

In one embodiment, the cross sectional area of the branch channels remains essentially constant along the length of the branch channels. Thus, while the branch stream is stretched along the x-axis, it is simultaneously and proportionally contracted along the y-axis. However, other embodiments are contemplated wherein the branch streams are stretched or contracted, in a simultaneous or consecutive manner, and in one or more directions, so that the cross sectional area of the branch channels varies over a predetermined range. This variation of the cross sectional area may be linear or non-linear (i.e., quadratic), and may differ for each branch channel.

The point of divergence or split between any two branch channels is preferably sharpened on the interior of the inlet to avoid stagnation points within the multiplier, while providing efficient separation of the incoming stream. The position of the split is determined to achieve a desired resistance in each branch stream. Thus, the split can be positioned so that the flow of material is evenly distributed among the branch channels, or it can be positioned so that one channel receives a greater portion of the incoming stream than another. The inlet may optionally be fitted with switches, gates, or similar devices to allow the flow of material to be redirected or redistributed among the channels, or to permit the rate of flow of material into the inlet or into any branch channel to be adjusted to a desired rate.

The branch channels are preferably rectangular in cross section, and contain at least a first section that tapers outwardly along the x-axis in the direction of flow, and at least a second section, which may be the same or different from the first section, that tapers inwardly along the y-axis in the direction of flow. This construction causes the branch stream to be stretched along the x-axis and contracted along the y-axis as it proceeds through the branch channel.

In one embodiment, the branch channels are constructed so that the branch stream will be stretched from a width that is a fraction (i.e., ½) of the width of the inlet, to a width that is essentially equal to the width of the inlet, while being contracted from a height that is essentially equal to the height of the inlet, to a height that is a fraction (i.e., ½) of the height of the inlet. However, other embodiments are contemplated wherein the branch streams are stretched to a width that is greater than the width of the inlet.

In one embodiment, the multiplier is equipped with two branch channels, and the flow from the incoming stream is equally divided among the branch channels. Each layer in the branch streams is stretched to twice its original width along the x-axis, while simultaneously being reduced to half of its original height along the y-axis. The number of layers in the composite stream generated by the multiplier is twice the number of layers present in the incoming stream.

The volumetric flow rate of a Newtonian fluid as it passes through a channel is determined by the equation $$Q = (bh^3/12\,\mu L)\Delta P \qquad \text{(Formula I)}$$

where Q is the volumetric flow rate of a fluid through the channel, b is the width of the channel, h is the height of the channel, $\mu$ is the viscosity of the fluid, L is the path length of the fluid, and $\Delta P$ is the pressure drop across the path length. The behavior of most non-Newtonian fluids can be approximated to a fair degree of accuracy by this equation.

Hence, the volumetric flow rate of a fluid through a channel tends to be inversely proportional to the length of the path that the fluid travels through the channel.

However, the path lengths available to a fluid as it passes through a multiplier are not uniform. This results in a pressure differential across the width of each branch channel, and consequent variations in the flow rates of different portions of the fluid across a plane transverse to the direction of flow. The greatest flow rate will tend to occur along the path with the least resistance to flow, which will usually be the shortest path through the channel.

The uneven pressure drop across the width of the channels of the multiplier is compensated for in the present invention by varying the height of each channel across the width of a portion of the outlet. Since the flow resistance of a Newtonian liquid exhibits a cubic dependency on channel height, only small variations in the height are necessary to overcome the differences in volumetric flow rate associated with the side-to-side differences in path length.

The height of the outlet is varied in accordance with the formula $$h = |(12\,\mu QL)/(b\Delta P)|^{1/3} \qquad \text{(Formula II)}$$

wherein the constants and variables are defined as above. Of course, the shape required to compensate for uneven flow rates in a particular multiplier will depend on the overall configuration of the multiplier, and on the shape of the branch channels. However, one skilled in the art will appreciate how the shape of the outlet could be modified in accordance with the teachings of the present invention so as to achieve uniform flow rates through the outlet of a particular multiplier.

Proceeding in the direction of flow, the cross sectional shape of the outlet varies linearly from a first segment where the channel is rectangular in cross section to a second segment where the channel is trapezoidal in cross section to a third segment where the channel is once again rectangular in cross section. For multipliers of other configurations and branch channel shapes, a similar arrangement could be utilized wherein the outlet is varied, in a linear or nonlinear fashion, so that the second segment assumes other cross sectional shapes (e.g., elliptical, polygonal, or irregular).

As the separate branch streams pass through the third segment, they are joined together into a composite stream. No additional expansion transverse to the direction of flow occurs in the outlet. The branch streams flow parallel to each other in the third segment prior to being recombined into the composite stream. This establishes a fully developed flow in the composite stream, thereby eliminating components of velocity in directions other than the primary direction of flow which, if present, could cause interfacial disturbances in the layers of the composite stream and in films generated therefrom.

The heights of the individual branch channels at the point where they join together in the outlet are selected so that the average velocities of the branch streams are essentially identical and the path lines created at the interface are in the z-direction. This further minimizes rearrangement of the velocity profile in the composite stream after the branch streams have been combined, thereby avoiding interfacial disturbances of the layers.

While the above description sets forth the one embodiment of a multiplier useful in the process and apparatus of the present invention, many modifications are possible. Thus, while the multiplier is described with two branch channels, any number of branch channels may be used as are suitable for a given application. Various configurations are also possible for the multiplier. Thus, the resin stream may be expanded or contracted at more than one distinct location along the length of the branch channels. The resin stream may also be expanded to a multiple of its desired final width prior to entering the multiplier, in which case the branch channels may be used to divide the incoming stream into multiple branch streams of a desired width and height. These branch streams may optionally be further expanded or contracted. The resin stream may also be asymmetrically expanded or contracted at a point upstream from the multiplier, so that the flow rate of the resin stream exiting the multiplier is uniform even without any further correction of the flow rates.

Furthermore, while it is preferred that the branch stream in each branch channel is simultaneously expanded and contracted so that the ratio of the rates of expansion to contraction is essentially about 1:1, other embodiments are possible wherein the ratio of expansion to contraction is less than or greater than 1:1. The expansion to contraction ratio may also be varied over a given range along the length of a branch channel (i.e., from 0.5:1 to 1.5:1) in either a linear or nonlinear fashion. Thus, for example, the expansion to contraction ratio could be varied stepwise or quadratically along the length (i.e., along the z-axis) of the branch channel.

Processing aids, including processing oils, lubricants, or coatings, may also be used with the multiplier to prevent the resin stream from sticking to the interior surfaces of the multiplier, or to otherwise facilitate expansion or contraction of the resin stream. The multiplier may also be fitted with heating elements, such as electric resistor heaters or hot oil heaters, axial rod heater, and external insulation to maintain a desired temperature in the resin stream, and to provide for additional control over the volumetric flow profile, as will be described more fully below. The multiplier may further be fitted with screws or with other adjusting means as are known to the art for adjusting the cross-sectional shape of a branch channel or of any portion thereof.

In a preferred design of a multiplier, as shown in FIG. 4, the layer thickness distribution and uniformity needs of the optical films made in accordance with the method and apparatus of the present invention can frequently be better and more economically met by the use of multipliers which do not maintain rectangularity of cross-section in the flow channels used to re-stack the split streams. Because at least one of the flow channels used to re-stack the split streams necessarily contains non-linear streamlines, a pressure differential develops across the width of this channel as its length is traversed. The effect of this pressure differential across the width of a channel is to distort the layer thicknesses profile in the cross-web direction of the ultimately cast film.

Two remedies compensate for this effect. The first is to machine at least one of the split stream channels so that, as it proceeds from the point of the stream split to the point of re-stacking, it undergoes a transition from a rectangular cross-section to a trapezoidal cross-section, and back again to rectangular. This compensates for the width-wise pressure differential by narrowing the height of the flow channel on one side over much of its length. The second remedy is to machine at least one of the split stream channels so that, as it proceeds from the point of the stream split to the point of re-stacking, it undergoes a transition from a rectangular cross-section to a cross-section which bows outward at top and bottom of what would otherwise be a rectangle, and back again to rectangular. This has a similarly compensatory effect. Again, precise dimensions may be found by one reasonably skilled in the art, using reliable Theological data for the polymer in question and polymer flow simulation software known in the art, and must be calculated on a case-by-case basis. It will also be apparent that other variations to a rectangular cross-section, in addition to the trapezoid and bowed rectangle, are possible and anticipated by this disclosure.

Further, it will be apparent to one reasonably skilled in the art that the remedies described above can be applied to any number of the split stream channels in a given multiplier. Typically, for a multiplier which performs a two-fold splitting and re-stacking of the multilayer flow, the remedies above will be applied symmetrically to each of the two split stream channels. Alternatively, one of the two split stream flow channels may be designed to be essentially co-linear with the flow direction, and thus only the second split stream flow channel would require one or more of the remedies described above for non-linear streamlines and resultant pressure differentials. For a three-fold multiplier, the center split stream channel might typically be essentially co-linear with the flow direction, and thus likewise require no remedy for non-linear streamlines and resultant pressure differentials. Other configurations will be apparent to one skilled in the art.

Preferably, at the point where the split streams are re-stacked, their flow velocities will be matched by appropriately dimensioning their channels, and their flow streamlines will be parallel to each other and follow the original direction of flow. These considerations help to prevent disruption of layers at the point of re-stacking.

While this invention teaches the utility of square-, rectangular-, and slot-shaped channels in various parts of the feedblock-multiplier-die assembly, it is to be emphasized that sound viscous flow principles still demand that stagnation points be avoided in all flow channels whenever possible. For this reason, it is preferred that corners in flow channels be rounded whenever practical.

Each original portion of the multilayer stack that exits the feedblock manifold, excluding PBLs, is known as a packet. In a film for optical applications, each packet is designed to reflect, transmit, or polarize over a given band of wavelengths. More than one packet may be present as the multilayer stack leaves the feedblock. Thus, the film may be designed to provide optical performance over dual or multiple bands. These bands may be separate and distinct, or may be overlapping. Multiple packets may be made of the same or of different combinations of two or more polymers. Multiple packets in which each packet is made of the same two or more polymers may be made by constructing the feedblock and its gradient plate in such a way that one melt train for each polymer feeds all packets, or each packet may be fed by a separate set of melt trains. Packets designed to confer on the film other non-optical properties, such as physical properties, may also be combined with optical packets in a single multilayer feedblock stack.

An alternative to creating dual or multiple packets in the feedblock is to create them from one feedblock packet via the use of a multiplier with multiplier ratio greater than unity. Depending on the bandwidth of the original packet and the multiplier ratio, the resulting packets can be made to overlap in bandwidth or to leave between them a bandwidth gap. It will be evident to one skilled in the art that the best combination of feedblock and multiplier strategies for any given optical film objective will depend on many factors, and must be determined on an individual basis.

Prior to multiplication, additional layers can be added to the multilayer stack. These outer layers again perform as PBLs, this time within the multiplier. After multiplication and stacking, part of the PBL streams will form internal boundary layers between optical layers, while the rest will form skin layers. Thus the packets are separated by PBLs in this case. Additional PBLs may be added and additional multiplication steps may be accomplished prior to final feed into a forming unit such as a die. Prior to such feed, final additional layers may be added to the outside of the multilayer stack, whether or not multiplication has been performed, and whether or not PBLs have been added prior to said multiplication, if any. These will form final skin layers and the external portions of the earlier-applied PBLs will form sub-skins under these final skin layers. The die performs the additional compression and width spreading of the melt stream. Again, the die (including its internal manifold, pressure zones, etc.) is designed to create uniformity of the layer distribution across the web when the web exits the die.

While skin layers are frequently added to the multilayer stack to protect the thinner optical layers from the effects of wall stress and possible resulting flow instabilities, there may be other reasons as well to add a thick layer at the surface(s) of the film. Many will be apparent to those skilled in the art of film coextrusion, and these include surface properties such as adhesion, coatability, release, coefficient of friction, and the like, as well as barrier properties, weatherability, scratch and abrasion resistance, and others. In addition to these, surprisingly, in the case of films that are subsequently uniaxially or very unequally biaxially drawn, "splittiness", or the tendency to tear or fail easily along the more highly drawn direction, can be substantially suppressed via the choice of a skin layer polymer which both adheres well to the sub-skin or nearest optical layer polymer and also is less prone itself to orientation upon draw. Exemplary would be the use of a PEN copolymer (coPEN), with a comonomer content sufficient to suppress crystallinity and/or crystalline orientation, as skin layer(s) over an optical multilayer stack containing PEN homopolymer. Marked suppression of splittiness is observed in such a structure, compared to a similar film without the coPEN skin layer(s), when the films are highly drawn in one planar direction and undrawn or only slightly drawn in the orthogonal planar direction. One skilled in the art will be able to select similar skin layer polymers to complement other optical layer polymers and/or sub-skin polymers.

Temperature control is extremely important in the feedblock and subsequent flow leading to casting at the die lip. While temperature uniformity is often desired, in some cases deliberate temperature gradients in the feedblock or temperature differences of up to about 40° C. in the feed streams can be used to narrow or widen the stack layer thickness distribution. Feedstreams into the PBL or skin blocks can also be set at different temperatures than the feedblock average temperature. Often, these PBL or skin streams are set to be up to about 40° C. hotter to reduce viscosity or elasticity in these protective streams and thus enhance their effectiveness as protective layers. Sometimes, these streams may be decreased in temperature up to about 40° C. to improve the rheology matching between them and the rest of the flow stream. For example, decreasing the temperature of a low viscosity skin may enhance viscosity matching and enhance flow stability. Other times, elastic effects need to be matched.

Surprisingly, conventional means for heating the feedblock-multiplier-die assembly, namely, the use of insertion- or rod- or cartridge-type heaters fitted into bores in the assembly, are frequently incapable of providing the temperature control required for the optical films of the current invention. Preferably, heat is provided uniformly from outside the assembly by tiling its exterior with plate-type heaters, heat is retained uniformly by thoroughly insulating the entire assembly, or a combination of these two techniques is employed. While the use of insulation to control heat flow is not new, it is typically not done in the film extrusion industry due to concern over the possibility of leakage of polymer melt from the assembly onto the insulation. Because of the need to regulate layer flows very precisely, such leakage cannot be tolerated in the feedblock-multiplier-die assemblies used for films of the current invention. Thus, feedblocks, multipliers, and dies must be carefully designed, machined, assembled, connected, and maintained so as to prevent such polymer melt leakage, and insulation of the assembly becomes both feasible and preferred.

An insertion- or rod- or cartridge-type heater, having both a specific design and specific placement within the feedblock, is advantageous both for maintaining constant temperature in the feedblock, when this is preferred, and for creating a temperature gradient of up to about 40° C. as described above, when this is preferred. This heater, called an axial rod heater, consists of a heater placed in a bore through the feedblock oriented in a direction normal to the layer plane, preferably very near an imaginary line through the points where each side channel tube feeds a layer slot. More preferably, in the case of coextrusion of a first polymer and a second polymer, the bore for the axial rod heater will be located both near an imaginary line through the points where each side channel tube feeds a layer slot, and also equidistant from the side channel tubes carrying the first polymer and the side channel tubes carrying the second polymer. Further, the axial rod heater is preferably of a type that can provide a temperature gradient or a multiplicity of discrete temperatures along its length, either by variation in electrical resistance along its length, or by multi-zone control, or by other means known in the art. Such a heater, used in conjunction with the plate-type heaters described above, the insulation described above, or both, provides superior temperature control and/or uniformity to traditional means. Such superior control over layer thickness and gradient layer thickness distribution is especially important in controlling the positions and profiles of reflection bands as described in U.S. Pat. No. 6,157,490 (Wheatley et al.) titled "Optical Film with Sharpened Bandedge", the contents of which are incorporated herein by reference, and in the present specification.

Shear rate is observed to affect viscosity and other rheological properties, such as elasticity. Flow stability sometimes appears to improve by matching the relative shape of the viscosity (or other rheological function) versus shear rate curves of the coextruded polymers. In other words, minimization of maximal mismatch between such curves may be an appropriate objective for flow stability. Thus, temperature differences at various stages in the flow can help to balance shear or other flow rate differences over the course of that flow.

The web is cast onto a chill roll, sometimes also referred to as a casting wheel or casting drum. Preferably, this casting is assisted by electrostatic pinning, the details of which are well-known in the art of polyester film manufacture. For the multilayer optical films of the present invention, great care should be exercised in setting the parameters of the electrostatic pinning apparatus. Periodic cast web thickness variations along the extrusion direction of the film, frequently referred to as "pinning chatter", must be avoided to the extent possible. Adjustments to the current, voltage, pinning wire thickness, and pinning wire location with respect to the die and the casting chill roll are all known to have an affect, and must be set on a case-by case basis by one skilled in the art.

The web may attain a sidedness in surface texture, degree of crystallinity, or other properties due to wheel contact on one side and merely air contact on the other. This can be desirable in some applications and undesirable in others. When minimization of such sidedness differences is desired, a nip roll may be used in combination with the chill roll to enhance quenching or to provide smoothing onto what would otherwise be the air side of the cast web.

In some cases, it is important that one side of the multilayer stack be the side chosen for the superior quench that is attained on the chill roll side. For example, if the multilayer stack consists of a distribution of layer thicknesses, it is frequently desired to place the thinnest layers nearest the chill roll. This is discussed in detail in U.S. Pat. No. 5,976,424 (Weber et al.) titled "Method for Making Optical Films Having Thin Optical Layers", which is incorporated herein by reference.

In some cases, it is desired to provide the film with a surface roughness or surface texture to improve handling in winding and/or subsequent conversion and use. Many such instances will be known to one skilled in the art of film manufacture. A specific example germane to optical films of the present invention arises when such films are intended for use in intimate contact with a glass plate or a second film. In such cases, selective "wetting out" of the optical film onto the plate or second film can result in the phenomenon known as "Newton's Rings", which damages the uniformity of the optics over large areas. A textured or rough surface prevents the intimacy of contact required for wetting out and the appearance of Newton's Rings.

It is well-known in the polyester film art to include small amounts of fine particulate materials, often referred to as "slip agents", to provide such surface roughness or texture. This can be done in the optical films of the present invention. However, the inclusion of slip agent particulates introduces a small amount of haze and decreases the optical transmission of the film somewhat. In accordance with the present invention, Newton's Rings can be as or even more effectively prevented, without the introduction of haze, if surface roughness or texture is provided by contact with a micro-embossing roll during film casting. Preferably, the micro-embossing roll will serve as a nip roll to the casting wheel. Alternatively, the casting wheel itself may be micro-textured to provide a similar effect. Further, both a micro-textured casting wheel and a micro-textured nip roll may be used together to provide micro-embossed two-sided roughness or texture.

Further, it was surprisingly discovered by the present inventors that the use of a smooth nip roll at the casting chill roll, in addition to aiding quench at what would otherwise be the air side of the film, as already discussed above, can also significant reduce the magnitude of die lines, pinning chatter, and other thickness fluctuations. The web may be cast to a uniform thickness across the web or a deliberate profiling of the web thickness may be induced using die lip controls. Such profiles may improve uniformity by the end of the film process. In other cases, a uniform cast thickness provides best uniformity at the end of the film process. Controlling vibrations in the process equipment is also important to reduce "chatter" in the cast multilayer web.

Residence times in the various process stages may also be important even at a fixed shear rate. For example, interdiffusion between layers can be altered and controlled by adjusting residence times. Interdiffusion here refers to all mingling and reactive processes between materials of the individual layers including, for example, various molecular motions such as normal diffusion, cross-linking reactions, or transesterification reactions. Sufficient interdiffusion is desirable to ensure good interlayer adhesion and prevent delamination. However, too much interdiffusion can lead to deleterious effects, such as the substantial loss of compositional distinctness between layers. Interdiffusion can also result in copolymerization or mixing between layers, which may reduce the ability of a layer to be oriented when drawn. The scale of residence time on which such deleterious interdiffusion occurs is often much larger (e.g., by an order of magnitude) than that required to achieve good interlayer adhesion, thus the residence time can be optimized. However, some large scale interdiffusion may be useful in profiling the interlayer compositions, for example to make rugate structures.

The effects of interdiffusion can also be altered by further layer compression. Thus, the effect at a given residence time is also a function of the state of layer compression during that interval relative to the final layer compression ratio. As thinner layers are more susceptible to interdiffusion, they are typically placed closest to the casting wheel for maximal quenching.

Finally, it was unexpectedly discovered by the present inventors that interdiffusion can be enhanced after the multilayer film has been cast, quenched, and drawn, via heat setting at an elevated temperature. Heat setting is normally done in the tenter oven in a zone subsequent to the transverse drawing zone. Normally, for polyester films, the heat setting temperature is chosen to maximize crystallization rate and optimize dimensional stability properties. This temperature is normally chosen to be between the glass transition and melting temperatures, and not very near either temperature. Selection of a heat set temperature closer to the melting point of the lowest-melting polymer among those polymers in the multilayer film which are desired to maintain orientation in the final state results in a marked improvement in interlayer adhesion. This is unexpected due to the short residence times involved in heat setting on line, and the non-molten nature of the polymers at this process stage. Further, while off-line heat treatments of much longer duration are known to improve interlayer adhesion in multilayer films, these treatments also tend to degrade other properties, such as modulus or film flatness, which was not observed with on-line elevated-temperature heat setting treatments.

Conditions at the casting wheel are set according to the desired result. Quenching temperatures must be cold enough to limit haze when optical clarity is desired. For polyesters, typical casting temperatures range between 10° C. and 60° C. The higher portion of the range may be used in conjunction with smoothing or embossing rolls while the lower portion leads to more effective quenching of thick webs. The speed of the casting wheel may also be used to control quench and layer thickness. For example, extruder pumping rates may be slowed to reduce shear rates or increase interdiffusion while the casting wheel is increased in speed to maintain the desired cast web thickness. The cast web thickness is chosen so that the final layer thickness distribution covers the desired spectral band at the end of all drawing with concomitant thickness reductions.

The multilayer web is drawn to produce the final multilayer optical film. A principal reason for drawing is to increase the optical power of the final optical stack by inducing birefringence in one or more of the material layers. Typically, at least one material becomes birefringent under draw. This birefringence results from the molecular orientation of the material under the chosen draw process. Often this birefringence greatly increases with the nucleation and growth of crystals induced by the stress or strain of the draw process (e.g. stress-induced crystallization). Crystallinity suppresses the molecular relaxation which would inhibit the development of birefringence, and crystals may themselves also orient with the draw. Sometimes, some or all of the crystals may be pre-existing or induced by casting or preheating prior to draw. Other reasons to draw the optical film may include, but are not limited to, increasing throughput and improving the mechanical properties in the film.

In one typical method for making a multilayer optical polarizer, a single drawing step is used. This process may be performed in a tenter or a length orienter. Typical tenters draw transversely (TD) to the web path, although certain tenters are equipped with mechanisms to draw or relax (shrink) the film dimensionally in the web path or machine direction (MD). Thus, in this typical method, a film is drawn in one in-plane direction. The second in-plane dimension is either held constant as in a conventional tenter, or is allowed to neck in to a smaller width as in a length orienter. Such necking in may be substantial and increases with draw ratio. For an elastic, incompressible web, the final width may be estimated theoretically as the reciprocal of the square root of the lengthwise draw ratio times the initial width. In this theoretical case, the thickness also decreases by this same proportion. In practice, such necking may produce somewhat wider than theoretical widths, in which case the thickness of the web may decrease to maintain approximate volume conservation. However, since volume is not necessarily conserved, deviations from this description are possible.

In one typical method for making a multilayer mirror, a two step drawing process is used to orient the birefringent material in both in-plane directions. The draw processes may be any combination of the single step processes described that allow drawing in two in-plane directions. In addition, a tenter that allows drawing along MD, e.g. a biaxial tenter which can draw in two directions sequentially or simultaneously, may be used. In this latter case, a single biaxial draw process may be used.

In still another method for making a multilayer polarizer, a multiple drawing process is used that exploits the different behavior of the various materials to the individual drawing steps to make the different layers comprising the different materials within a single coextruded multilayer film possess different degrees and types of orientation relative to each other. Mirrors can also be formed in this manner. Such optical films and processes are described further in U.S. Pat. No. 6,179,948 (Merrill et al.) titled "An Optical Film and Process for Manufacture Thereof", which is hereby incorporated by reference.

Drawing conditions for multilayer optical polarizer films are often chosen so that a first material becomes highly birefringent in-plane after draw. A birefringent material may be used as the second material. If the second material has the same sense of birefringence as the first (e.g. both materials are positively birefringent), then it is usually preferred to chose the second material so that is remains essentially isotropic. In other embodiments, the second material is chosen with a birefringence opposite in sense to the first material when drawn (e.g. if the first material is positively birefringent, the second material is negatively birefringent). For a positively birefringent first material, the direction of highest in-plane refractive index, the first in-plane direction, coincides with the draw direction, while the direction of lowest in-plane refractive index for the first material, the second in-plane direction, is perpendicular to this direction. Similarly, for multilayer mirror films, a first material is chosen to have large out-of-plane birefringence, so that the in-plane refractive indices are both higher than the initial isotropic value in the case of a positively birefringent material (or lower in the case of a negatively birefringent material). In the mirror case, it is often preferred that the in-plane birefringence is small so that the reflections are similar for both polarization states, i.e., a balanced mirror. The second material for the mirror case is then chosen to be isotropic, or birefringent in the opposite sense, in similar fashion to the polarizer case.

In another embodiment of multilayer optical films, polarizers may be made via a biaxial process. In still another embodiment, balanced mirrors may be made by a process that creates two or more materials of significant in-plane birefringence and thus in-plane asymmetry such that the asymmetries match to form a balanced result, e.g. nearly equal refractive index differences in both principal in-plane directions.

In certain processes, rotation of these axes can occur due to the effects of process conditions including tension changes down web. This is sometimes referred to as "bowforward" or "bowback" in film made on conventional tenters. Uniform directionality of the optical axes is usually desirable for enhanced yield and performance. Processes that limit such bowing and rotation, such as tension control or isolation via mechanical or thermal methods, may be used.

Frequently, it is observed that drawing film transverse to the machine direction in a tenter is non-uniform, with thickness, orientation, or both changing as one approaches the gripped edges of the web. Typically, these changes are consistent with the assumption of a cooler web temperature near the gripped edges than in the web center. The result of such non-uniformity can be a serious reduction in usable width of the finished film. This restriction can be even more severe for the optical films of the present invention, as very small differences in film thickness can result in non-uniformity of optical properties across the web. Drawing, thickness, and color uniformity, as recognized by the present inventors, can be improved by the use of infrared heaters to additionally heat the edges of the film web near the tenter grippers. Such infrared heaters can be used before the tenter's preheat zone, in the preheat zone, in the stretch zone, or in a combination of locations. One skilled in the art will appreciate the many options for zoning and controlling the addition of infrared heat. Further, the possibilities for combining infrared edge heating with changes in the cast web crossweb thickness profile will also be apparent.

For certain of the multilayer optical films of the current invention, it is critical to draw the film in such a way that one or more properties, measured on the finished films, have identical values in the machine and transverse directions. Such films are often referred to as "balanced" films. Machine- and transverse-direction balance may be achieved by selecting process conditions via techniques well-known in the art of biaxially-oriented film-making. Typically, process parameters explored include machine-direction orientation preheat temperature, stretch temperature, and draw ratio, tenter preheat temperature, stretch temperature, and draw ratio, and, sometimes, parameters related to the post-stretching zones of the tenter. Other parameters may also be significant. Typically, designed experiments are performed and analyzed to arrive at appropriate combinations of conditions. Those skilled in the art will appreciate the need to perform such an assessment individually for each film construction and each film line on which it is to be made.

Similarly, parameters of dimensional stability, such as shrinkage at elevated temperature and reversible coefficient of thermal expansion, are affected by a variety of process conditions, similarly to the case for conventional films known in the art. Such parameters include, but are not limited to, heat set temperature, heat set duration, transverse direction dimensional relaxation ("toe-in") during heat set, web cooling, web tension, and heat "soaking" (or annealing) after winding into rolls. Again, designed experiments can be performed by one skilled in the art to determine optimum conditions for a given set of dimensional stability requirements for a given film composition run on a given film line.

In general, multilayer flow stability is achieved by matching or balancing the rheological properties, such as viscosity and elasticity, between the first and second materials to within a certain tolerance. The level of required tolerance or balance also depends on the materials selected for the PBL and skin layers. In many cases, it is desirable to use one or more of the optical stack materials individually in the various PBL or skin layers. For polyesters, the typical ratio between high and low viscosity materials is no more than 4:1, preferably no more than 2:1, and most preferably no more than 1.5:1 for the process conditions typical of feedblocks, multipliers, and dies. Using the lower viscosity optical stack material in the PBL and skin layers usually enhances flow stability. More latitude in the requirements for a second material to be used with a given first material is often gained by choosing additional materials for these PBL and skin additional layers. Often, the viscosity requirements of these third materials are then balanced with the effective average viscosities of the multilayer stack comprising the first and second materials. Typically, the viscosity of the PBL and skin layers should be lower than this stack average for maximal stability. If the process window of stability is large, higher viscosity materials can be used in these additional layers, for example, to prevent sticking to rollers downstream of casting in a length orienter.

Draw compatibility means that the second material can undergo the draw processing needed to achieve the desired birefringence in the first material without causing deleterious effects to the multilayer, such as breakage, or voiding or stress whitening, which cause undesired optical effects. This usually requires that the glass transition temperature of the second material be no more than 40° C. higher than that of the first. This limitation can be ameliorated by either very fast drawing rates that make the orientation process for the first material effective even at higher temperatures, or by crystallization or cross-linking phenomena that also enhance the orientation of the first material at such higher temperatures. Also, draw compatibility requires that the second material can achieve the desired optical state at the end of processing, whether this is an essentially isotropic refractive index or a highly birefringent state.

In the case of a second material which is to remain isotropic after final processing, at least three methods of material selection and processing can be used to meet this second requirement for draw compatibility. First, the second material can be inherently non-birefringent, such as polymethylmethacrylate. In this case, the polymer remains optically isotropic as measured by refractive index even if there is substantial molecular orientation after drawing. Second, a second material can be chosen that will remain unoriented at the draw conditions of the first material, even though it could be made birefringent if drawn under different conditions. Third, the second material can orient during the draw process provided it may lose the orientation so gained in a subsequent process, such as a heat-setting step. In the case of multiple drawing schemes in which the final desired film contains more than one highly birefringent material (e.g. a polarizer made in certain biaxial drawing schemes), draw compatibility may not require any of these methods. Alternatively, the third method may be applied to achieve isotropy after a given drawing step, or any of these methods may be used for third or further materials.

Draw conditions can also be chosen to take advantage of the different visco-elastic characteristics of the first and second optical materials as well as any materials used in the skin and PBL layers, such that the first material becomes highly oriented during draw while the second remains unoriented or only slightly oriented after draw according to the second scheme described above. Visco-elasticity is a fundamental characteristic of polymers. The visco-elasticity characteristics of a polymer may be used to describe its tendency to react to strain like a viscous liquid or an elastic solid. At high temperatures and/or low strain rates, polymers tend to flow when drawn like a viscous liquid with little or no molecular orientation. At low temperatures and/or high strain rates, polymers tend to draw elastically like solids with concomitant molecular orientation. A low temperature process is typically considered to be a process taking place near the glass transition temperature of the polymeric material while a high temperature process takes place substantially above the glass temperature.

Visco-elastic behavior is generally the result of the rate of molecular relaxation in a polymeric material. In general, molecular relaxation is the result of numerous molecular mechanisms, many of which are molecular weight dependent; thus, polydisperse polymeric materials have a distribution of relaxation times, with each molecular weight fraction in the polydisperse polymer having its own longest relaxation time. The rate of molecular relaxation can be characterized by an average longest overall relaxation time (i.e., overall molecular rearrangement) or a distribution of such times. The precise numerical value for the average longest relaxation time for a given distribution is a function of how the various times in the distribution are weighted in the average. The average longest relaxation time typically increases with decreasing temperature and becomes very large near the glass transition temperature. The average longest relaxation time can also be increased by crystallization and/or crosslinking in the polymeric material which, for practical purposes, inhibits any relaxation under process times and temperatures typically used. Molecular weight and distribution, as well as chemical composition and structure (e.g., branching), can also effect the longest relaxation time.

The choice of resin strongly effects the characteristic relaxation time. Average molecular weight, MW, is a particularly significant factor. For a given composition, the characteristic time tends to increase as a function of molecular weight (typically as the 3 to 3.5 power of molecular weight) for polymers whose molecular weight is well above the entanglement threshold. For unentangled polymers, the characteristic time tends to increase as a weaker function of molecular weight. Since polymers below this threshold tend to be brittle when below their glass transition temperatures and are usually undesirable, they are not the principal focus here; however, certain lower molecular materials may be used in combination with layers of higher molecular weight as could low molecular weight rubbery materials above the glass transition, e.g. an elastomeric or tacky layer. Inherent or intrinsic viscosity, IV, rather than average molecular weight, is usually measured in practice. The IV varies as $MW^\alpha$ where $\alpha$ is the solvent dependent Mark-Houwink exponent. The exponent $\alpha$ increases with solubility of the polymer. Typical example values of $\alpha$ might be 0.62 for PEN (polyethylene naphthalate) and 0.68 for PET (polyethylene terephthalate), both measured in solutions of 60:40 Phenol: ortho-Dichlorobenzene, with intermediate values for a copolymer of the two (e.g., coPEN). PBT (polybutylene terephthalate) would be expected to have a still larger value of $\alpha$ than PET, as would polyesters of longer alkane glycols (e.g. hexane diol) assuming improved solubility in the chosen solvent. For a given polymer, better solvents would have higher exponents than those quoted here. Thus, the characteristic time is expected to vary as a power law with IV, with its power exponent between $3/\alpha$ and $3.5/\alpha$. For example, a 20% increase in IV of a PEN resin is expected to increase the effective characteristic time, and thus the Weissenberg Number (as defined below) and the effective strength of the drawing flow, at a given process temperature and strain rate by a factor of approximately 2.4 to 2.8. Since a lower IV resin will experience a weaker flow, relatively lower IV resins are preferred in the present invention for the case of a second polymer of desired low final birefringence, and higher IV resins are preferable for the stronger flows required of the first polymer of high birefringence. The limits of practice are determined by brittleness on the low IV end and by the need to have adequate Theological compatibility during the coextrusion. In other embodiments, in which strong flows and high birefringence are desired in both a first and second material, higher IV may be desired for both materials. Other processing considerations such as upstream pressure drops as might be found in the melt stream filters can also become important.

The severity of a strain rate profile can be characterized in a first approximation by a Weissenberg number (Ws) which is the product of the strain rate and the average longest relaxation time for a given material. The threshold Ws value between weak and strong draw (below which, and above which, the material remains isotropic, or experiences strong orientation, crystallization and high birefringence, respectively) depends on the exact definition of this average longest relaxation time as an average of the longest relaxation times in the polydisperse polymeric material. It will be appreciated that the response of a given material can be altered by controlling the drawing temperature, rate and ratio of the process. A process which occurs in a short enough time and/or at a cold enough temperature to induce substantial molecular orientation is an orienting or strong draw process. A process which occurs over a long enough period and/or at hot enough temperatures such that little or no molecular orientation occurs is a non-orienting or weak process.

Another critical issue is the duration of the draw process. Strong draw processes typically need enough duration (that is, a high enough draw ratio) to accomplish sufficient orientation, e.g. to exceed the threshold for strain-induced crystallization, thereby achieving high birefringence in the first material. Thus, the strain rate history profile, which is the collection of the instantaneous strain rates over the course of the drawing sequence, is a key element of the draw process. The accumulation of the instantaneous strain rates over the entire draw process determines the final draw ratio. The temperature and strain rate draw profile history determine the draw ratio at which the first polymer experiences the onset of strain-induced crystallization, given the characteristic time and supercooling of that polymer. Typically, this onset draw ratio decreases with increasing Ws. For PET, experimental evidence suggests this onset draw ratio has a limit between 1.5 and 2 at very high rates of strain. At lower rates of strain, the onset draw ratio for PET can be over 3. The final level of orientation often correlates with the ratio of the final draw ratio to the onset draw ratio.

Temperature has a major effect on the characteristic average longest relaxation time of the material, and is thus a major factor in determining whether a given material experiences a weak or strong flow. The dependence of the characteristic time on temperature can be quantified by the well known WLF equation [cf. J. D. Ferry, Viscoelastic Properties of Polymers, John Wiley & Sons, New York, 1970]. This equation contains three parameters, $c_1$, $c_2$ and $T_0$. Often, $T_0$ is associated with the glass transition temperature, $T_g$. Using the approximate "universal" values for $c_1$ and $c_2$, applicable as a first estimate for many polymers, the WLF equation shows the large dependence on relaxation times with temperature. For example, using a relaxation time at 5° C. higher than the $T_g$ as a value for comparison, the relaxation times at 10° C., 15° C., and 20° C. higher than $T_g$ are approximately 20, 250 and 2000 times shorter, respectively. Greater accuracy for WLF parameters can be obtained by using empirical curve fitting techniques for a particular class of polymers, e.g. polyesters. Thus, to a first approximation, the single most important parameter for temperature effects on the characteristic time is $T_g$. The larger the temperature difference between the web temperature and $T_g$, the smaller the characteristic time and thus the weaker the draw flow. Further, it is reiterated that this discussion is most pertinent to the draw process prior to crystallization, especially strain induced crystallization. After crystallization occurs, the presence of crystals can further retard relaxation times and convert otherwise weak flows to strong flows.

By selecting the materials and process conditions in consideration of the orienting/non-orienting response of the materials to the process, a film may be constructed such that the first material is oriented and birefringent and the second material is essentially unoriented, i.e., the process is a strong draw process for the first material and a weak draw process for the second material. As an example of strong and weak flows, let us consider PEN of approximately 0.48 IV, an initial draw rate of about 15% per second, and a uniaxial draw profile that increases the draw ratio in a linear manner to a final draw ratio of 6.0. At a web temperature of about 155° C., PEN experiences weak flow that leaves it in a state of low birefringence. At 135° C., PEN experiences a strong flow that makes it highly birefringent. The degree of orientation and crystallization increases in this strong flow regime as the temperature drops further. These values are for illustration only and should not be taken as the limiting values of these regimes.

More general ranges for material selection can be understood by considering the more general case of polyesters. For PET, approximate values for the WLF parameters can be taken as $c_1$=11.5, $c_2$=55.2 and $T_0$=$T_g$+4° C.=80° C. These values are for purposes of illustration only, it being understood that empirical determination of these constants may give somewhat varying results For example, alternate values using the "universal" values of $c_1$=17.7 and $c_2$=51.6, and using $T_0$=85° C., have been proposed. At a temperature 20° C. above the glass transition, the effect of a 5° C. increase/decrease in temperature is to decrease/increase the characteristic time and Ws by a factor of four. At 10° C. above the glass transition, the effect is much stronger, about a factor of ten. For PEN, $T_0$ is estimated as approximately 127° C. For DMI-based polyester (e.g. PEI), $T_0$ is estimated as about 64°

C. For PBT, To is estimated as about 19° C. The glass transition of a polyester with some higher alkane glycol such as hexane diol might be expected, based on these example WLF values, to have a 1° C. decrease in glass transition for every 1% replacement of ethylene glycol. For coPEN, the glass transition can be estimated using the so-called Fox equation. The reciprocal of the coPEN glass transition temperature (in absolute degrees) is equal to the linear, compositionally weighted average of its component reciprocal glass transition temperatures (in absolute degrees). Therefore, a coPEN of 70% naphthalene dicarboxylate (NDC) and 30% dimethylterephthalate (DMT) would have an estimated glass transition of 107.6° C., assuming glass transitions for PEN and PET of 123° C. and 76° C., respectively. Likewise, a coPEN of 70% NDC and 30% DMI would have a glass transition around 102° C. Roughly, the latter coPEN would be expected to experience a weak flow at a temperature 20° C. lower than that required for weak flow for PEN, under the same conditions. Thus, at web temperatures of 135° C., coPEN is weakly oriented and PEN is strongly oriented under the process conditions cited. This particular choice of resins has been previously cited as one example of a preferred embodiment for multilayer reflective polarizers in WO 95/17303.

The temperature effects the strength of the flow secondarily by altering the rate of nucleation and crystal growth. In the undrawn state, there is a temperature of maximum crystallization rate. Rates are slowed below this temperature due to much slower molecular motions as characterized by the relaxation times. Above this temperature, the rates are slowed by the decrease in the degree of supercooling (the melting temperature minus the process temperature), which is related to the thermodynamic driving force for crystallization. If the draw is fast and the temperature is near Tg, the onset of strain induced crystallization may be enhanced (making the draw still stronger) by raising the temperature, because little additional relaxation occurs at the higher temperature but nucleation and growth can be accelerated. If the temperature of draw is near the melting point, raising the draw temperature and thus decreasing the degree of supercooling may decrease the rate of strain-induced crystallization, delaying the onset of such crystallization and thereby making the flow effectively weaker. A material can be deliberately designed to have a low melting point and thus little or no supercooling. Copolymers are known to have a much reduced melting point due to the impurity effect of the additional monomer. This can be used effectively to maintain the second polymer in a state of low orientation.

The aforementioned effect of melting point can also be used to accomplish the third method for obtaining draw compatibility in the case of a second material with desired isotropy. Alternatively, this may be used after a drawing step during a multiple drawing process to achieve isotropy in one or more of the materials. Drawing processes that are strong for both the first and second material may be used as long as the effects of that draw can be eliminated in the second polymer in a subsequent step. For example, a heat setting step can be used to accomplish relaxation of an oriented, but still amorphous, second polymer. Likewise, a heat setting step can be used to melt an oriented and crystallized second polymer, as long as it is adequately quenched.

Heat setting can also be useful in improving other properties, such as dimensional stability (with regard to both temperature and humidity) and interlayer adhesion. Finally, tension conditions at quenching, prior to winding, can also affect physical properties, such as shrinkage. Reduced winding tension and reduced cross web tension via a toe in (reduction in transverse draw ratio) can reduce shrinkage in a variety of multilayer optical films. Post-winding heat treatment of film rolls can also be used to improve dimensional stability and reduce shrinkage.

In general, the birefringence of a polymer experiencing a strong flow deformation tends to increase with the draw ratio. Because of strain-induced crystallization, for a given draw process there may be a critical draw ratio at which this birefringence begins to increase more dramatically. After onset of crystallization, the slope may again change (e.g. drop) due to changes in the relative amount of continued nucleation and growth with further drawing. For multilayer optical films of the present invention, this increase in the birefringence of at least one of the polymers leads to an increase in the reflection of light of wavelengths appropriate to the layer thicknesses of the multilayer stack, and this reflective power also tends to increase in relative measure to the orientation.

On the other hand, adhesion between layers in the multilayer stack is often adversely affected by drawing, with stretched films frequently being much more prone to exfoliation of layers than the cast webs from which they were made. Surprisingly, this decrease in interlayer adhesion, as discovered by the present inventors, may also experience a critical point under some process/material combinations so that the majority of the decrease happens relatively abruptly as a specific draw ratio is exceeded. This critical change need not correlate with changes in the birefringence. In other cases, the behavior can be non-linear but not necessarily abrupt. The existence and value of this critical draw ratio is likely a complex function of the polymers involved and a host of other process conditions, and needs to be determined on a case-by-case basis. Clearly, the trade-off between high optical extinction and high interlayer adhesion with respect to draw ratio will be dominated by the existence and location of an abrupt transition or other functional form, e.g. with the optimal draw ratio for a given film likely to be selected from the maximum possible draw ratio and the draw ratio just below the abrupt interlayer adhesion transition.

There are other process trade-offs that may be apparent for particular resin system choices. For instance, in certain systems, higher draw ratio may also result in higher off-angle color. Increased off-angle color can result from an increase in the z-index (the out-of-plane index) interlayer mismatch due to the lowering of the z-index of refraction of the first material (such as PEN), while the second material z-index remains nearly constant. The drop in z-indices in aromatic polyesters may be related to the planarization of the crystals within the film, which causes the planes of the aromatic rings to tend to lie in the plane of the film. Such trade-offs may sometimes be avoided by altering the selection of resin pairs. For example, reducing the level of crystallinity while maintaining a given level of orientation may improve both interlayer adhesion and off-angle color without reducing extinction power, as long as the difference between the refractive index of the in-plane draw direction and the in-plane non-drawn direction remains about the same. This latter condition can be met by using high NDC content coPENs as the first polymer. The lower melting points of these polymers suggest that lower levels of crystallinity would be obtained at the same level of orientation, allowing extinction to be maintained while decreasing off-angle color and possibly increasing interlayer adhesion. It will be appreciated that similar process considerations would pertain to additional materials, such as those to be used in the skin and/or PBLs. If these materials are to be isotropic, thus avoiding polarization retardation from thick birefringent layers, they should be chosen in accord with the requirements of a second polymer with desired isotropy.

Finally, the need for careful control and uniformity of process conditions should be appreciated to form high quality optical films in accordance with the present invention. Draw uniformity is strongly influenced by temperature, and thus uniform temperature is typically desired for a uniform film. Likewise, caliper (thickness) and compositional uniformity is also desirable. One preferred method to obtain uniformity is to cast a flat uniform film which is then uniformly drawn to make a uniform final film. Often, final film properties are more uniform (in off-angle color, for example) and better (e.g. interlayer adhesion) under such processes. Under certain circumstances, cast thickness profiling can be used to compensate for uneven drawing to produce a final film of uniform caliper. In addition, infrared edge heating, discussed above, can be used in conjunction with cast thickness profiling.

C2. Color Uniformity

As noted in the Background section, multilayer films and other optical devices made in accordance with the present invention can be made so as to exhibit a degree of physical and optical uniformity over a large area that far exceeds that accessible with prior art films. In accordance with the method of the invention, the distortions of layer thickness and optical caliper encountered in prior art cast (not drawn) films is avoided by biaxially stretching the cast web by a factor of between about 2×2 and about 6×6, and preferably about 4×4, which tends to make the lateral layer thickness variations, and therefore the color variations, much less abrupt. Furthermore, because the film is made by stretching a cast web (as opposed to casting a finished film directly without stretching), the narrower cast web thus required allows for the possibility of fewer distortions of the layer thickness distribution in the extrusion die because of significantly less layer spreading occurring in the narrower die.

Many other process considerations, discussed in the sections above and intended to improve layer thickness uniformity, also improve the color uniformity, as color depends directly on layer thickness. These include, but are not limited to, multilayer resin system rheological matching, filtration, feedblock design, multiplier design, die design, PBL and skin layer selection, temperature control, electrostatic pinning parameters, use of web thickness variation scanning devices, use of a casting nip roll, vibration control, and web edge heating in the tenter.

Errors in extrusion equipment design and machining, and in the extrusion controls, will lead to both systematic and random thickness errors. For uniform color films in general, the random errors can lead to both down web and cross web variations in color, and the systematic errors, although not changing, will affect both the overall color of the film and the crossweb color variation.

Both random and systematic errors can occur for the overall film caliper as well as for individual layers. Overall film caliper errors are most easily detected and monitored via the optical transmission or reflectance spectra. Thus, an on-line spectrophotometer can be set up to measure the spectral transmission of the film as it comes off the line, thereby providing the necessary information to measure color uniformity and provide feedback for process controls. Individual layer errors may or may not affect the perceived color, depending mostly on where they are in the optical stack and on the magnitude of the errors.

Systematic errors are repeatable deviations from the design thickness for any or all layers in the stack. They can occur because of design approximations inherent in the polymer flow model used to design the multipliers and feedblock, or because of machining errors in the feedblock and die. These errors can be eliminated by redesign and re-machining until the errors are reduced to design criteria. These errors can also be reduced by machining a feedblock that will produce the required number of layers in the optical film without resort to a multiplier.

Random errors can be caused by fluctuations in feedblock and die zone temperatures, resin inhomogeneity, improper control of melt temperatures through the melt train which selectively degrade parts of the melt stream, contamination of the feedblock or die due to degraded or burnt resin, process control errors such as melt pressure, temperature and pumping rate variations, and hydrodynamic flow instabilities. The flow modeling should provide input to the feedblock and die designs in order to avoid conditions that could cause such flow instabilities.

Overall thickness uniformity is affected by die design, casting wheel speed fluctuations, system vibrations, die gap control, electrostatic pinning, and film stretching conditions. These variations can be either random or systematic. Systematic errors do not necessarily give a constant (e.g., unchanging) color. For example, vibrations of the die or casting wheel can cause a repeating spatial color variation with a periodicity on the order of 0.5 to 50 cm. In certain applications such as decorative film, where a periodic spatial color variation may be desirable in the finished film, controlled periodic vibrations may be intentionally imparted to the casting wheel. However, where color uniformity is desired and good thickness control is essential, the casting wheel is fitted with a direct drive motor (e.g., no gear reduction). One example of such a motor is a D.C. brush servo motor, such as part number TT-10051A, available commercially from Kollmorgan. Higher speed motors with gear reduction can be used, but a high quality system with proper electrical tuning and a smooth gearbox is essential. System vibrations, particularly of the die relative to the casting wheel, can be minimized by placing the casting station on concrete pads on the ground floor of the casting installation. Other means of dampening or isolation will be apparent to one skilled in the mechanical arts.

The sources of vibrations can be identified with the help of a web thickness variation scanning device. If the period of an oscillation can be identified from the output of such a device, a search may be made for process elements, or even extraneous sources, which exhibit oscillatory behavior of identical period. These units can then be made more rigid, vibration-damped, or vibration-isolated from the die and casting wheel by methods known in the art, or may simply be turned off or relocated if not essential to the process. Hence, a vibration identified by periodicity as being due to the rotation of the extruder screw could be isolated, for example, by the use of a damping material between the extruder gate and the neck tube, while a vibration identified by periodicity as being due to a room fan could be removed by turning off or relocating the fan. In addition, a vibration of the die or casting station which cannot be totally eliminated can be prevented from resulting in vibratory relative motion between the die and casting station by mechanically linking the die to the casting station via some form of rigid superstructure. Many designs for such a vibration-communicating mechanical linkage will be apparent. Furthermore, when strain hardening materials are employed in the film, stretching should be performed at sufficiently low temperatures to produce a uniform stretch across the web, and the pinning wire should be rigidly mounted.

Additional control over layer thickness and optical caliper is achieved through the use of a precision casting wheel drive mechanism having a constant rotation speed. The casting wheel is designed and operated such that it is free of vibrations that would otherwise cause web thickness "chatter" and subsequent layer thickness variations in the downweb direction. Applicants have found that those vibrations which produce a relative motion between the die and casting wheel result in effective speed variations in the casting wheel as it draws out the extrudate coming from the die. These speed variations cause modulations in film caliper and optical layer thickness that are particularly pronounced in the strain-hardening materials advantageously employed in making the optical films of the present invention, resulting in color variations across the surface of the film. Accordingly, absent these controls at the casting wheel, the normal vibrations encountered in the extrusion process are sufficient to noticeably diminish color uniformity in the optical films of the present invention. The methods of the present invention have allowed the production, for the first time, of color shifting films made from polymeric materials which have a high degree of color uniformity at any particular viewing angle. Thus, films may be made in accordance with the method of the present invention in which the desired bandwidth of light transmitted or reflected at a particular angle of incidence varies by less than about 1 or 2 nm over an area of at least 10 $cm^2$, and more preferably, at least 100 $cm^2$, and in which the wavelength values of the bandedges of the spectral reflectance peaks vary in wavelength by less than about +/−4 nm over the same area.

The improvement in color uniformity possible with the method of the present invention is illustrated via several examples which allow a comparison of the films of the present invention with that of the prior art.

EXAMPLE C2-1

The following example illustrates the color uniformity of some popular commercially available color films.

A sample of commercially available optical film (8631 red/green) was obtained from the Mearl Corporation. The film was iridescent in appearance (e.g., randomly shaped, adjacent areas on the film change to dissimilar colors as viewing angle is changed, giving the film an "oil on water" appearance). The color contours within the film gave it a wood grain appearance similar to a color coded topographical map of a hilly terrain.

A transmission spectrum of the film was taken over visible wavelengths using an Oriel "Instaspec" diode array. The spectra were each taken at normal incidence, although similar spectra are observed at other angles of incidence. The spectra were taken at 0.5 inch intervals in the cross-web direction, starting at 0.5 inches from one end of the film sample. Given its small size, it is likely that the sample itself was likely cut from a much larger web of material. Since each of these spectra would be identical for a film exhibiting perfect color uniformity, the spectral variations are an indication of variations in color uniformity.

Figure 15:
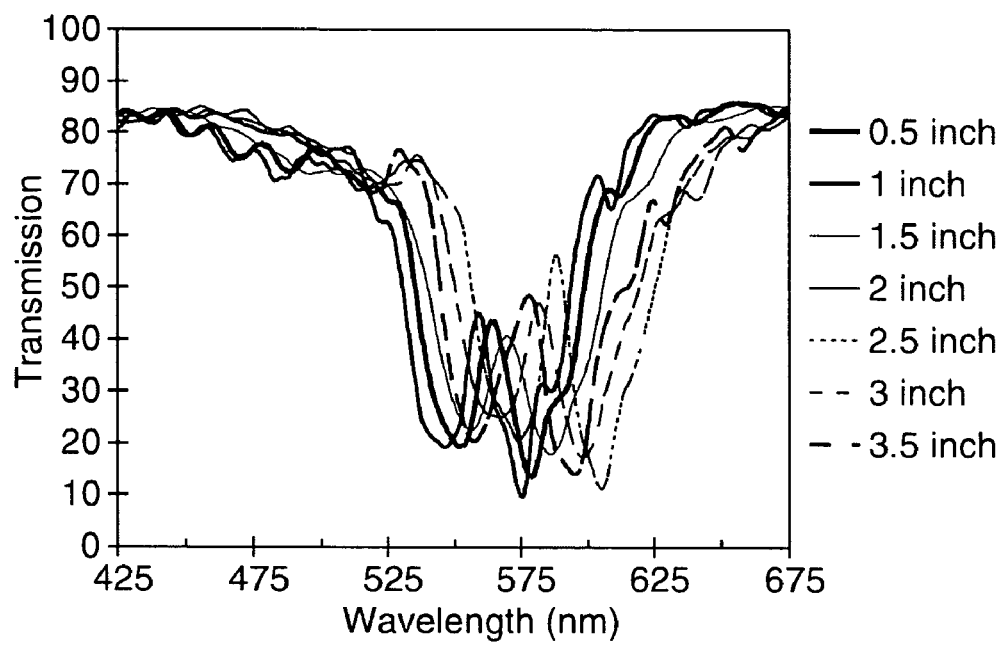
FIG. 15 is a transmission spectrum for a prior art film taken at various points in the cross-web direction.
Figure 16:
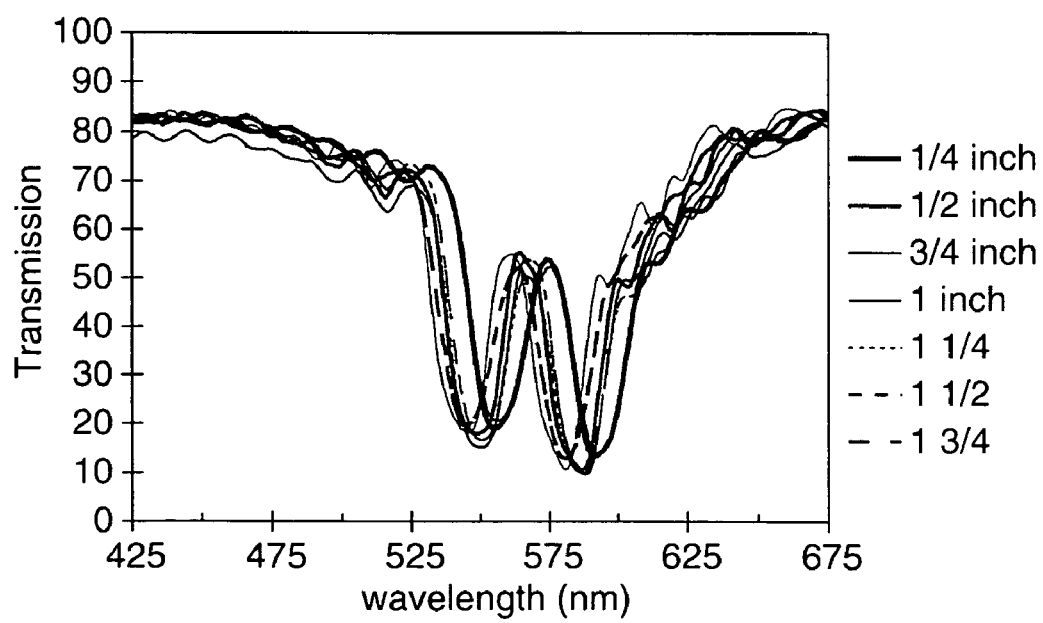
FIG. 16 is a transmission spectrum for a prior art film taken at various points in the down-web direction.

The spectra for the Mearl film at these various points is shown in FIGS. 15 and 16, for the cross web and down web directions respectively. As seen in these figures, the Mearl films exhibit substantial variance in color uniformity in the cross-web direction, amounting to +/−13 nm over a distance of 3 inches. The spectral variations in the down web direction are somewhat less, but still notable.

EXAMPLE C2-2

Figure 17:
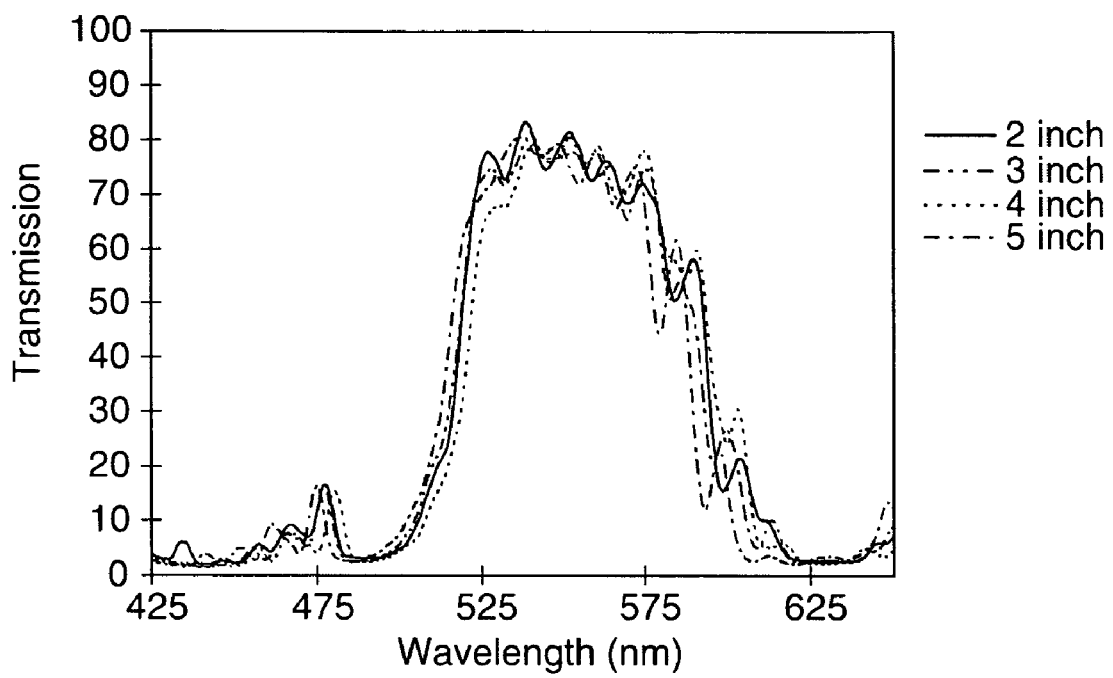
FIG. 17 is a transmission spectrum for a green pass filter of the present invention taken at various points in the cross-web direction.
Figure 18:
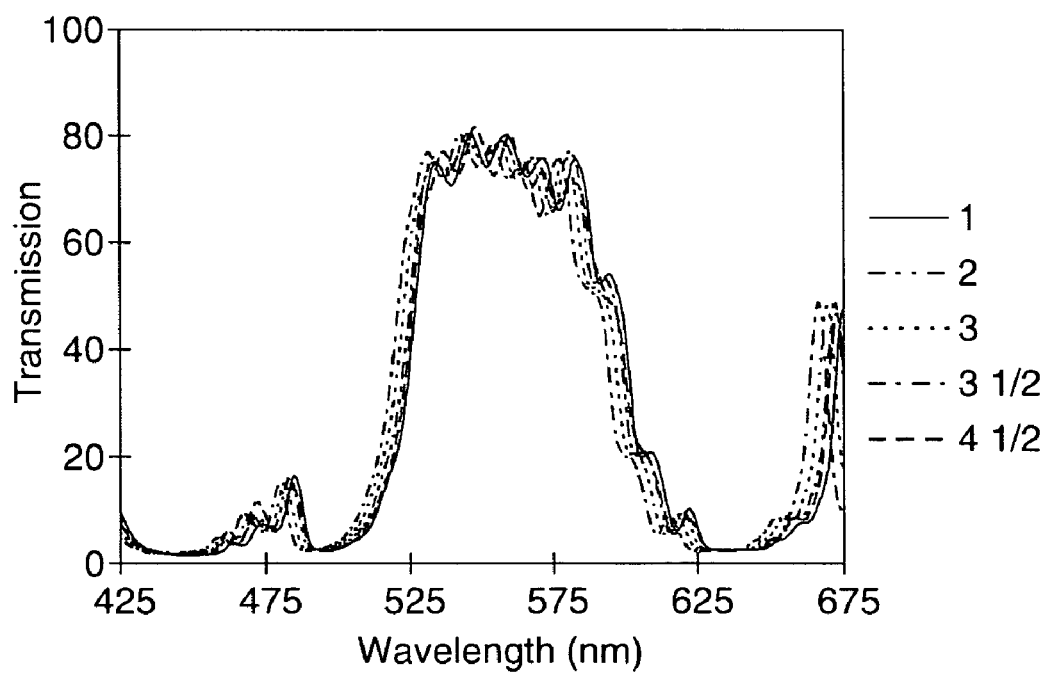
FIG. 18 is a transmission spectrum for a green pass filter of the present invention taken at various points in the down-web direction.

The green transmitting film of EXAMPLE E1-2 was examined for down web and cross web spectral variations. The crossweb spectra taken one inch apart for several inches show only a +/−4 nm shift in the blue bandedge of the pass band centered at 550 nm. The cross web spectra are shown in FIG. 17 and the down web spectra are shown in FIG. 18.

EXAMPLE C2-3

Figure 19:
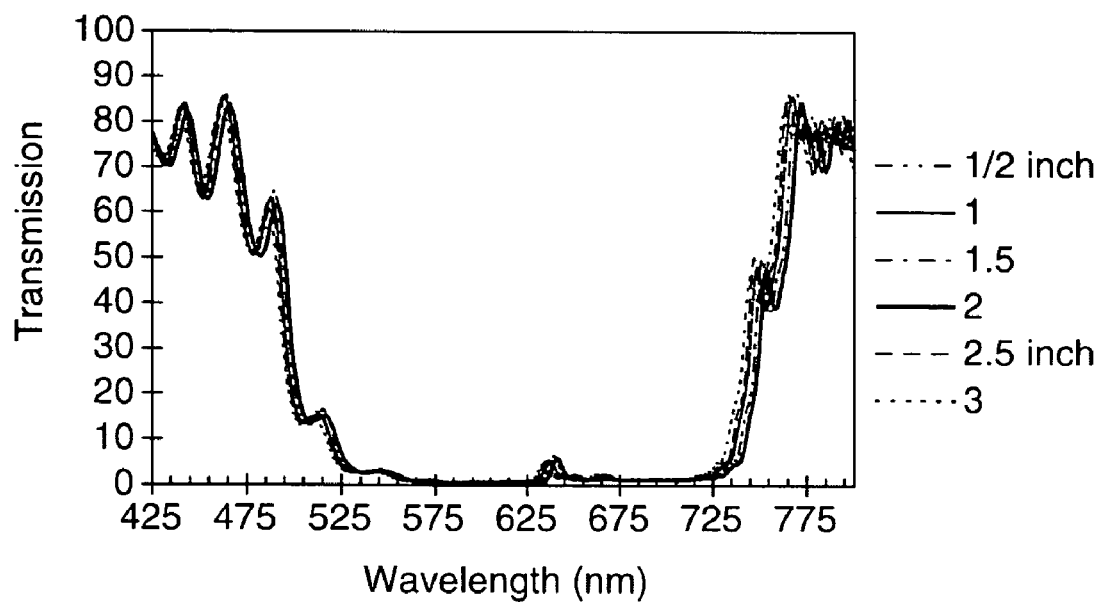
FIG. 19 is a transmission spectrum for a blue pass filter of the present invention taken at various points in the down-web direction.
Figure 20:
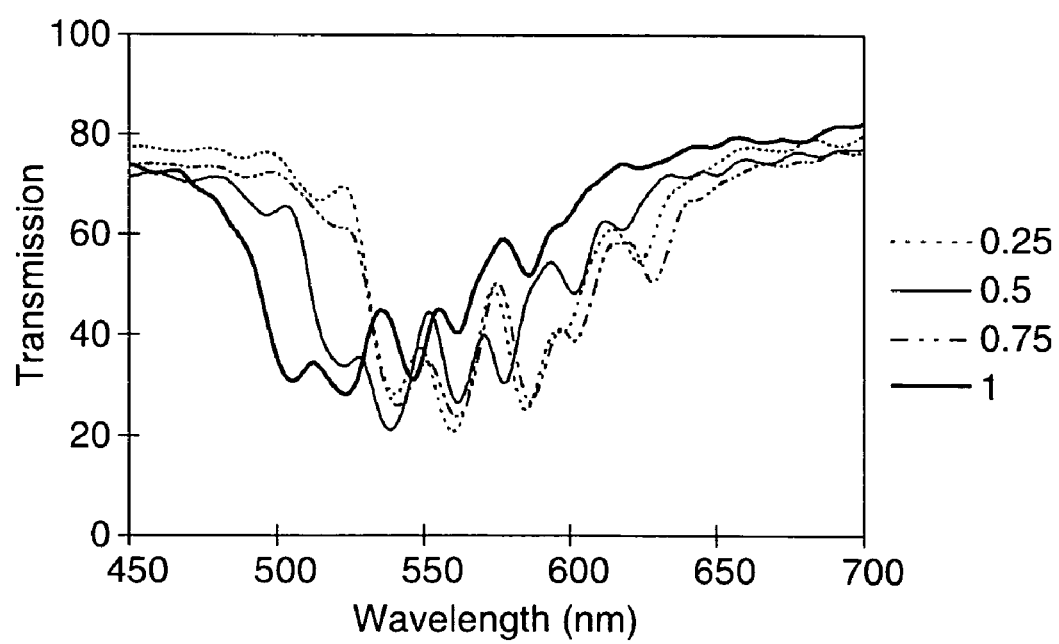
FIG. 20 is a transmission spectrum for a prior art film taken at various points in the cross-web direction.

The blue transmitting film of EXAMPLE E1-1 was also analyzed for uniformity. A series of spectral curves were obtained 0.5 inches apart in the downweb and crossweb directions. The local uniformity was substantially the same for both over the scale show in FIG. 19 which is for the down web direction.

The films of EXAMPLES C2-2 and C2-3 appeared very uniform in color, with no color variation visibly discernible in adjacent areas 1 to 2 inches apart. Therefore, portions of the film 1 to 2 square inches in area appear to change color simultaneously as the sample is turned at various angles. Similarly, when the film of EXAMPLES C2-2 or C2-3 are bent into an s-shape and viewed at various angles, the color bands created appear to have straight, sharp boundaries.

The spectral variances of the film were echoed in the color appearance of the films. The Mearl film contained areas on the order of about 0.5 inches in diameter where the color was fairly uniform (though still somewhat blotchy due to differences in spectral shape from point to point), but the color uniformity in the film became worse over larger areas, exhibiting a downweb variation in bandedge of about +/−7 nm over an area of about a square inch. By contrast, the blue film of EXAMPLE C2-3 exhibited a +/−3 nm variation on the blue bandedge over a 2.5 inch downweb length, and the green film of EXAMPLE C2-2 exhibited a +/−4 nm variation on the green bandedge over a 3.5 inch downweb distance.

As seen from the above spectra, the films made in accordance with the method of the present invention exhibit essentially uniform optical caliper over a relatively large area of the film, thereby resulting in color shifts that are sharper and more rapid as a function of viewing angle when compared to films having a lower degree of physical and optical caliper uniformity.

C3. Periodic Color Variations

While color uniformity is important in many applications of the films of the present invention, in other applications, such as decorative films, color uniformity may be either unimportant or undesirable. In those applications where color variations are desirable, they may be intentionally imparted to the films of the present invention by inducing thickness variations of a desired spatial frequency across or along a portion of the web at any point prior to quenching of the web in such a manner as to result in modulations in the thickness of the optical stack. While there are numerous ways of accomplishing this (e.g., by inducing vibrations in the casting wheel), such modulations may be conveniently imparted by inducing vibrations of a desired frequency (or frequencies) in the pinning wire. For example, by inducing a vibration on the pinning wire, a the color of a polarizer film was periodically varied, in straight lines across the film, from a neutral gray transmission color to a red color. The red stripes were 6.0 mm apart in the downweb direction. Calculated frequency of the pinning wire vibration was 21 Hz.

Local random color variations can also be achieved by extruding films of the present invention with small internal bubbles to produce attractive decorative effects. Bubbles can be created by several methods including not drying the resin as sufficiently as one would normally do, or by slightly overheating a thermally sensitive resin such as PMMA to create a similar effect. The small bubbles formed locally distort the microlayers and cause a local color change which can give the appearance of depth in some instances.

Although the methods described above for inducing color variations appear to teach a nonuniform film, the starting base film having uniform color with high stop band reflectivity and high color saturation, although locally disrupted by a given method, may be desirable in controlling the average hue, color saturation, and brightness of such a decorative film. The local color variations taught here are more noticeable when applied to a uniform color shifting film having reflection bands with inherently high reflectivity and bandedges with high slopes.

As noted above, vibrations in the casting wheel cause the speed of the casting wheel to fluctuate, resulting in variations of layer thicknesses in the film. The frequency (or frequencies) of the vibrations can be modulated to impart repeating sequences or patterns of colors to the resulting film. Furthermore, these color variations can be accomplished without destroying the color shifting characteristics typical of the films of the present invention, thereby allowing the production of colorful films (often spanning the entire visible spectrum) in which the colors appear to shimmer or move as the angle of incidence is varied.

Periodic color variations may also be imparted to the film by embossing it with a pattern. Due in part to the fact that the embossed portion is no longer coplanar with the rest of the film, it will exhibit a different color or colors than the rest of the film. Thus, striking effects have been produced by embossing the color shifting films of the present invention with, for example, a fishnet pattern (e.g., gold on a red background) or an emblem.

In certain instances, similar principles may be used to remove or tune out periodic color variations in the film, thereby improving the color uniformity of the film. Thus, where a source is found to impart vibrations of a given frequency or a given periodic frequency to the web, vibrations of equal amplitude (but opposite phase) can be imparted to the web (e.g., through the casting wheel), resulting in destructive interference and effective removal of the source from the process.

C4. Methods of Obtaining Index Match/Mismatch for Polarizers

The materials selected for use in the color shifting films of the present invention, and the degree of orientation of these materials, are preferably chosen so that the layers in the finished polarizer have at least one axis for which the associated indices of refraction are substantially equal. The match of refractive indices associated with that axis, which typically, but not necessarily, is an axis transverse to the direction of orientation, results in substantially no reflection of light in that plane of polarization.

Typically, the color shifting films of the present invention are made from alternating layers of at least a first and second polymeric material, wherein the first material is more highly birefringent than the second material. Frequently, the second material will be chosen to be isotropic. However, the second material may also be negatively birefringent, that is, it may exhibit a decrease in the refractive index associated with the direction of orientation after stretching. If the birefringence of the first material is positive, a negative strain induced birefringence of the second material has the advantage of increasing the difference between indices of refraction of the adjoining phases associated with the orientation axis while the reflection of light with its plane of polarization perpendicular to the orientation direction is still negligible. Differences between the indices of refraction of adjoining phases in the direction orthogonal to the orientation direction should be less than about 0.05 after orientation, and preferably, less than about 0.02 over most of the region of the spectrum in which the color shifting effect is desired.

The second material may also exhibit a positive strain induced birefringence. However, this can be altered by means of heat treatment to match the refractive index of the axis perpendicular to the orientation direction of the continuous phase. The temperature of the heat treatment should not be so high as to diminish the birefringence in the first material.

It is also possible to effect a desired match/mismatch in refractive indices by stretching the film or optical body under conditions (e.g., particular stretch rates and temperatures) in which particular layers within the film will be selectively oriented (resulting in a change in their refractive index), while the indices of refraction of other layers within the film are substantially unaffected. Methods for selectively orienting layers in a multilayer film are described in U.S. Pat. No. 6,179,948 (Merrill et al.) titled "An Optical Film and Process for Manufacture Thereof". Where desirable, the method can be used to achieve true uniaxial orientation within particular layers of the film.

D. Materials Selection

A variety of polymer materials suitable for use in the present invention have been taught for use in making coextruded multilayer optical films. For example, the polymer materials listed and described in U.S. Pat. Nos. 4,937,134, 5,103,337, 5,1225,448,404, 5,540,978, and 5,568,316 to Schrenk et al., and in U.S. Pat. Nos. 5,122,905, 5,122,906, and 5,126,880 to Wheatley and Schrenk are useful for making multilayer optical films according to the present invention. Of special interest are birefringent polymers such as those described in U.S. Pat. Nos. 5,486,949 and 5,612,820 to Schrenk et al, U.S. Pat. No. 5,882,774 (Jonza et al.), and U.S. application Ser. No. 09/006,601 titled "Modified Copolyesters and Improved Multilayer Reflective Films" (now abandoned), all of which are herein incorporated by reference. Regarding the preferred materials from which the films are to be made, there are several conditions which should be met to make the multilayer optical films of this invention. First, these films should consist of at least two distinguishable polymers; the number is not limited, and three or more polymers may be advantageously used in particular films. Second, at least one of the two required polymers, referred to as the "first polymer", preferably has a stress optical coefficient having a large absolute value. In other words, it preferably should be capable of developing a large birefringence when stretched. Depending on the application, the birefringence may be developed between two orthogonal directions in the plane of the film, between one or more in-plane directions and the direction perpendicular to the film plane, or a combination of these. In the special case that the isotropic indices are widely separated, the preference for large birefringence in the first polymer may be relaxed, although birefringence is still usually desirable. Such special cases may arise in the selection of polymers for mirror films and for polarizer films formed using a biaxial process which draws the film in two orthogonal in-plane directions. Third, the first polymer should be capable of maintaining birefringence after stretching, so that the desired optical properties are imparted to the finished film. Fourth, the other required polymer, referred to as the "second polymer", should be chosen so that in the finished film, its refractive index, in at least one direction, differs significantly from the index of refraction of the first polymer in the same direction. Because polymeric materials are typically dispersive, that is, the refractive indices vary with wavelength, these conditions must be considered in terms of a particular spectral bandwidth of interest.

Other aspects of polymer selection depend on specific applications. For polarizing films, it is advantageous for the difference in the index of refraction of the first and second polymers in one film-plane direction to differ significantly in the finished film, while the difference in the orthogonal film-plane index is minimized. If the first polymer has a large refractive index when isotropic, and is positively birefringent (that is, its refractive index increases in the direction of stretching), the second polymer will typically be chosen to have a matching refractive index, after processing, in the planar direction orthogonal to the stretching direction, and a refractive index in the direction of stretching which is as low as possible. Conversely, if the first polymer has a small refractive index when isotropic, and is negatively birefringent, the second polymer will typically be chosen to have a matching refractive index, after processing, in the planar direction orthogonal to the stretching direction, and a refractive index in the direction of stretching which is as high as possible.

Alternatively, it is possible to select a first polymer which is positively birefringent and has an intermediate or low refractive index when isotropic, or one which is negatively birefringent and has an intermediate or high refractive index when isotropic. In these cases, the second polymer may typically be chosen so that, after processing, its refractive index will match that of the first polymer in either the stretching direction or the planar direction orthogonal to stretching. Further, the second polymer will typically be chosen such that the difference in index of refraction in the remaining planar direction is maximized, regardless of whether this is best accomplished by a very low or very high index of refraction in that direction.

One means of achieving this combination of planar index matching in one direction and mismatching in the orthogonal direction is to select a first polymer which develops significant birefringence when stretched, and a second polymer which develops little or no birefringence when stretched, and to stretch the resulting film in only one planar direction. Alternatively, the second polymer may be selected from among those which develop birefringence in the sense opposite to that of the first polymer (negative-positive or positive-negative). Another alternative method is to select both first and second polymers which are capable of developing birefringence when stretched, but to stretch in two orthogonal planar directions, selecting process conditions, such as temperatures, stretch rates, post-stretch relaxation, and the like, which result in development of unequal levels of orientation in the two stretching directions for the first polymer, and/or for the second polymer such that one in-plane index is approximately matched to that of the first polymer, and the orthogonal in-plane index is significantly mismatched to that of the first polymer. For example, conditions may be chosen such that the first polymer has a biaxially oriented character in the finished film, while the second polymer has a predominantly uniaxially oriented character in the finished film.

The foregoing is meant to be exemplary, and it will be understood that combinations of these and other techniques may be employed to achieve the polarizing film goal of index mismatch in one in-plane direction and relative index matching in the orthogonal planar direction.

Different considerations apply to a reflective, or mirror, film. Provided that the film is not meant to have some polarizing properties as well, refractive index criteria apply equally to any direction in the film plane, so it is typical for the indices for any given layer in orthogonal in-plane directions to be equal or nearly so. It is advantageous, however, for the film-plane indices of the first polymer to differ as greatly as possible from the film-plane indices of the second polymer. For this reason, if the first polymer has a high index of refraction when isotropic, it is advantageous that it also be positively birefringent. Likewise, if the first polymer has a low index of refraction when isotropic, it is advantageous that it also be negatively birefringent. The second polymer advantageously develops little or no birefringence when stretched, or develops birefringence of the opposite sense (positive-negative or negative-positive), such that its film-plane refractive indices differ as much as possible from those of the first polymer in the finished film. These criteria may be combined appropriately with those listed above for polarizing films if a mirror film is meant to have some degree of polarizing properties as well.

Colored films can be regarded as special cases of mirror and polarizing films. Thus, the same criteria outlined above apply. The perceived color is a result of reflection or polarization over one or more specific bandwidths of the spectrum. The bandwidths over which a multilayer film of the current invention is effective will be determined primarily by the distribution of layer thicknesses employed in the optical stack(s), but consideration must also be given to the wavelength dependence, or dispersion, of the refractive indices of the first and second polymers. It will be understood that the same rules apply to the infrared and ultraviolet wavelengths as to the visible colors.

Absorbance is another consideration. For most applications, it is advantageous for neither the first polymer nor the second polymer to have any absorbance bands within the bandwidth of interest for the film in question. Thus, all incident light within the bandwidth is either reflected or transmitted. However, for some applications, it may be useful for one or both of the first and second polymer to absorb specific wavelengths, either totally or in part.

Although many polymers may be chosen as the first polymer, certain of the polyesters have the capability for particularly large birefringence. Among these, polyethylene 2,6-naphthalate (PEN) is frequently chosen as a first polymer for films of the present invention. It has a very large positive stress optical coefficient, retains birefringence effectively after stretching, and has little or no absorbance within the visible range. It also has a large index of refraction in the isotropic state. Its refractive index for polarized incident light of 550 nm wavelength increases when the plane of polarization is parallel to the stretch direction from about 1.64 to as high as about 1.9. Its birefringence can be increased by increasing its molecular orientation which, in turn, may be increased by stretching to greater stretch ratios with other stretching conditions held fixed.

Other semicrystalline naphthalene dicarboxylic polyesters are also suitable as first polymers. Polybutylene 2,6-Naphthalate (PBN) is an example. These polymers may be homopolymers or copolymers, provided that the use of comonomers does not substantially impair the stress optical coefficient or retention of birefringence after stretching. The term "PEN" herein will be understood to include copolymers of PEN meeting these restrictions. In practice, these restrictions imposes an upper limit on the comonomer content, the exact value of which will vary with the choice of comonomer(s) employed. Some compromise in these properties may be accepted, however, if comonomer incorporation results in improvement of other properties. Such properties include but are not limited to improved interlayer adhesion, lower melting point (resulting in lower extrusion temperature), better rheological matching to other polymers in the film, and advantageous shifts in the process window for stretching due to change in the glass transition temperature.

Suitable comonomers for use in PEN, PBN or the like may be of the diol or dicarboxylic acid or ester type. Dicarboxylic acid comonomers include but are not limited to terephthalic acid, isophthalic acid, phthalic acid, all isomeric naphthalenedicarboxylic acids (2,6-, 1,2-, 1,3-, 1,4-, 1,5-, 1,6-, 1,7-, 1,8-, 2,3-, 2,4-, 2,5-, 2,7-, and 2,8-), bibenzoic acids such as 4,4'-biphenyl dicarboxylic acid and its isomers, trans-4,4'-stilbene dicarboxylic acid and its isomers, 4,4'-diphenyl ether dicarboxylic acid and its isomers, 4,4'-diphenylsulfone dicarboxylic acid and its isomers, 4,4'-benzophenone dicarboxylic acid and its isomers, halogenated aromatic dicarboxylic acids such as 2-chloroterephthalic acid and 2,5-dichloroterephthalic acid, other substituted aromatic dicarboxylic acids such as tertiary butyl isophthalic acid and sodium sulfonated isophthalic acid, cycloalkane dicarboxylic acids such as 1,4-cyclohexanedicarboxylic acid and its isomers and 2,6-decahydronaphthalene dicarboxylic acid and its isomers, bi- or multi-cyclic dicarboxylic acids (such as the various isomeric norbornane and norbornene dicarboxylic acids, adamantane dicarboxylic acids, and bicyclo-octane dicarboxylic acids), alkane dicarboxylic acids (such as sebacic acid, adipic acid, oxalic acid, malonic acid, succinic acid, glutaric acid, azelaic acid, and dodecane dicarboxylic acid.), and any of the isomeric dicarboxylic acids of the fused-ring aromatic hydrocarbons (such as indene, anthracene, pheneanthrene, benzonaphthene, fluorene and the like). Alternatively, alkyl esters of these monomers, such as dimethyl terephthalate, may be used.

Suitable diol comonomers include but are not limited to linear or branched alkane diols or glycols (such as ethylene glycol, propanediols such as trimethylene glycol, butanediols such as tetramethylene glycol, pentanediols such as neopentyl glycol, hexanediols, 2,2,4-trimethyl-1,3-pentanediol and higher diols), ether glycols (such as diethylene glycol, triethylene glycol, and polyethylene glycol), chain-ester diols such as 3-hydroxy-2,2-dimethylpropyl-3-hydroxy-2,2-dimethyl propanoate, cycloalkane glycols such as 1,4-cyclohexanedimethanol and its isomers and 1,4-cyclohexanediol and its isomers, bi- or multicyclic diols (such as the various isomeric tricyclodecane dimethanols, norbornane dimethanols, norbornene dimethanols, and bicyclooctane dimethanols), aromatic glycols (such as 1,4-benzenedimethanol and its isomers, 1,4-benzenediol and its isomers, bisphenols such as bisphenol A, 2,2'-dihydroxy biphenyl and its isomers, 4,4'-dihydroxymethyl biphenyl and its isomers, and 1,3-bis(2-hydroxyethoxy)benzene and its isomers), and lower alkyl ethers or diethers of these diols, such as dimethyl or diethyl diols.

Tri- or polyfunctional comonomers, which can serve to impart a branched structure to the polyester molecules, can also be used. They may be of either the carboxylic acid, ester, hydroxy or ether types. Examples include, but are not limited to, trimellitic acid and its esters, trimethylol propane, and pentaerythritol.

Also suitable as comonomers are monomers of mixed functionality, including hydroxycarboxylic acids such as parahydroxybenzoic acid and 6-hydroxy-2-naphthalenecarboxylic acid, and their isomers, and tri- or polyfunctional comonomers of mixed functionality such as 5-hydroxyisophthalic acid and the like.

Polyethylene terephthalate (PET) is another material that exhibits a significant positive stress optical coefficient, retains birefringence effectively after stretching, and has little or no absorbance within the visible range. Thus, it and its high PET-content copolymers employing comonomers listed above may also be used as first polymers in some applications of the current invention.

When a naphthalene dicarboxylic polyester such as PEN or PBN is chosen as first polymer, there are several approaches which may be taken to the selection of a second polymer. One preferred approach for some applications is to select a naphthalene dicarboxylic copolyester (coPEN) formulated so as to develop significantly less or no birefringence when stretched. This can be accomplished by choosing comonomers and their concentrations in the copolymer such that crystallizability of the coPEN is eliminated or greatly reduced. One typical formulation employs as the dicarboxylic acid or ester components dimethyl naphthalate at from about 20 mole percent to about 80 mole percent and dimethyl terephthalate or dimethyl isophthalate at from about 20 mole percent to about 80 mole percent, and employs ethylene glycol as diol component. Of course, the corresponding dicarboxylic acids may be used instead of the esters. The number of comonomers which can be employed in the formulation of a coPEN second polymer is not limited. Suitable comonomers for a coPEN second polymer include but are not limited to all of the comonomers listed above as suitable PEN comonomers, including the acid, ester, hydroxy, ether, tri- or polyfunctional, and mixed functionality types.

Often it is useful to predict the isotropic refractive index of a coPEN second polymer. A volume average of the refractive indices of the monomers to be employed has been found to be a suitable guide. Similar techniques well-known in the art can be used to estimate glass transition temperatures for coPEN second polymers from the glass transitions of the homopolymers of the monomers to be employed.

In addition, polycarbonates having a glass transition temperature compatible with that of PEN and having a refractive index similar to the isotropic refractive index of PEN are also useful as second polymers. Polyesters, copolyesters, polycarbonates, and copolycarbonates may also be fed together to an extruder and transesterified into new suitable copolymeric second polymers.

It is not required that the second polymer be a copolyester or copolycarbonate. Vinyl polymers and copolymers made from monomers such as vinyl naphthalenes, styrenes, ethylene, maleic anhydride, acrylates, acetates, and methacrylates may be employed. Condensation polymers other than polyesters and polycarbonates may also be used. Examples include: polysulfones, polyamides, polyurethanes, polyamic acids, and polyimides. Naphthalene groups and halogens such as chlorine, bromine and iodine are useful for increasing the refractive index of the second polymer to a desired level. Acrylate groups and fluorine are particularly useful in decreasing refractive index when this is desired.

It will be understood from the foregoing discussion that the choice of a second polymer is dependent not only on the intended application of the multilayer optical film in question, but also on the choice made for the first polymer, and the processing conditions employed in stretching. Suitable second polymer materials include but are not limited to polyethylene naphthalate (PEN) and isomers thereof (such as 2,6-, 1,4-, 1,5-, 2,7-, and 2,3 -PEN), polyalkylene terephthalates (such as polyethylene terephthalate, polybutylene terephthalate, and poly-1,4-cyclohexanedimethylene terephthalate), other polyesters, polycarbonates, polyarylates, polyamides (such as nylon 6, nylon 11, nylon 12, nylon 4/6, nylon 6/6, nylon 6/9, nylon 6/10, nylon 6/12, and nylon 6/T), polyimides (including thermoplastic polyimides and polyacrylic imides), polyamide-imides, polyether-amides, polyetherimides, polyaryl ethers (such as polyphenylene ether and the ring-substituted polyphenylene oxides), polyarylether ketones such as polyetheretherketone ("PEEK"), aliphatic polyketones (such as copolymers and terpolymers of ethylene and/or propylene with carbon dioxide), polyphenylene sulfide, polysulfones (including polyethersulfones and polyaryl sulfones), atactic polystyrene, syndiotactic polystyrene ("sPS") and its derivatives (such as syndiotactic poly-alpha-methyl styrene and syndiotactic polydichlorostyrene), blends of any of these polystyrenes (with each other or with other polymers, such as polyphenylene oxides), copolymers of any of these polystyrenes (such as styrene-butadiene copolymers, styrene-acrylonitrile copolymers, and acrylonitrile-butadiene-styrene terpolymers), polyacrylates (such as polymethyl acrylate, polyethyl acrylate, and polybutyl acrylate), polymethacrylates (such as polymethyl methacrylate, polyethyl methacrylate, polypropyl methacrylate, and polyisobutyl methacrylate), cellulose derivatives (such as ethyl cellulose, cellulose acetate, cellulose propionate, cellulose acetate butyrate, and cellulose nitrate), polyalkylene polymers (such as polyethylene, polypropylene, polybutylene, polyisobutylene, and poly(4-methyl)pentene), fluorinated polymers and copolymers (such as polytetrafluoroethylene, polytrifluoroethylene, polyvinylidene fluoride, polyvinyl fluoride, fluorinated ethylene-propylene copolymers, perfluoroalkoxy resins, polychlorotrifluoroethylene, polyethylene-co-trifluoroethylene, polyethylene-co-chlorotrifluoroethylene), chlorinated polymers (such as polyvinylidene chloride and polyvinyl chloride), polyacrylonitrile, polyvinylacetate, polyethers (such as polyoxymethylene and polyethylene oxide), ionomeric resins, elastomers (such as polybutadiene, polyisoprene, and neoprene), silicone resins, epoxy resins, and polyurethanes.

Also suitable are copolymers, such as the copolymers of PEN discussed above as well as any other non-naphthalene group-containing copolyesters which may be formulated from the above lists of suitable polyester comonomers for PEN. In some applications, especially when PET serves as the first polymer, copolyesters based on PET and comonomers from said lists above (coPETs) are especially suitable. In addition, either first or second polymers may consist of miscible or immiscible blends of two or more of the above-described polymers or copolymers (such as blends of sPS and atactic polystyrene, or of PEN and sPS). The coPENs and coPETs described may be synthesized directly, or may be formulated as a blend of pellets where at least one component is a polymer based on naphthalene dicarboxylic acid or terephthalic acid and other components are polycarbonates or other polyesters, such as a PET, a PEN, a coPET, or a co-PEN.

Another preferred family of materials for the second polymer for some applications are the syndiotactic vinyl aromatic polymers, such as syndiotactic polystyrene. Syndiotactic vinyl aromatic polymers useful in the current invention include poly(styrene), poly(alkyl styrene)s, poly(aryl styrene)s, poly(styrene halide)s, poly(alkoxy styrene)s, poly(vinyl ester benzoate), poly(vinyl naphthalene), poly(vinylstyrene), and poly(acenaphthalene), as well as the hydrogenated polymers and mixtures or copolymers containing these structural units. Examples of poly(alkyl styrene)s include the isomers of the following: poly(methyl styrene), poly(ethyl styrene), poly(propyl styrene), and poly(butyl styrene). Examples of poly(aryl styrene)s include the isomers of poly(phenyl styrene). As for the poly(styrene halide)s, examples include the isomers of the following: poly(chlorostyrene), poly(bromostyrene), and poly(fluorostyrene). Examples of poly(alkoxy styrene)s include the isomers of the following: poly(methoxy styrene) and poly(ethoxy styrene). Among these examples, particularly preferable styrene group polymers, are: polystyrene, poly(p-methyl styrene), poly(m-methyl styrene), poly(p-tertiary butyl styrene), poly(p-chlorostyrene), poly(m-chloro styrene), poly(p-fluoro styrene), and copolymers of styrene and p-methyl styrene.

Furthermore, comonomers may be used to make syndiotactic vinyl aromatic group copolymers. In addition to the monomers for the homopolymers listed above in defining the syndiotactic vinyl aromatic polymers group, suitable comonomers include olefin monomers (such as ethylene, propylene, butenes, pentenes, hexenes, octenes or decenes), diene monomers (such as butadiene and isoprene), and polar vinyl monomers (such as cyclic diene monomers, methyl methacrylate, maleic acid anhydride, or acrylonitrile).

The syndiotactic vinyl aromatic copolymers of the present invention may be block copolymers, random copolymers, or alternating copolymers.

The syndiotactic vinyl aromatic polymers and copolymers referred to in this invention generally have syndiotacticity of higher than 75% or more, as determined by carbon-13 nuclear magnetic resonance. Preferably, the degree of syndiotacticity is higher than 85% racemic diad, or higher than 30%, or more preferably, higher than 50%, racemic pentad.

In addition, although there are no particular restrictions regarding the molecular weight of these syndiotactic vinyl aromatic polymers and copolymers, preferably, the weight average molecular weight is greater than 10,000 and less than 1,000,000, and more preferably, greater than 50,000 and less than 800,000.

The syndiotactic vinyl aromatic polymers and copolymers may also be used in the form of polymer blends with, for instance, vinyl aromatic group polymers with atactic structures, vinyl aromatic group polymers with isotactic structures, and any other polymers that are miscible with the vinyl aromatic polymers. For example, polyphenylene ethers show good miscibility with many of the previous described vinyl aromatic group polymers.

When a polarizing film is made using a process with predominantly uniaxial stretching, particularly preferred combinations of polymers for optical layers include PEN/coPEN, PET/coPET, PEN/sPS, PET/sPS, PEN/Eastar,™ and PET/Eastar,™ where "coPEN" refers to a copolymer or blend based upon naphthalene dicarboxylic acid (as described above) and Eastar™ is a polyester or copolyester (believed to comprise cyclohexanedimethylene diol units and terephthalate units) commercially available from Eastman Chemical Co. When a polarizing film is to be made by manipulating the process conditions of a biaxial stretching process, particularly preferred combinations of polymers for optical layers include PEN/coPEN, PEN/PET, PEN/PBT, PEN/PETG and PEN/PETcoPBT, where "PBT" refers to polybutylene terephthalate, "PETG" refers to a copolymer of PET employing a second glycol (usually cyclohexanedimethanol), and "PETcoPBT" refers to a copolyester of terephthalic acid or an ester thereof with a mixture of ethylene glycol and 1,4-butanediol.

Particularly preferred combinations of polymers for optical layers in the case of mirrors or colored films include PEN/PMMA, PET/PMMA, PEN/Ecdel,™ PET/Ecdel,™ PEN/sPS, PET/sPS, PEN/coPET, PEN/PETG, and PEN/THV,™ where "PMMA" refers to polymethyl methacrylate, Ecdel™ is a thermoplastic polyester or copolyester (believed to comprise cyclohexanedicarboxylate units, polytetramethylene ether glycol units, and cyclohexanedimethanol units) commercially available from Eastman Chemical Co., "coPET" refers to a copolymer or blend based upon terephthalic acid (as described above), "PETG" refers to a copolymer of PET employing a second glycol (usually cyclohexanedimethanol), and THV™ is a fluoropolymer commercially available from 3M Co.

For mirror films, a match of the refractive indices of the first polymer and second polymer in the direction normal to the film plane is sometimes preferred, because it provides for constant reflectance with respect to the angle of incident light (that is, there is no Brewster's angle). For example, at a specific wavelength, the in-plane refractive indices might be 1.76 for biaxially oriented PEN, while the film plane-normal refractive index might fall to 1.49. When PMMA is used as the second polymer in the multilayer construction, its refractive index at the same wavelength, in all three directions, might be 1.495. Another example is the PET/Ecdel™ system, in which the analogous indices might be 1.66 and 1.51 for PET, while the isotropic index of Ecdel™ might be 1.52. The crucial property is that the normal-to-plane index for one material must be closer to the in-plane indices of the other material than to its own in-plane indices.

In other embodiments, a deliberate mismatching of the normal-to-plane refractive index is desirable. Some examples include those involving three or more polymeric layers in the optical stack in which a deliberate mismatch in the normal-to-plane index is desirable opposite in sign to the index mismatch in one of the in-plane directions. It is sometimes preferred for the multilayer optical films of the current invention to consist of more than two distinguishable polymers. A third or subsequent polymer might be fruitfully employed as an adhesion-promoting layer between the first polymer and the second polymer within an optical stack, as an additional component in a stack for optical purposes, as a protective boundary layer between optical stacks, as a skin layer, as a functional coating, or for any other purpose. As such, the composition of a third or subsequent polymer, if any, is not limited. Some preferred multicomponent constructions are described in U.S. Pat. No. 6,207,260 (Wheatley et al.) titled "Multicomponent Optical Body", the contents of which are herein incorporated by reference.

E. Film Designs and Constructions

E1. Colored Mirrors

The principles of the present invention may be used to construct colored mirrors. Typically, these mirrors will exhibit a transmission band in the visible region of the spectrum for both polarizations of light, but will reflect both polarizations of light over the rest of the visible spectrum. Such mirrors are often referred to herein as "pass filters". In the pass filters of the present invention, the transmission bands shift color as a function of angle of incidence.

EXAMPLE E1-1

The following example illustrates the production of a blue pass filter in accordance with the present invention.

A coextruded film containing 209 layers was made on a sequential flat-film making line via a coextrusion process. This multilayer polymer film was made from polyethylene naphthalate (PEN) and polymethyl methacrylate (PMMA CP82). A feedblock method (such as that described by U.S. Pat. No. 3,801,429) was used to generate about 209 layers which were coextruded onto a water chilled casting wheel and continuously oriented by conventional sequential length orienter (LO) and tenter equipment. Polyethylene naphthalate (PEN: 60 wt. % phenol/40 wt. % dichlorobenzene) with an intrinsic viscosity (IV) of 0.56 dl/g was delivered to the feedblock by one extruder at a rate of 60.5 Kg/hr and the PMMA was delivered by another extruder at a rate of 63.2 Kg/hr. These meltstreams were directed to the feedblock to create the PEN and PMMA optical layers. The feedblock created 209 alternating layers of PEN and PMMA with the two outside layers of PEN serving as the protective boundary layers (PBL's) through the feedblock. The PMMA melt process equipment was maintained at about 249° C.; the PEN melt process equipment was maintained at about 290° C.; and the feedblock, skin-layer modules, and die were also maintained at about 290° C.

An approximate linear gradient in layer thickness was designed for the feedblock for each material with the ratio of thickest to thinnest layers being about 1.72:1. This hardware design of first-to-last layer thickness ratio of 1.72:1 was too great to make the bandwidth desired for the colored mirror of this example. In addition, a sloping blue bandedge resulted from the as-designed hardware. To correct these problems, a temperature profile was applied to the feedblock. Selected layers created by the feedblock can be made thicker or thinner by warming or cooling the section of the feedblock where they are created. This technique was required to produce an acceptably sharp bandedge on the blue side of the reflection band. The portion of the feedblock making the thinnest layers was heated to 304° C., while the portion making the thickest layers was heated to 274° C. Portions intermediate were heated between these temperature extremes. The overall effect is a much narrower layer thickness distribution which results in a narrower reflectance spectrum.

After the feedblock, a third extruder delivered a 50/50 blend of 0.56 IV and 0.48 IV PEN as skin layers (same thickness on both sides of the optical layer stream) at about 37.3 kg/hr. By this method, the skin layers were of a lower viscosity than the optics layers, resulting in a stable laminar melt flow of the coextruded layers. Then the material stream passed through a film die and onto a water cooled casting wheel using an inlet water temperature of about 7° C. A high voltage pinning system was used to pin the extrudate to the casting wheel. The pinning wire was about 0.17 mm thick and a voltage of about 5.5 kV was applied. The pinning wire was positioned manually by an operator about 3 to 5 mm from the web at the point of contact to the casting wheel to obtain a smooth appearance to the cast web.

Figure 21:
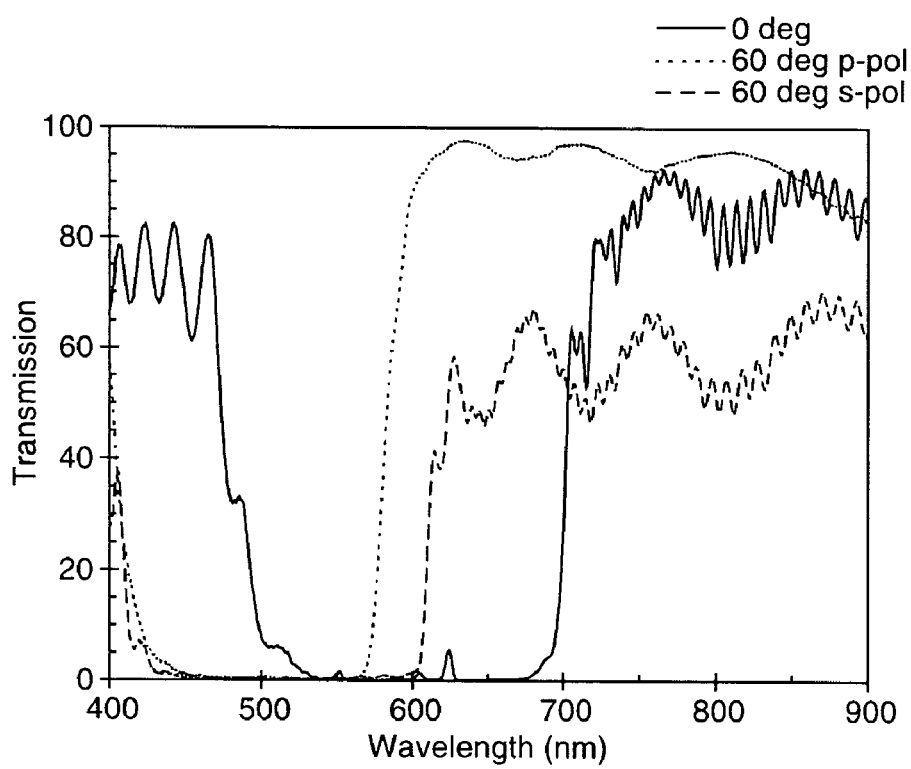
FIG. 21 is a transmission spectrum for a blue pass filter of the present invention taken at normal incidence and at 60° for both s- and p-polarized light.

The cast web was length oriented with a draw ratio of about 3.8:1 at about 130° C. In the tenter, the film was preheated before drawing to about 138° C. in about 9 seconds and then drawn in the transverse direction at about 140° C. to a draw ratio of about 5:1, at a rate of about 60% per second. The finished film had a final thickness of about 0.02 mm. The optical spectra are shown in FIG. 21.

At normal incidence, the average transmission within the stop band for p-polarized light is 1.23%. The bandwidth at normal incidence is about 200 nm. The slopes of the red bandedge at normal incidence is about 5.5% per nm. At 600, the red bandedge slope for p-polarized light is about 4.2% per nm and the blue bandedge slope for p-polarized light is about 2.2% per nm. The spectrum of FIG. 21 was obtained with light polarized parallel to the tenter direction (crossweb direction). Although the indices of refraction of the quarter wave thick PEN layers cannot be measured directly, they are believed to be approximately the same as the indices of the PEN skin layers. The later indices were measured for this example using a Metricon Prism coupler manufactured by Metricon Corp. of Pennington, N.J. The indices were measured for the crossweb (tentered or TD) direction, the downweb (machine or MD) direction, also referred to as the Length Oriented or LO direction, and the thickness or z-axis direction. The indices of refraction of the PEN skin layer for the TD and MD directions were nx=1.774 and ny=1.720, respectively, and the z-axis index was nz=1.492. A better balance of equality between the TD and MD directions can be obtained by adjusting the relative stretch ratios in those two directions.

EXAMPLE E1-2

The following example illustrates the production of a green pass filter in accordance with the teachings of the present invention.

A multilayer film containing about 418 layers was made on a sequential flat-film making line via a coextrusion process. This multilayer polymer film was made from PET and ECDEL 9967. ECDEL 9967, believed to be a copolyester based on 1,4-cyclohexane dicarboxylic acid, 1,4-cyclohexane dimethanol, and polytetramethylene ether glycol, is commercially available from Eastman Chemicals Co., Rochester, N.Y. A feedblock method (such as that described by U.S. Pat. No. 3,801,429) was used to generate about 209 layers with an approximately linear layer thickness gradient from layer to layer through the extrudate.

The PET, with an Intrinsic Viscosity (IV) of 0.6 dl/g was delivered to the feedblock by an extruder at a rate of about 34.5 kg/hr and the ECDEL at about 41 kg/hr. After the feedblock, the same PET extruder delivered PET as protective boundary layers (PBL's), to both sides of the extrudate at about 6.8 kg/hr total flow. The material stream then passed though an asymmetric two times multiplier (U.S. Pat. Nos. 5,094,788 and 5,094,793) with a multiplier design ratio of about 1.40. The multiplier ratio is defined as the average layer thickness of layers produced in the major conduit divided by the average layer thickness of layers in the minor conduit. This multiplier ratio was chosen so as to leave a spectral gap between the two reflectance bands created by the two sets of 209 layers. Each set of 209 layers has the approximate layer thickness profile created by the feedblock, with overall thickness scale factors determined by the multiplier and film extrusion rates. The spectrum for normal incidence (FIG. 22) has two extinction bands with layer thickness weighted centers of approximately 450 and 635 nm. The ratio of 635 to 450 is 1.41 which is close to the intended multiplier design of 1.40.

The ECDEL melt process equipment was maintained at about 250° C., the PET (optical layers) melt process equipment was maintained at about 265° C., and the feedblock, multiplier, skin-layer meltstream, and die were maintained at about 274° C.

The feedblock used to make the film for this example was designed to give a linear layer thickness distribution with a 1.3:1 ratio of thickest to thinnest layers under isothermal conditions. To achieve a smaller ratio for this example, a thermal profile was applied to the feedblock. The portion of the feedblock making the thinnest layers was heated to 285° C., while the portion making the thickest layers was heated to 265° C. In this manner the thinnest layers are made thicker than with isothermal feedblock operation, and the thickest layers are made thinner than under isothermal operation. Portions intermediate were set to follow a linear temperature profile between these two extremes. The overall effect is a narrower layer thickness distribution which results in a narrower reflectance spectrum. Some layer thickness errors are introduced by the multipliers, and account for the minor differences in the spectral features of each reflectance band. The casting wheel speed was adjusted for precise control of final film thickness, and therefore, final color.

After the multiplier, thick symmetric PBL's (skin layers) were added at about 28 kg/hour (total) that was fed from a third extruder. Then the material stream passed through a film die and onto a water cooled casting wheel. The inlet water temperature on the casting wheel was about 7° C. A high voltage pinning system was used to pin the extrudate to the casting wheel. The pinning wire was about 0.17 mm thick and a voltage of about 5.5 kV was applied. The pinning wire was positioned manually by an operator about 3 to 5 mm from the web at the point of contact to the casting wheel to obtain a smooth appearance to the cast web. The cast web was continuously oriented by conventional sequential length orienter (LO) and tenter equipment. The web was length oriented to a draw ratio of about 3.3 at about 100° C. The film was preheated to about 100° C. in about 22 seconds in the tenter and drawn in the transverse direction to a draw ratio of about 3.5 at a rate of about 20% per second. The finished film had a final thickness of about 0.05 mm.

Figure 22:
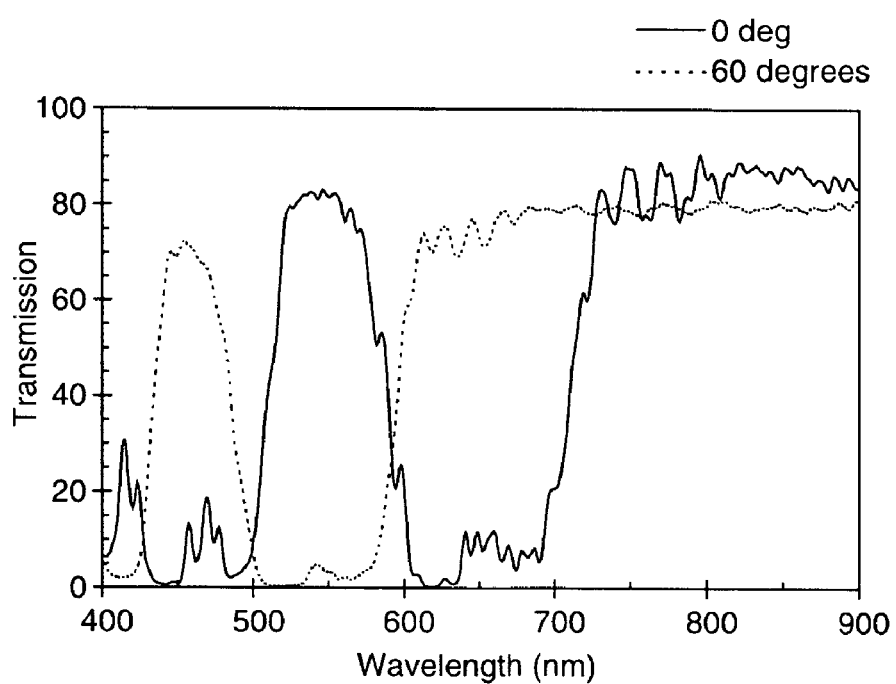
FIG. 22 is a transmission spectrum for a green pass filter of the present invention taken at normal incidence and at 60°.

The transmission spectrum for unpolarized light at zero and 60° angle of incidence is shown in FIG. 22. The transmission for p-polarized light of a similar film with thicker caliper (slower casting wheel speed) was shown above in FIGS. 1 and 2. Although the indices of refraction of the quarter wave thick PET layers cannot be measured directly, they are believed to be approximately the same as the indices of the PET skin layers. The indices of refraction for the PET skin layers of the film of this example are nx=1.678, ny=1.642, nz=1.488. Again, as in EXAMPLE E1-1, if a closer match between the MD and TD indices is desired, then the stretch ratios may be adjusted to obtain a balanced film. The isotropic index of Ecdel is near 1.52. With the process conditions listed in this example, Ecdel is believed to remain substantially isotropic compared to the PET.

In this example, the stop band near 650 nm has a bandwidth of 90 nm, and has an average in-band transmission of 5.6 percent. The slopes of the blue and red bandedges are 3.0 and 1.9 percent per nm, respectively. The band width of the same stop band at 60° angle of incidence is 86 nm, and has an average in band transmission of 2.6%. The slopes of the bandedges do not change substantially between 0 and 60° angle of incidence. For the spectrum at 60°, the pass band near 460 nm has a bandwidth of about 52 nm and a maximum transmission of 72%, and the blue and red bandedges have slopes of 2.4 and 2.9% per nm, respectively.

To achieve bright saturated colors in certain preferred embodiments of the present invention, it is important for a color filter to have high transmission in the pass bands and low transmission in the stop bands. To obtain striking visual effects with a birefringent stack that has a given z-index match condition, the optical stack must provide for high reflectance so that only several percent or less of the light within a stop band is transmitted. Preferably, the average transmission within the reflectance bands of a color shifting film, at the nominal design angle, is less than about 10%, more preferably less than about 5%, and even more preferably, less than about 2%. For good color rendition, it also preferable that the bandedges exhibit a high slope. Preferably, the slopes are at least about 1 per nm, more preferably greater than about 2% per nm, and even more preferably greater than about 4% per nm.

In addition to the above, for good color rendition, it is preferable for the average transmission in the stop band to be less than about 10% and to have no passbands within said stopband whose peak transmission values are greater than about 20%. More preferably, the average transmission in the stop band is less than about 5% and the maximum transmission of a passband peak within a stopband is about 10%. The restriction on leaks is important, even as applied to narrow spectral leaks that may occur in a stop band. When combined with certain narrow band emission sources such as low pressure sodium lamps or certain fluorescent lamps, a large percentage of the light source energy can be transmitted through a narrow band leak in a stopband.

To provide for pure colors in reflection, a reflection band must be relatively narrow, and the out-of-band reflection must be small. Acceptable red, green or blue reflectance colors can be achieved with bandwidths of about 100 nm. High purity colors can be obtained with reflectance bands of 50 nm. Reflectance bands of 25 nm or smaller will produce very high purity colors, with color coordinates near the perimeter of the CIE color space. To obtain these high purity colors in reflection, the out of band reflections from the air polymer interface must be suppressed by an anti-reflection coating, or by immersion in an index matching medium.

To obtain sharp bandedges, a computer optimized layer thickness distribution may be utilized, or a band sharpening thickness profile as described in U.S. Pat. No. 6,157,490 (Wheatley et al.) titled "Optical Film with Sharpened Bandedge", may be applied to the layer thickness distribution design. Similarly, in a preferred embodiment of color filters having high color purity, a pass band should have sharp bandedges. In such an embodiment, preferably the slopes of the bandedges of a pass band are at least about 1% per nm, more preferably greater than about 2% per nm, and even more preferably greater than about 5% per nm. The peak transmission within a pass band for many applications is desirably close to that of a clear film, on the order of 90%. For narrow pass bands, such high transmission values are not possible if the edge slopes are too small. As illustrated by the examples herein, pass bands with peak transmissions of 50%, 70% and 85% are possible. Bandwidths as narrow as 10 nm are possible having peak transmissions of 25% and even 35%. Any pass band width wider than 20 nm is also possible, but the desired width will depend on the intended application.

E2. Colored Polarizers

The principles of the present invention may be used to produce color shifting films that behave as-polarizers over one or more regions of the spectrum. Such films, for example, may behave as a broadband reflector toward a first polarization of light over the visible region of the spectrum, while behaving as a color shifting narrow pass filter toward a second polarization of light (e.g., the second polarization is transmitted over a narrow bandwidth in the visible region of the spectrum and is reflected elsewhere in the visible region, and the transmission band shifts in wavelength as a function of angle of incidence). Films of this type are illustrated in EXAMPLES E2-1 and E2-2.

EXAMPLES E2-1 TO E2-3

PEN was fed at a rate of 81 lb/hr (37 kg/hr) and at a temperature of 525° F. (274° C.) into a 224 layer feedblock. A copolyester of 70% naphthalate and 30% isophthalate with ethylene glycol was fed into the feedblock at a rate of 117 lb/hr (53 kg/hr) and at a temperature of 540° F. (282° C.) for the skin layers, and at a rate of 115 lb/hr (52.3 k/hr) and a temperature of 525° F. (274° C.) for the optical layers. The temperature of the feedblock was maintained at 555° F. (290° C.). The web was cast at 20, 25, and 30 meters/min for EXAMPLES E2-1, E2-2, and E2-3, respectively, and was stretched in a tenter oven at 154° C. to a stretch ratio of 6:1 to produce colored polarizers.

Figure 23:
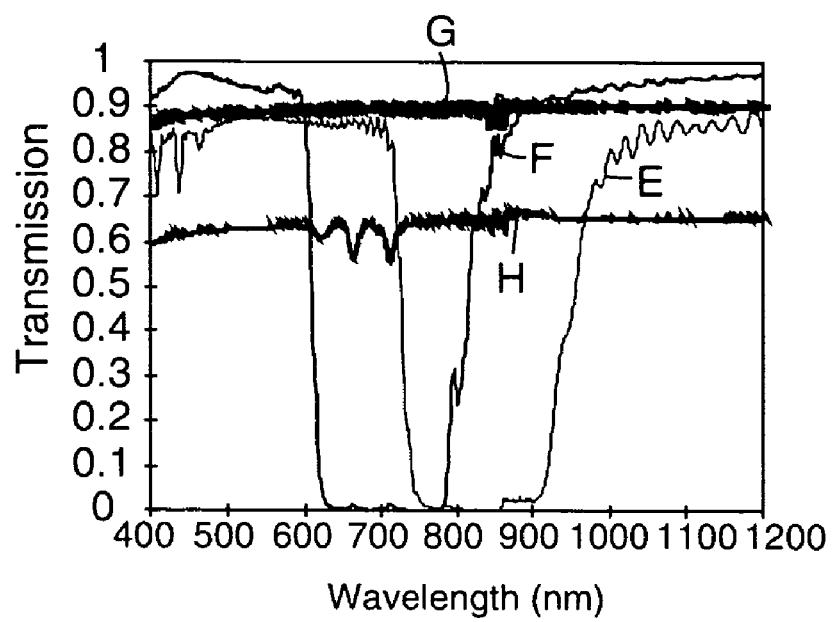
FIG. 23 is a transmission spectrum for a clear-to-cyan polarizer of the present invention taken at normal incidence and at 60°.
Figure 24:
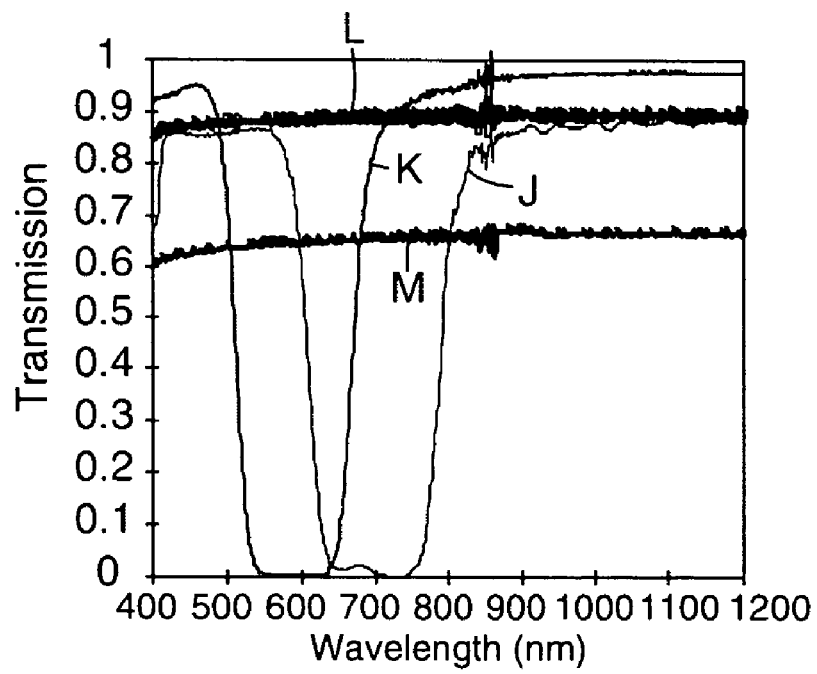
FIG. 24 is a transmission spectrum for a cyan-to-blue polarizer of the present invention taken at normal incidence and at 60°.
Figure 25:
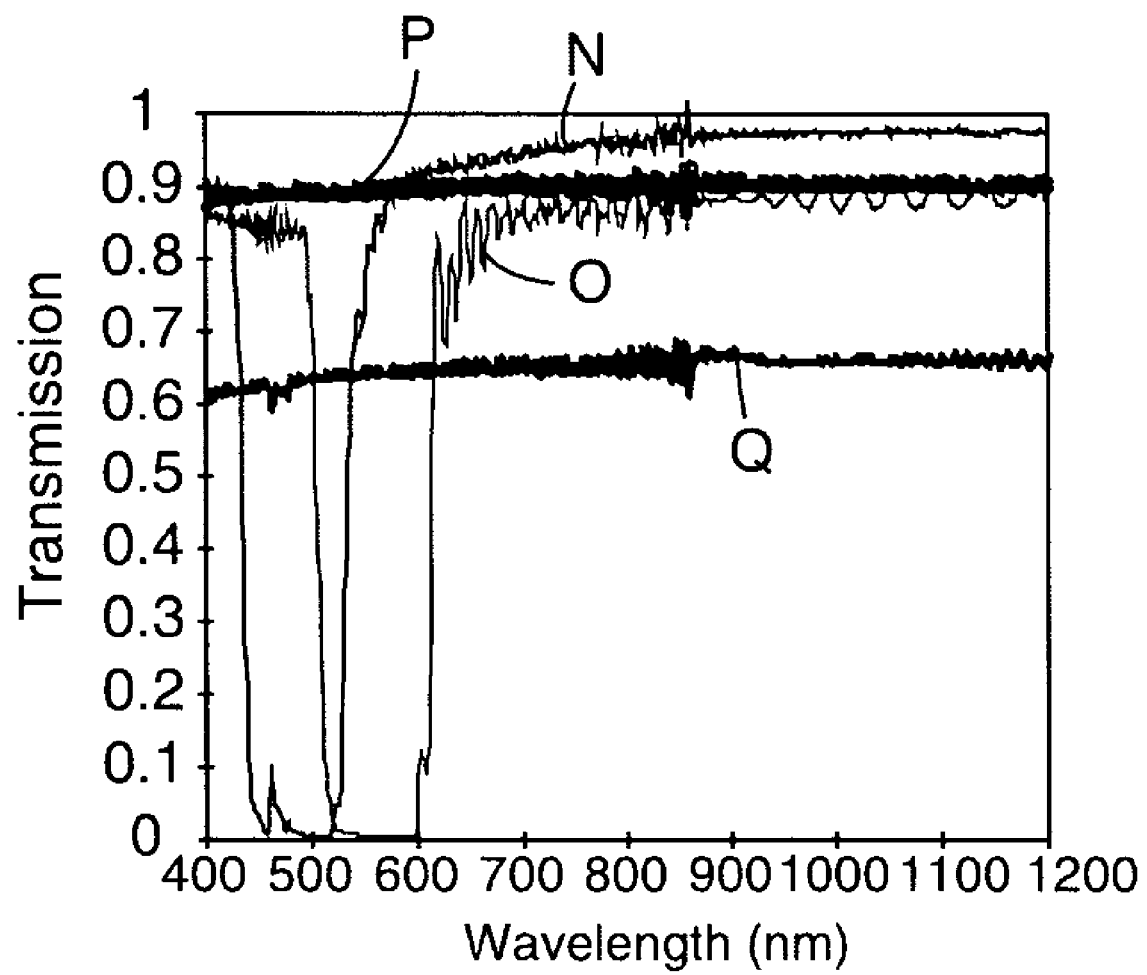
FIG. 25 is a transmission spectrum for a magenta-to-yellow polarizer of the present invention taken at normal incidence and at 60°.

The films of EXAMPLES E2-1, E2-2, and E2-3 appeared clear to cyan, cyan to blue and magenta to yellow, respectively, to the un-aided eye when viewed in transmission or when viewed in reflection after being laminated to a white, diffuse background. When the samples were viewed through a second (neutral) polarizer with its transmission axis at 90° to that of the colored polarizer, the colors were more vivid, and when the neutral polarizer was rotated so that its transmission axis was parallel to the transmission axis of the colored polarizer, white light was transmitted. FIGS. 23, 24 and 25 show the transmission spectra for the films of EXAMPLES E2-1, E2-2, and E2-3, respectively, for the cases of the E-field of the incident light parallel to the stretch direction and parallel to the non-stretch direction at 0 and 60 degrees to these films. Note the reflectance band shift of about 90 nm from 0 degrees to 60 degrees of incidence with the E-field parallel to the stretch direction, and the lack of a peak when the E-field is parallel to the non-stretch direction for the cyan to blue polarizer. The corresponding shifts for the magenta to yellow polarizer is 65 nm from 0 degrees to 60 degrees of incidence with e-field parallel to the stretch direction, and it also exhibits the lack of a peak when the e-field is parallel to the non-stretch direction. The bandedge slopes for these polarizers range from about 3 to 4% per nm for the blue edges, and about 1.5 to 3% per nm for the red edges.

E3. Combinations of Colored Mirrors and Polarizers

In some embodiments of the present invention, the color shifting film is used in combination with a polarizer. In a particularly preferred embodiment, the polarizer is a diffusely reflective polarizing film, such as the continuous/disperse phase polarizing films described in U.S. Pat. No. 5,825,543 (Ouderkirk et al.), which is incorporated herein by reference. In this embodiment, the color shifting film may be of a type which goes from being highly reflective at normal angles of incidence to transmissive (for at least some wavelengths) at oblique angles.

In one particular construction, the color shifting film is of a type that has a mirror-like appearance at normal angles of incidence, but becomes fairly transparent and cyan in color at oblique angles; this CSF is then used in combination with a white, diffusely reflective polarizing film of the type described in U.S. Pat. No. 5,825,543 (Ouderkirk et al.). The resulting combination behaves as a broadband mirror at normal incidence, but is diffusely reflective and polarizing for most (e.g., non-cyan) wavelengths of light at oblique angles. Such a film is particularly useful as a security film. In a similar construction, the same CSF is used in combination with an absorbing polarizer (e.g., the type made with dichroic dyes). When viewed in transmission, the film goes from being black at normal incidence to being a colored polarizer at oblique angles. Of course, the ultimate colors of such combinations, as they appear to the observer, will depend on a variety of factors, such as the type and orientation of the light source, the properties of the CSF (including the wavelengths to which it is tuned), and the degree of scattering, if any, provided by the polarizer, and the presence and color of any substrates.

E4. Partial Polarizers

The principles of the present invention may be used to produce color shifting films that behave as partial polarizers over one or more regions of the spectrum. Such a film can be designed, for example, so that light having planes of polarization parallel to the major and minor stretch axes are transmitted at essentially the same wavelengths, and so that the % transmission for the polarization parallel to one axis is higher than the % transmission for the orthogonal polarization. The transmission spectra for both polarizations shift as a function of angle of incidence. Films of this type are illustrated in EXAMPLE E4-1.

EXAMPLE E4-1

A multilayer film containing about 418 layers was made on a flat-film making line via a coextrusion process. This multilayer polymer film was made from PET and ECDEL 9967 where PET was the outer layers or "skin" layers. A feedblock method (such as that described by U.S. Pat. No. 3,801,429) was used to generate about 209 layers with an approximately linear layer thickness gradient from layer to layer through the extrudate.

The PET, with an Intrinsic Viscosity (IV) of 0.56 dl/g, was pumped to the feedblock at a rate of about 34.0 kg/hr and the ECDEL at about 32.8 kg/hr. After the feedblock, the same PET extruder delivered PET as protective boundary layers (PBL's) to both sides of the extrudate at about 8 kg/hr total flow. The material stream then passed though an asymmetric two times multiplier (U.S. Pat. Nos. 5,094,788 and 5,094,793) with a multiplier ratio of about 1.40. The multiplier ratio is defined as the average layer thickness of layers produced in the major conduit divided by the average layer thickness of layers in the minor conduit. This multiplier ratio was chosen so as to leave a spectral gap between the two reflectance bands created by the two sets of 209 layers. Each set of 209 layers has the approximate layer thickness profile created by the feedblock, with overall thickness scale factors determined by the multiplier and film extrusion rates.

The ECDEL melt process equipment was maintained at about 250° C., the PET (optics layers) melt process equipment was maintained at about 265° C., and the multiplier, skin-layer meltstream, and die were maintained at about 274° C.

The feedblock used to make the film for this example was designed to give a linear layer thickness distribution with a 1.3:1 ratio of thickest to thinnest layers under isothermal conditions. To achieve a smaller ratio for this example, a thermal profile was applied to the feedblock. The portion of the feedblock making the thinnest layers was heated to 285° C., while the portion making the thickest layers was heated to 268° C. In this manner, the thinnest layers are made thicker than with isothermal feedblock operation, and the thickest layers are made thinner than under isothermal operation. Portions intermediate were set to follow a linear temperature profile between these two extremes. The overall effect is a narrower layer thickness distribution, which results in a narrower reflectance spectrum.

After the multiplier, a thick symmetric PBL (skin layers) was added at a rate of about 35 kg/hour from a third extruder. The material stream then passed through a film die and onto a water cooled casting wheel at a rate of 13 meters/min. The inlet water temperature on the casting wheel was about 7° C. A high voltage pinning system was used to pin the extrudate to the casting wheel. The pinning wire was about 0.17 mm thick and a voltage of about 5.5 kV was applied. The pinning wire was positioned manually by an operator about 3–5 mm from the web at the point of contact to the casting wheel to obtain a smooth appearance to the cast web. The cast web was continuously oriented by conventional sequential length orienter (LO) and tenter equipment. The web was threaded through the length orientor, but not stretched. In the tenter, the film was preheated to about 100° C. in about 22 seconds and drawn in the transverse direction to a draw ratio of about 5 at a rate of about 20% per second. The film was heat set for about 20 seconds in a zone set at 121° C. The finished film had a final thickness of about 0.06 mm.

The refractive indices were measured at 633 nm for the PET skin layer on a Metricon. In this discussion, the x direction is the transverse direction (direction of stretching), the y direction is the machine direction (non-stretch direction) and the z direction is in the thickness dimension of the film.

| Example | nx | ny | nz |
| --- | --- | --- | --- |
| E4-1 | 1.660 | 1.573 | 1.528 |

The ECDEL amorphous copolyester has been measured to have a refractive index of 1.52, and does not change more than about 0.01 under these stretch conditions.

The film of this example exhibits a color shift when viewed by the naked eye (both polarizations) from orange at normal incidence to bright green at viewing angles beyond 50 degrees. When viewed through a neutral polarizer, with the pass direction parallel to the stretch direction, the film appears red. When the polarizer is oriented with the pass direction parallel to the non-stretch direction, the film is yellow. Because there is still a refractive index difference between the PET in the non-stretch direction and the ECDEL, there are still two reflectance peaks evident. The center position of the peaks is related to the equation:

$$\lambda/2 = t_1 + t_2 = n_1 d_1 + n_2 d_2 \qquad \text{EQUATION E4-1}$$

where $\lambda$=wavelength of maximum light reflection
  $t_1$=optical thickness of the first layer of material
  $t_2$=optical thickness of the second layer of material
and
  $n_1$=refractive index of the first material
  $n_2$=refractive index of the second material
  $d_1$=actual thickness of the first material
  $d_2$=actual thickness of the second material.

For the ECDEL (material 2), both $n_2$ and $d_2$ are constant. However, the wavelength of reflection shifts with polarization when $n_{1x}$ vs. $n_{2y}$ is put into the equation. For example, if the ECDEL layers are 82 nm thick and the PET layers are 77 nm thick, $\lambda_x$ is given by the peak wavelength reflected for polarization parallel to the stretch direction, or $$\lambda_x = 2(1.66(77) + 1.52(82)) = 505 \text{ nm} \qquad \text{EQUATION E4-2}$$

Similarly, $\lambda_y$ is given by the peak wavelength reflected for polarization parallel to the non-stretch direction, or $$\lambda_y = 2(1.57(77) + 1.52(82)) = 491 \text{ nm} \qquad \text{EQUATION E4-3}$$

Figure 26:
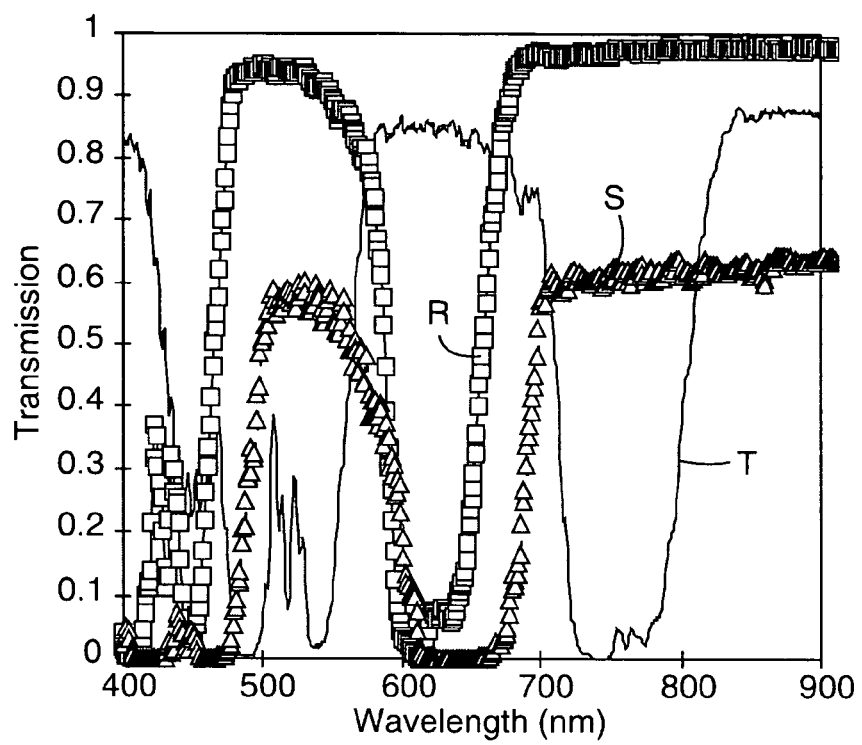
FIG. 26 is a transmission spectrum for a PET/Ecdel film of the present invention for light polarized parallel to the stretch and non-stretch directions.
Figure 27:
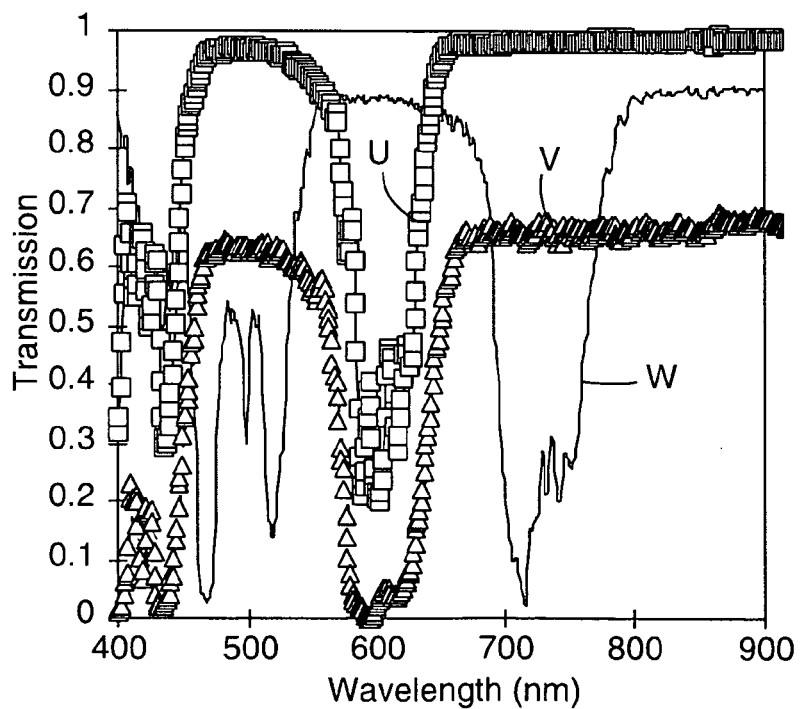
FIG. 27 is a transmission spectrum for a PET/Ecdel film of the present invention for light polarized parallel to the stretch and non-stretch directions.

The reflectance peak is much stronger for the peak with polarization parallel to the stretch direction, since the Δn parallel to the stretch direction is 0.132 vs. 0.045 for light of polarization parallel to the non-stretch direction. This contributes to a broader peak, which makes the effective band-edge shift about 40 nm instead of the 14 nm calculated above. The transmission spectra for light polarized parallel to the stretch and non-stretch directions are included below in FIGS. 26 and 27.

E5. Film Geometry

The color film geometry can be separated into two different types. Those geometries wherein the film is placed on planar facets, or on simple curves such as, for example, cylinders or cones, will be labeled as type I. Any of these forms can be made without stretching or otherwise distorting the film in a manner that would change its optical properties. If the film is made with essentially uniform color, then any color variation arises essentially from the various geometric angles the film presents to the viewer.

Those wherein the film has different colors in different areas when viewed at normal incidence will be labeled as type II. This variable color can be imparted in the extrusion process, or by post extrusion processes such as a non-uniform stretch, for example, in thermoforming in order to fit compound curves, or by embossing small areas of the film. Non-uniform stretching or embossing the film will cause the film to become preferentially thinner in some regions. When that occurs, a color change from one portion of the film to another is evident even without a change in angle of observation.

E6. Multilayer Combinations

If desired, one or more sheets of a multilayered film made in accordance with the present invention may be used in combination with, or as a component in, a continuous/disperse phase film. Suitable continuous/disperse phase films include those of the type described in U.S. Ser. No. 08/801,329 (Allen et al.). In such a construction, the individual sheets may be laminated or otherwise adhered together or may be spaced apart (e.g., so that they are in optical communication with each other but are not in physical contact). A composite combining mirror sheets with polarizer sheets is useful for increasing total reflectance while still polarizing transmitted light.

Alternatively, a single co-extruded sheet may be produced to form a film having selective reflective and polarizing properties. For example, a multilayer combination can be constructed in which certain layers are designed as-polarizing layers over a portion of the desired spectrum while other layers are designed as mirror layers over the surrounding portion of the desired spectrum (e.g., a mirror film with a spectral leak which is deliberately plugged by the polarizing layers). The color of the transmitted polarized light will then shift with viewing angle. When two sheets of these same materials are aligned along the same polarization axis, they appear similar to the individual sheets (if reflectance is very high). When aligned in a crossed state, they appear as uncolored (silvery) mirrors. Thus, they provide a method for verification in security applications without the need for additional testing equipment.

The two sets of layers can be chosen so that the first set produces a mirror while the second set produces a polarizer under the same process conditions. For example, mirrors may be created by drawing materials (at least one of which is birefringent) in two in-plane directions (e.g., biaxial drawing). Polarizers may also be created by drawing birefringent materials in two in-plane directions, using two or more drawing steps. A method for creating polarizers in this fashion is described in U.S. Pat. No. 6,179,948 (Merrill et al.) titled "An Optical Film and Process for Manufacture Thereof", and incorporated herein by reference. The polarizing layers may be a multilayer stack or one or more continuous/disperse phase layer(s). Thus, a two step drawing process can be used to form some of the layers as mirror layers while others form as-polarizing layers.

In general, any of the aforementioned systems suitable to making a color shifting film could be combined with systems suitable for making biaxially drawn polarizers as described in U.S. Pat. No. 6,179,948 (Merrill et al.) titled "An Optical Film and Process for Manufacture Thereof". Thus, a coextruded single sheet can be made that would comprise a first reflecting, mirror system and a second, polarizer system. One particularly useful mirror system comprises PEN or a co-polymer comprising PEN subunits as the material of high birefringence after drawing, as previously described herein. Again, suitable polymers such as low index polyesters or PMMA are useful as the second material. A particularly useful polarizing system comprises a multilayer stack of PEN (or copolymers comprising a majority of PEN subunits) and PET (or copolymers comprising a majority of PET subunits). Under process conditions that make a good biaxially drawn polarizer for the second system, the aforementioned first system would form a good biaxially drawn mirror. Moreover, the PET layers could be oriented to a varying degree of z-index match or mismatch as desired. In the case of a mismatch, the PET would often assume a higher value than the PEN layers.

Another particularly useful class of second systems to couple with the class of first systems using PEN are the continuous/disperse phase systems also described previously herein and in U.S. Pat. No. 6,179,948 (Merrill et al.), (e.g., a sufficiently high molecular weight of PEN or conversely a sufficiently low molecular weight for the coPEN of the continuous phase), a composite single sheet comprising these two systems can be processed so that the first drawing step leaves the continuous/disperse phase system in a state of low optical orientation but sufficiently orients the first system so that a second draw process, now orienting for both systems, results in a first mirror system and a second polarizer system within the single sheet. For ease of coextrusion, the second system could be located as a skin layer or a near outer layer. In this latter case, the outermost layer may be a skin of lower molecular weight PEN used as a coextrusion aid and as a protective layer to prevent sticking to rollers or clips during the drawing processes.

In one particular example of this embodiment, the optical body consists of a multilayer film in which the layers alternate between layers of PEN and layers of co-PEN. Some of the PEN layers include a disperse phase of syndiotactic polystyrene (sPS) within a matrix of PEN. Since the layering or inclusion of scatterers averages out light leakage, control over layer thickness is less critical, allowing the film to be more tolerable of variations in processing parameters.

Any of the materials previously noted may be used as any of the layers in this embodiment, or as the continuous or disperse phase within a particular layer. However, PEN and co-PEN are particularly desirable as the major components of adjacent layers, since these materials promote good laminar adhesion.

Also, a number of variations are possible in the arrangement of the layers. Thus, for example, the layers can be made to follow a repeating sequence through part or all of the structure. One example of this is a construction having the layer pattern . . . ABCB . . . , wherein A, B, and C are distinct materials or distinct blends or mixtures of the same or different materials, and wherein one or more of A, B, or C contains at least one disperse phase and at least one continuous phase. The skin layers are preferably the same or chemically similar materials.

Combined Isotropic/Birefringent Film Stacks

The multilayer stacks of the present invention can also be combined with multilayer stacks of the prior art to create some unusual angularity effects. For example, a birefringent colored film of the present invention, having one or more transmission peaks centered at given wavelengths at normal incidence, could be coated, coextruded, or laminated with a stack of isotropic layers which reflect at those given wavelengths at normal incidence. The combined article will appear as a complete mirror at normal incidence, as all visible wavelengths are reflected by the combined article. However, at oblique angles, the isotropic films will leak p-polarized light, allowing the transmission peaks of the birefringent film to be visible. The greatest effect will appear for isotropic film stacks which have a Brewster angle at or near an oblique viewing angle.

E7. More Than Two Layers in Repeating Unit

While many embodiments of the present application will contain optical stacks having alternating layers of only two different materials (i.e., having an AB unit cell construction), the present invention also contemplates stack designs employing three or more materials. Thus, an ABC or ABCB unit cell can be utilized to produce a color shifting film that maintains color purity and saturation at all angles of incidence, although of course the hue changes with angle just as it does for two material component stacks. The materials used in these constructions may be derived from different monomers, or two or more of the materials may be derived from the same monomers but in different ratios. Thus, for example, A could be PEN, and B and C could be different grades of coPEN that differ from each other in the ratio of naphthalene dicarboxylic acid monomer present.

The underlying principle for these constructions is similar to that for the two component unit cell stack: arrange for the effective Fresnel reflection coefficient of the multicomponent unit cell to remain constant with angle of incidence for p-polarized light. In a two material component system, this is accomplished by matching the z-index of refraction of the two material components. With three or more materials in a unit cell, matching the z-index of all materials is still preferred, but may not always be possible, or practical. However, a z-index mismatch at one material interface can be corrected by a mismatch of opposite sign at another material interface (the sign is with respect to the in-plane index differences).

Using an ABCB repeat structure as an example of a ½ lambda unit cell, with A as the highest in-plane index material and C as the lowest in-plane index material, if the A/B interface has a z-index mismatch, the unit cell effective Fresnel reflection coefficient can be made approximately constant with angle of incidence by selecting the material C such that the B/C interface has a mismatch of the opposite sign. The required relative magnitude of the two z-index mismatches depends on the magnitudes of the mismatches in the in-plane indices. If the A/B and B/C in-plane index mismatches are of equal magnitude, then the z-index mismatches should be of equal magnitude and opposite signs. In general, when the in-plane differentials (A/B and B/C) are unequal, the z-index differentials must be chosen so that the effective interfacial index differentials are approximately equal over the angular range of interest and of the opposite sign. The effective index of a birefringent layer can be derived as an algebraic function of the in-plane and z-indices of refraction of that layer.

E8. Combinations with Diffusely Reflective Substrates

The color shifting films of the present invention may be laminated, affixed, or otherwise optically coupled to various substrates to obtain particular optical effects, depending, among other things, on the color of the substrate and on its optical properties (e.g., whether it is primarily specularly reflective or diffusely reflective). Thus, for example, the color shifting films of the present invention may be glued, laminated, or otherwise affixed to card stock, paper, white painted surfaces, or diffusely reflective surfaces such as the diffusely reflective optical films described in U.S. Pat. No. 6,057,961 (Allen et al.), which is incorporated herein by reference. Similarly, various optical effects may be obtained by coating the color shifting films of the present invention with various materials, such as spray paint, vapor deposited metals, metal oxides, metal salts, and the like. The optical effects observed with the resulting articles will depend, among other things, on the light source used to illuminate the article (e.g., ambient lighting, polarized light sources, UV light sources, etc.).

Figure 28:
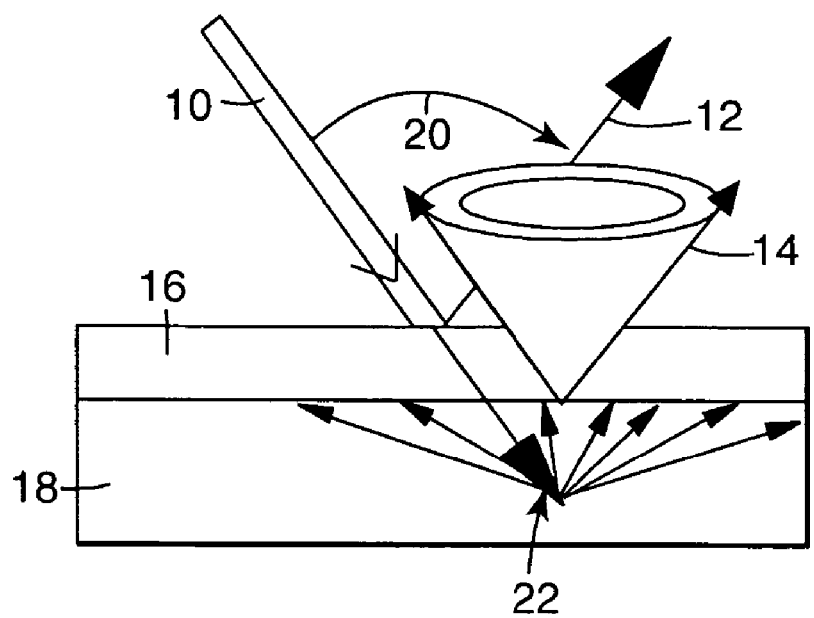
FIG. 28 is a schematic diagram illustrating the optical behavior of a color shifting film of the present invention when it is laminated to a diffusely scattering substrate.
Figure 29:
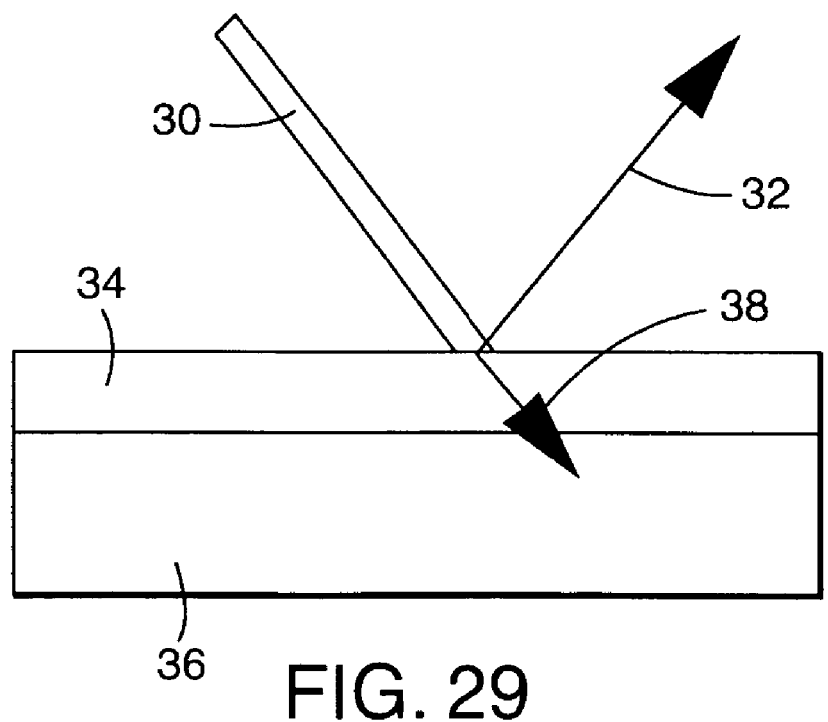
FIG. 29 is a is a schematic diagram illustrating the optical behavior of a color shifting film of the present invention when it is laminated to a black surface.
Figure 30:
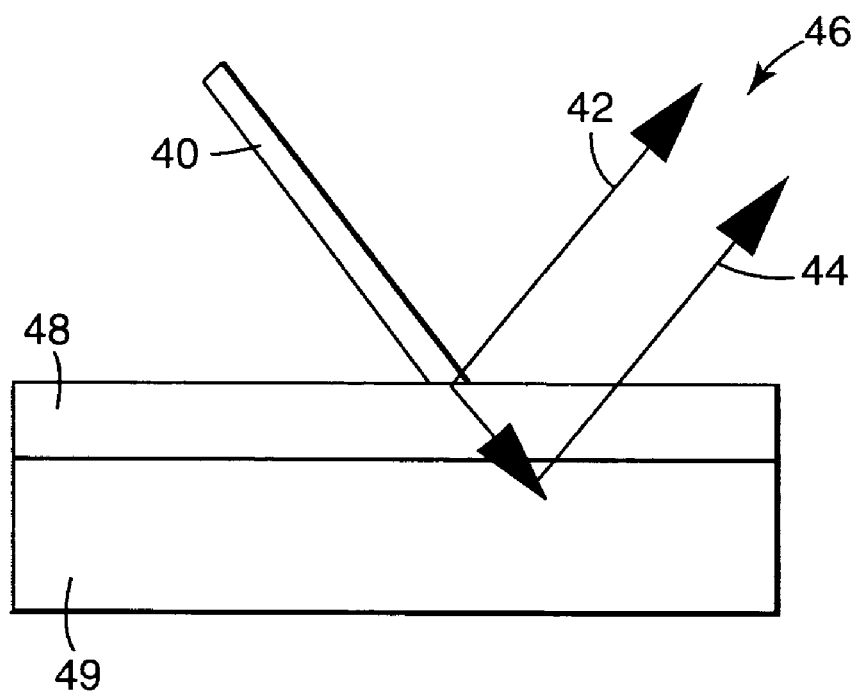
FIG. 30 is a schematic diagram illustrating the optical behavior of a color shifting film of the present invention when it is laminated to a mirrored substrate.

FIGS. 28 to 30 illustrate the optical effects observed when the color shifting films of the present invention are laminated to various substrates and viewed in reflection. A display that changes color as a function of angle may be created by laminating the color shifting films of the present invention to diffusely reflecting white surfaces such as card stock, white painted surfaces, or other diffusely reflective surfaces. For example, the green/magenta color shifting film described in Example E1-2 was laminated with a clear optical adhesive to white cardstock, and viewed in ambient room light. The normally white card appeared bright green when viewed directly, i.e., with the plane of the film orthogonal to the line of sight of the observer. When the card was turned to about 60° from the normal position, the card appeared magenta in color.

A diffusely reflecting substrate is advantageous in that the colors transmitted by the film will be scattered by the substrate out of the plane of incidence of the colored light that is specularly reflected by the film (or reflected at a different angle of reflection in the plane of incidence), thus allowing the viewer to discriminate between the transmitted and reflected colors. The specularly reflected ray can be seen at only one position, but the diffusely reflected ray can be seen at any azimuth around the cone of diffuse reflection where the cone half angle equals the angle of incidence θ. Other colors can be seen at other angles of incidence and reflection.

FIG. 29 illustrates the optical behavior of a color shifting film of the present invention as viewed in reflection when it is laminated to a black surface. As noted in reference to FIG. 28, the reflected color of the film is difficult to observe against a reflective substrate, because the eye must be located at the position of the specularly reflected beam and can be fooled by any light being transmitted through the film at the same time. If a reflective colored film is laminated to a black surface, only its reflective colors will be seen. Hence, a highly absorbing (e.g., black) substrate is advantageous in that the colors observed from the article are primarily dictated by the wavelengths of electromagnetic radiation which are reflected from the optical stack of the film.

FIG. 30 illustrates the optical behavior of the color shifting film of the present invention as viewed in reflection when it is laminated to a mirrored surface. Here, the beam which is specularly reflected from the film will combine with the beam that is specularly reflected from the mirrored surface to give the same color as the incident beam of light. Colored film laminated to a broadband highly reflective surface will not appear to be colored because the viewer sees all colors reflected. A colored mirror, or a color filter, may be used in this embodiment to eliminate certain wavelengths of electromagnetic radiation from the reflection spectrum of the article which are initially transmitted by the color shifting film.

Figure 31:
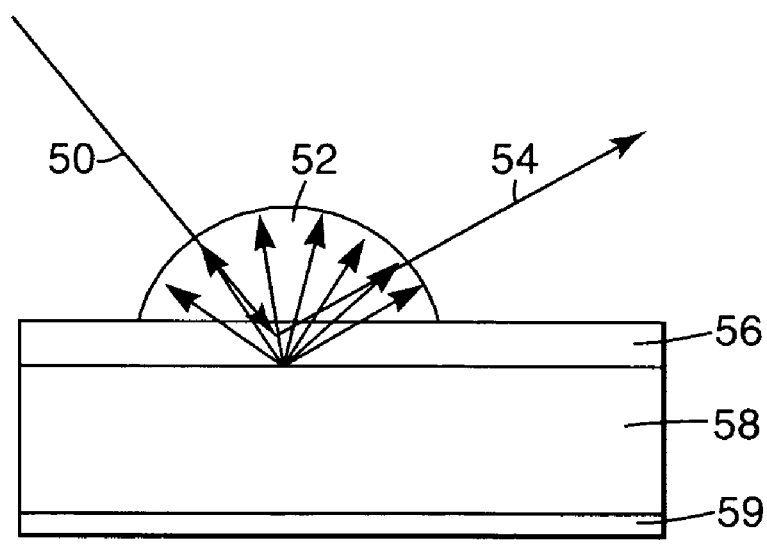
FIG. 31 is a schematic diagram illustrating the optical behavior of a diffusive polarizer in combination with a specular color shifting polarizer and an optional absorptive layer.

Additionally, the diffusely reflecting medium can be a diffusely reflective polarizer, comprising layers having both a continuous phase and a disperse phase, to be paired with a specularly reflective color shifting multilayer optical film which may or may not be a polarizer. In the case where both layered and diffusive polarizers are used, in some applications it would be preferred to have the respective reflective polarization axes orthogonal. As shown in FIG. 31, the layered film will specularly reflect one polarization and impart an angularly dependent color, while the diffusive film will reflect the orthogonal polarization. It is possible to incorporate a dye into the diffusive film such that as the chromatic characteristic of the specular film varies, the diffusive component color remains constant, thus providing a very unique color shifting film. In some embodiments, a black layer is used on the side of the diffusive polarizer opposite the layered film to absorb any transmitted light. This latter absorbing film can be an absorptive polarizer or simply a black substrate such as carbon black.

Additional optical effects may be obtained by placing a scattering medium on one side of the color shifting film, and illuminating the film from the other side with a diffuse light source. In general, it is only necessary that the scattering medium be in optical communication with the film and be in sufficiently close proximity to the film so that the light that hits the scattering medium is coming from a sufficient range of angles after it passes through the film. If desired, however, the air interface between the film and the scattering medium may eliminated through the use of a suitable adhesive. With proper selection of scattering media, the treated areas and untreated areas of the film will appear as different colors when viewed in transmission.

For example, if the color shifting film is of a type that has a narrow transmission band in the red region of the spectrum when measured at normal incidence (zero degrees) and if the bare film is illuminated with a diffuse source, the bare film will appear red if viewed at an angle such that the line from the viewer to the film is perpendicular to the plane of the film. The observed color will shift from red to green as the viewing angle changes such that the line from the viewer to the bare film moves closer to being parallel with the plane of the bare film However, if a piece of white paper is placed on the opposite side of the film from the light source, the portion of the film covered by the paper appears yellowish green at all angles when viewed in transmission. If a piece of brightness enhancement film (BEF) is placed on the opposite side of the film from the light source, the portion of the film covered by the BEF appears green when viewed in transmission at an angle such that the line from the viewer to the BEF/film combination is perpendicular to the plane of the film, and shifts to an orange/red as the viewing angle changes such that the line from the viewer to the BEF/film combination moves closer to being parallel with the plane of the BEF/film combination.

EXAMPLES E8-1 TO E8-6

The following examples illustrate the optical effects observed when the color shifting films of the present invention are combined with various scattering media and viewed in transmission.

In EXAMPLE E8-1, a sample of color shifting film was utilized which had alternating layers of PEN and PMMA and which was made in substantially the same manner as the film of EXAMPLE E1-1. The film of EXAMPLE E8-3 differed from the film of EXAMPLE E8-1 only in that it was cut from the edge (as opposed to the center) of the web, where slight differences in degree of orientation and/or layer thickness distribution cause a shift in the width of the transmission peak at normal incidence as compared to the transmission peak at normal incidence for films cut from the center of the web. The film of EXAMPLE E8-5 was made in the same manner as the film of EXAMPLE E8-1, but using a slightly faster casting wheel speed.

Each sample was placed on a Graphiclite D5000 Standard Viewer diffuse backlight, and transmission was measured for the sample with a spectrophotometer using a fiber optic collector that had a numerical aperture of 0.22. The fiber was placed directly on the film perpendicular to the plane of the film sample, thereby allowing light to enter the fiber from the source and through the bare film at angles no greater than 25 degrees from normal. The bare film sample was measured using a baseline of 100% transmission at all wavelengths if the backlight alone was measured. Color values were also calculated for the sample in L*, a*, b* color space, assuming illumination by a compact fluorescent bulb. The films of EXAMPLES E8-1, E8-3, and E8-5 appeared blue, magenta, and yellow, respectively, at normal incidence.

In EXAMPLES E8-2, E8-4, and E8-6, a piece of standard white 8.5×11 paper (available commercially from the Boise Cascade Co. under the product designation X-9000) was placed over the films of EXAMPLES E8-1, E8-3, and E8-5, respectively, normal angle transmission was measured, and color values were again calculated. The color values for EXAMPLES E8-1 to E8-6 are set forth in TABLE E8-1. The transmission values for samples E8-1 and E8-2 are shown in FIG. 32, while the transmission values for samples E8-3 and E8-4 are shown in FIG. 33 and the transmission values for samples E8-5 and E8-6 are shown in FIG. 34.

TABLE E8-1

| Sample | Film Color at Normal Incidence | With Paper? | L* | a* | b* | Subjective Color |
|---|---|---|---|---|---|---|
| E8-1 | Blue | No | 32.4 | 0.1 | −126.3 | Blue |
| E8-2 | Blue | Yes | 48.8 | 23.8 | −23.4 | Pink/Magenta |
| E8-3 | Magenta | No | 59.5 | 66.7 | −55.6 | Magenta |
| E8-4 | Magenta | Yes | 60.5 | 6.3 | 27 | Yellow/Orange |
| E8-5 | Yellow | No | 91.3 | 3.5 | 130.3 | Yellow |
| E8-6 | Yellow | Yes | 66.8 | −1.9 | 26.8 | Yellow |

Figure 32:
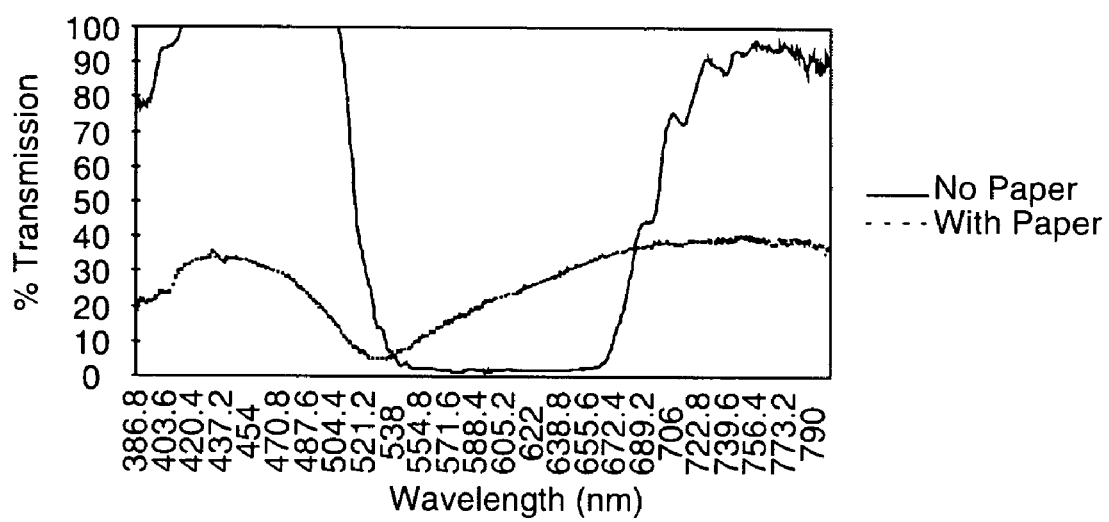
FIG. 32 is a transmission spectrum for a blue pass filter of the present invention with and without paper between the film and the detector.
Figure 33:
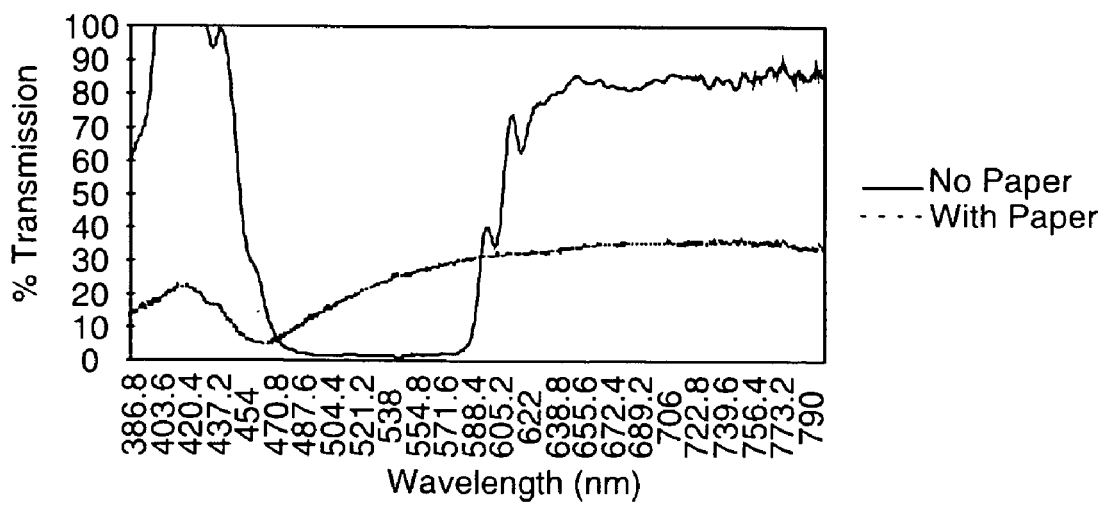
FIG. 33 is a transmission spectrum for a magenta pass filter of the present invention with and without paper between the film and the detector.
Figure 34:
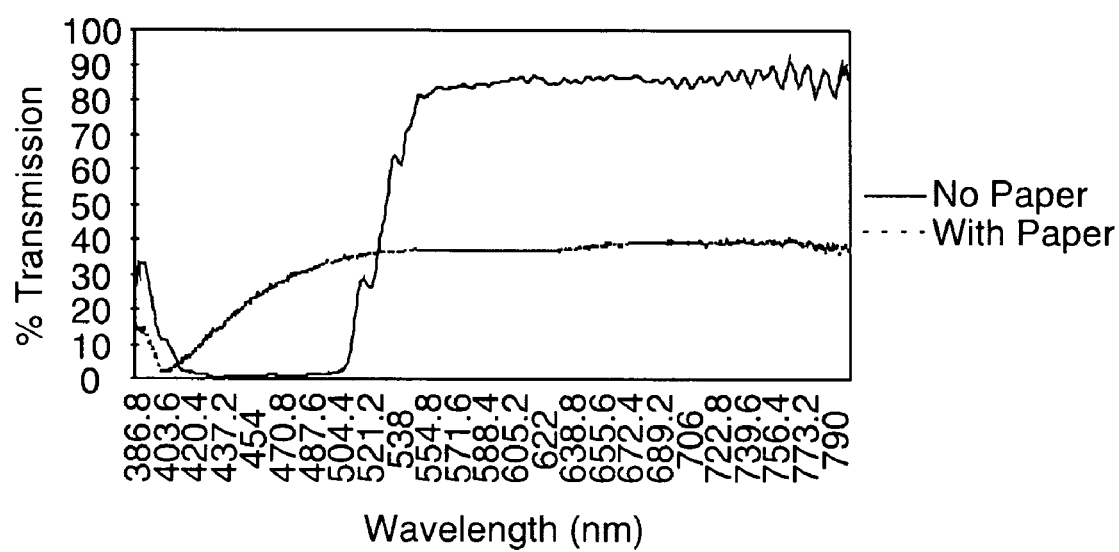
FIG. 34 is a transmission spectrum for a yellow pass filter of the present invention with and without paper between the film and the detector.

As shown by the results in TABLE E8-1 and in the spectra of FIGS. 32, 33, and 34, the blue, magenta, and yellow films shift color when a white piece of paper is placed between the film and the detector. The amount of color change when viewing a white paper/film combination is dependent on, among other things, the bandwidth of the color film and where it is positioned in the spectrum, as shown by the examples above. The magenta and blue films exhibit a noticeable color change when viewed in the paper/film combination, while the yellow film does not. Paper/film combinations of this type are useful in applications such as commercial graphics (illuminated backlights), security applications, and decorative lighting applications.

Other optical effects are possible when the films of the present invention are optically coupled to a light source and a scattering medium is placed between the film and the light source. While these embodiments typically require that the scattering medium be optically coupled to the film, it is not necessary in all embodiments that the film and scattering medium be in physical contact. In many of these embodiments, the areas of the film that are optically coupled to the scattering media appear brighter, and have a slightly different color, when viewed at oblique angles than areas of the film that are not in optical communication with the scattering medium.

EXAMPLES E8-7 TO E8-12

The following example illustrates the effects observable when a scattering medium is placed between a light source and the color shifting films of the present invention and the films are viewed in transmission.

In EXAMPLES E8-7, E8-9, and E8-11, samples of PEN/PMMA multilayer color shifting film were placed on a 3M 2150 overhead projector illuminator, Model 2100, and viewed in transmission looking directly at the overhead projector stage. The films of EXAMPLES E8-7 and E8-9 were identical to those of EXAMPLES E8-3 and E8-5. The film of EXAMPLE E8-11 was made in a similar manner to the film of EXAMPLE E8-1, but using a slower casting wheel speed. The films of EXAMPLES E8-7, E8-9, and E8-11 appeared magenta, yellow, and cyan, respectively, when viewed in transmission at normal angles, and yellow, clear, and dark blue, respectively, at oblique angles.

In EXAMPLES E8-8, E8-10, and E8-12, the procedures of EXAMPLES E8-7, E8-9, and E8-11, respectively, were repeated, this time with a piece of standard white 8.5×11 paper (available commercially from the Boise Cascade Co. under the product designation X-9000) placed under each film sample. The paper was sized smaller than the sample so that the appearance of each paper/film combination in transmission could be compared to the appearance of the film itself. When viewing the paper/film combinations side by side with the bare film, the color of the paper/film combinations appeared different from the bare film and for one example, the brightness of the paper/film combination appeared different from the bare film. The results are summarized in TABLE E8-2.

When samples E8-8 and E8-10 were viewed at oblique angles, the portions of the samples where there was paper between the film and the light source had a different color then the portions where there was no paper between the film and the light source. Sample E8-8 appeared greenish-yellow at oblique angles with paper and yellow without. Sample E8-10 appeared purple-white with paper and clear without. When sample E8-12 was viewed at oblique angles, both the color and brightness appeared different for the portions with paper as compared to the portions without. For the portions with paper between the film and the light source, the color appeared as a bright magenta, compared to a darker blue where there was no paper.

TABLE E8-2

| Sample | With Paper? | Color at Normal Incidence | Color at Oblique angles |
|---|---|---|---|
| E8-7 | No | magenta | yellow |
| E8-8 | Yes | magenta | greenish yellow |
| E8-9 | No | yellow | clear |
| E8-10 | Yes | yellow | purple white |
| E8-11 | No | cyan | dark blue |
| E8-12 | Yes | yellowish cyan | bright magenta |

Besides placing the color shifting films on black or white substrates, or using black or white pigment-filled adhesives, the color shifting films can be used in combination with colored substrates or substrates having a gray level between black and white. Such colored substrates can be opaque (transmitting substantially no light), translucent (diffusely transmitting, with various amounts of haze), or transparent (transparent to certain colors, i.e., clear without diffusers, but colored).

Three examples were made using the green pass filter of EXAMPLE E1-2 in combination with clear, colored substrates. The green pass filter transmits green light at normal incidence and reflects magenta (blue and red wavelengths). At high angles of incidence, the colors are reversed. The green pass filter was applied to clear (non-diffusive) red, yellow and blue colored plastic films. From the front side (the side the films were applied to using a clear optical adhesive), with the film/colored substrate combination placed on a white sheet of paper, each of the films appear near normal incidence to be one of two colors, depending on whether the eye catches mostly the specularly reflected rays or transmitted rays which are scattered by the paper:

red substrate: magenta or dull metallic
yellow substrate; copper or green
blue substrate: magenta or murky green.

When the film is used in combination with colored substrates or gray substrates, the observed effect is in between those of the white and black substrates that tends to confuse the viewer's eye as to what the "real" color is. Such articles have useful applications in attention-drawing displays.

When viewed from the backside (through the colored substrate), the above samples have the following appearance:

red substrate: red, on any background or substrate
yellow substrate: copper when on a dark background, magenta on a white background
blue substrate: purple on a dark background, green on a white background.

E9. Combinations with Specularly Reflective Substrates

As noted previously, the films of the present invention may be combined with mirrors (particularly broadband mirrors) and other reflective substrates to obtain an article which exhibits 3-D depth. This is conveniently achieved by arranging the film and the mirror so that they are approximately parallel but are spaced a short distance apart. While the effect may be observed with any mirror substrate, the use of flexible polymeric mirror films are especially preferred, because such mirror films are sufficiently flexible to be folded, undulated, or patterned such that the resulting article exhibits a rippled effect that enhances the 3-D effect. In one example, a CSF of the present invention, which is tuned to the blue region of the spectrum, was taped to a flexible broadband mirrored film. The dimensions of the broadband mirror film were slightly larger than those of the CSF. The films were then taped in such a way that the sides were flush, thereby introducing slack into the broadband mirror film. The resulting film reflected various hues of blue due to the differing angles of incidence provided by the mirrored substrate, and exhibited a rippled appearance not unlike the surface of a body of water. Such a film would be useful, for example, as a decorative backing for an aquarium.

Various methods may be used to provide the spacing between the CSF and the mirror substrate. Thus, for example, a portion of transparent netting may be placed between the CSF and the mirror substrate. Alternatively, the crystallinity of the CSF and/or the mirror substrate may be controlled so that one or both of these surfaces are lumpy, as described in U.S. Pat. No. 5,783,283 (Klein et al.).

E10. Non-Film Optical Bodies

While the present invention has been frequently described herein with reference to optical films, the principles and considerations described herein can be used to make a wide variety of other optical devices that may not be thought of as films. For example, a wide variety of color shifting thermoformed and molded articles may be generated from multilayer resin streams using the principles described herein. The films of the present invention may also be chopped into glitter, which may be used as a free flowing composition or may be dispersed through a solid (e.g., a solidified plastic resin) or liquid (e.g., a paint composition) matrix. The film may also be cut into strands of any dimension, which may be tied at one end (as in a pom-pom) or interwoven.

E11. Number of Layers

The films of the present invention typically contain between 10 and 1000 layers. For a single narrow band reflector, the range is preferably between 10 and 200 layers, and most preferably between 20 and 100 layers. A 50 layer stack of with 1.75/1.50 high/low indices will create a highly reflecting (99% peak R) band of about 10% fractional bandwidth FWHM (full width at half maximum). If the index differential is reduced by a fraction x, then the number of layers must be increased by 1/x to maintain the same peak reflectivity. The bandwidth is also narrowed by the fraction x, and to maintain the same bandwidth the number of layers would have to be increased again by approximately 1/x.

A cold mirror typically has between 100 and 1000 layers, depending on the application. For horticultural applications, for example, 90% reflectivity is acceptable, and may even be preferable for cost reasons because it can be realized with only about 200 layers. For reflectivities approaching 99%, at least 500 layers are typically preferred, although this number can vary dramatically depending on choice of materials. For example, if the application is such that the tendency of PEN to undergo UV yellowing would be problematic (and if the application precludes the use of UV adsorbers or blockers), then a PET/coPET multilayer system can be substituted, but would require at least about 1000 layers for similar reflectivities.

For a narrow band visible transmission filter, the range is preferably between 100 and 1000, and most preferably between 200 and 500. For a horticultural film having both a green reflector stack and an IR reflector stack, the range is preferably between 200 and 1000 and most preferably between 400 and 800. IR mirror films tuned to wavelengths beyond 1100 nm may require well in excess of 1000 layers, particularly if their stack designs involve more than two layers in the optical repeating unit in order to suppress higher order reflection bands.

F. Special Layers

F1. Skin Layers

A non-optical layer of material may be coextensively disposed on one or both major surfaces of the film, i.e., the extruded optical stack. The composition of the layer, also called a skin layer, may be chosen, for example, to protect the integrity of the optical layers, to add mechanical or physical properties to the final film or to add optical functionality to the final film. Suitable materials of choice may include the material of one or more of the optical layers. Other materials with a melt viscosity similar to the extruded optical layers may also be useful.

A skin layer or layers may reduce the wide range of shear intensities the extruded multilayer stack might experience within the extrusion process, particularly at the die. A high shear environment may cause undesirable deformations in the optical layers. Alternatively, if local variation of colors is a desired effect, decorative layer distortions can be created by mismatching viscosity of the optical layers and/or skins, or processing with little or no skins, such that at least some of the layers are undergo local thickness deformations, resulting in decorative colored effects. A skin layer or layers may also add physical strength to the resulting composite or reduce problems during processing, such as, for example, reducing the tendency for the film to split during the orientation process. Skin layer materials which remain amorphous may tend to make films with a higher toughness, while skin layer materials which are semicrystalline may tend to make films with a higher tensile modulus. Other functional components such as antistatic additives, UV absorbers, dyes, antioxidants, and pigments, may be added to the skin layer, provided they do not substantially interfere with the desired optical properties of the resulting product.

Skin layers or coatings may also be added to impart desired barrier properties to the resulting film or device. Thus, for example, barrier films or coatings may be added as skin layers, or as a component in skin layers, to alter the transmissive properties of the film or device towards liquids, such as water or organic solvents, or gases, such as oxygen or carbon dioxide.

Skin layers or coatings may also be added to impart or improve abrasion resistance in the resulting article. Thus, for example, a skin layer comprising particles of silica embedded in a polymer matrix may be added to an optical film produced in accordance with the invention to impart abrasion resistance to the film, provided, of course, that such a layer does not unduly compromise the optical properties required for the application to which the film is directed.

Skin layers or coatings may also be added to impart or improve puncture and/or tear resistance in the resulting article. Thus, for example, in embodiments in which the outer layer of the optical film contains coPEN, a skin layer of monolithic coPEN may be coextruded with the optical layers to impart good tear resistance to the resulting film. Factors to be considered in selecting a material for a tear resistant layer include percent elongation to break, Young's modulus, tear strength, adhesion to interior layers, percent transmittance and absorbance in an electromagnetic bandwidth of interest, optical clarity or haze, refractive indices as a function of frequency, texture and roughness, melt thermal stability, molecular weight distribution, melt rheology and coextrudability, miscibility and rate of inter-diffusion between materials in the skin and optical layers, viscoelastic response, relaxation and crystallization behavior under draw conditions, thermal stability at use temperatures, weatherability, ability to adhere to coatings and permeability to various gases and solvents. Puncture or tear resistant skin layers may be applied during the manufacturing process or later coated onto or laminated to the optical film. Adhering these layers to the optical film during the manufacturing process, such as by a coextrusion process, provides the advantage that the optical film is protected during the manufacturing process. In some embodiments, one or more puncture or tear resistant layers may be provided within the optical film, either alone or in combination with a puncture or tear resistant skin layer.

The skin layers may be applied to one or two sides of the extruded optical stack at some point during the extrusion process, i.e., before the extruded and skin layer(s) exit the extrusion die. This may be accomplished using conventional coextrusion technology, which may include using a three-layer coextrusion die. Lamination of skin layer(s) to a previously formed multilayer film is also possible. Total skin layer thicknesses may range from about 2% to about 50% of the total optical stack/skin layer thickness.

In some applications, additional layers may be coextruded or adhered on the outside of the skin layers during manufacture of the optical films. Such additional layers may also be extruded or coated onto the optical film in a separate coating operation, or may be laminated to the optical film as a separate film, foil, or rigid or semi-rigid substrate such as-polyester (PET), acrylic (PMMA), polycarbonate, metal, or glass.

A wide range of polymers are suitable for skin layers. Of the predominantly amorphous-polymers, suitable examples include copolyesters based on one or more of terephthalic acid, 2,6-naphthalene dicarboxylic acid, isophthalic acid phthalic acid, or their alkyl ester counterparts, and alkylene diols, such as ethylene glycol. Examples of semicrystalline polymers suitable for use in skin layers include 2,6-polyethylene naphthalate, polyethylene terephthalate, and nylon materials. Skin layers that may be used to increase the toughness of the optical film include high elongation polyesters such as ECDEL™ and PCTG 5445 (available commercially from Eastman Chemical Co., Rochester, N.Y.) and polycarbonates. Polyolefins, such as-polypropylene and polyethylene, may also be used for this purpose, especially if they are made to adhere to the optical film with a compatibilizer.

F2. Functional Layers

Various functional layers or coatings may be added to the optical films and devices of the present invention to alter or improve their physical or chemical properties, particularly along the surface of the film or device. Such layers or coatings may include, for example, slip agents, low adhesion backside materials, conductive layers, antistatic coatings or films, barrier layers, flame retardants, UV stabilizers, abrasion resistant materials, optical coatings, or substrates designed to improve the mechanical integrity or strength of the film or device.

The films and optical devices of the present invention may be given good slip properties by treating them with low friction coatings or slip agents, such as-polymer beads coated onto the surface. Alternately, the morphology of the surfaces of these materials may be modified, as through manipulation of extrusion conditions, to impart a slippery surface to the film; methods by which surface morphology may be so modified are described in U.S. Pat. No. 5,759,467 (Carter et al.).

In some applications, as where the optical films of the present invention are to be used as a component in adhesive tapes, it may be desirable to treat the films with low adhesion backsize (LAB) coatings or films such as those based on urethane, silicone or fluorocarbon chemistry. Films treated in this manner will exhibit proper release properties towards pressure sensitive adhesives (PSAs), thereby enabling them to be treated with adhesive and wound into rolls. Adhesive tapes made in this manner can be used for decorative purposes or in any application where a diffusely reflective or transmissive surface on the tape is desirable.

The films and optical devices of the present invention may also be provided with one or more conductive layers. Such conductive layers may comprise metals such as silver, gold, copper, aluminum, chromium, nickel, tin, and titanium, metal alloys such as silver alloys, stainless steel, and inconel, and semiconductor metal oxides such as doped and undoped tin oxides, zinc oxide, and indium tin oxide (ITO).

The films and optical devices of the present invention may also be provided with antistatic coatings or films. Such coatings or films include, for example, $V_2O_5$ and salts of sulfonic acid polymers, carbon or other conductive metal layers.

The optical films and devices of the present invention may also be provided with one or more barrier films or coatings that alter the transmissive properties of the optical film towards certain liquids or gases. Thus, for example, the devices and films of the present invention may be provided with films or coatings that inhibit the transmission of water vapor, organic solvents, $O_2$, or $CO_2$ through the film. Barrier coatings will be particularly desirable in high humidity environments, where components of the film or device would be subject to distortion due to moisture permeation.

The optical films and devices of the present invention may also be treated with flame retardants, particularly when used in environments, such as on airplanes, that are subject to strict fire codes. Suitable flame retardants include aluminum trihydrate, antimony trioxide, antimony pentoxide, and flame retarding organophosphate compounds.

The optical films and devices of the present invention may also be provided with abrasion-resistant or hard coatings, which will frequently be applied as a skin layer. These include acrylic hardcoats such as Acryloid A-11 and Paraloid K-120N, available from Rohm & Haas, Philadelphia, Pa.; urethane acrylates, such as those described in U.S. Pat. No. 4,249,011 and those available from Sartomer Corp., Westchester, Pa.; and urethane hardcoats obtained from the reaction of an aliphatic polyisocyanate (e.g., Desmodur N-3300, available from Miles, Inc., Pittsburgh, Pa.) with a polyester (e.g., Tone Polyol 0305, available from Union Carbide, Houston, Tex.).

The optical films and devices of the present invention may further be laminated to rigid or semi-rigid substrates, such as, for example, glass, metal, acrylic, polyester, and other polymer backings to provide structural rigidity, weatherability, or easier handling. For example, the optical films of the present invention may be laminated to a thin acrylic or metal backing so that it can be stamped or otherwise formed and maintained in a desired shape. For some applications, such as when the optical film is applied to other breakable backings, an additional layer comprising PET film or puncture-tear resistant film may be used.

The optical films and devices of the present invention may also be provided with shatter resistant films and coatings. Films and coatings suitable for this purpose are described, for example, in publications EP 592284 and EP 591055, and are available commercially from 3M Company, St. Paul, Minn.

Various optical layers, materials, and devices may also be applied to, or used in conjunction with, the films and devices of the present invention for specific applications. These include, but are not limited to, magnetic or magneto-optic coatings or films; liquid crystal panels, such as those used in display panels and privacy windows; photographic emulsions; fabrics; prismatic films, such as linear Fresnel lenses; brightness enhancement films; holographic films or images; embossable films; anti-tamper films or coatings; IR transparent film for low emissivity applications; release films or release coated paper; and polarizers or mirrors.

Multiple additional layers on one or both major surfaces of the optical film are contemplated, and can be any combination of aforementioned coatings or films. For example, when an adhesive is applied to the optical film, the adhesive may contain a white pigment such as titanium dioxide to increase the overall reflectivity, or it may be optically transparent to allow the reflectivity of the substrate to add to the reflectivity of the optical film.

In order to improve roll formation and convertibility of the film, the optical films of the present invention may also comprise a slip agent that is incorporated into the film or added as a separate coating. In most applications, slip agents will be added to only one side of the film, ideally the side facing the rigid substrate in order to minimize haze.

F3. Antireflection Layers

The films and other optical devices made in accordance with the invention may also include one or more antireflective layers or coatings, such as, for example, conventional vacuum coated dielectric metal oxide or metal/metal oxide optical films, silica sol gel coatings, and coated or coextruded antireflective layers such as those derived from low index fluoropolymers such as THV, an extrudable fluoropolymer available from 3M Company (St. Paul, Minn.). Such layers or coatings, which may or may not be polarization sensitive, serve to increase transmission and to reduce reflective glare, and may be imparted to the films and optical devices of the present invention through appropriate surface treatment, such as coating or sputter etching.

In some embodiments of the present invention, it is desired to maximize the transmission and/or minimize the specular reflection for certain polarizations of light. In these embodiments, the optical body may comprise two or more layers in which at least one layer comprises an anti-reflection system in close contact with the skin layers. Such an anti-reflection system acts to reduce the specular reflection of the incident light and to increase the amount of incident light that enters the portion of the body comprising the optical stack. Such a function can be accomplished by a variety of means well known in the art. Examples are quarter wave anti-reflection layers, two or more layer anti-reflective stack, graded index layers, and graded density layers. Such anti-reflection functions can also be used on the transmitted light side of the body to increase transmitted light if desired.

F4. Antifog Layers

The films and other optical devices made in accordance with the invention may be provided with a film or coating which imparts anti-fogging properties. In some cases, an anti-reflection layer as described above will serve the dual purpose of imparting both anti-reflection and anti-fogging properties to the film or device. Various anti-fogging agents are known to the art which are suitable for use with the present invention. Typically, however, these materials will substances, such as fatty acid esters, which impart hydrophobic properties to the film surface and which promote the formation of a continuous, less opaque film of water.

Coatings which reduce the tendency for surfaces to "fog" have been reported by several inventors. For example, U.S. Pat. No. 3,212,909 to Leigh discloses the use of ammonium soap, such as alkyl ammonium carboxylates in admixture with a surface active agent which is a sulfated or sulfonated fatty material, to produce a anti-fogging composition. U.S. Pat. No. 3,075,228 to Elias discloses the use of salts of sulfated alkyl aryloxypolyalkoxy alcohol, as well as alkylbenzene sulfonates, to produce an anti-fogging article useful in cleaning and imparting anti-fogging properties to various surfaces. U.S. Pat. No. 3,819,522 to Zmoda, discloses the use of surfactant combinations comprising derivatives of decyne diol as well as surfactant mixtures which include ethoxylated alkyl sulfates in an anti-fogging window cleaner surfactant mixture. Japanese Patent Kokai No. Hei 6[1994] 41,335 discloses a clouding and drip preventive composition comprising colloidal alumina, colloidal silica and an anionic surfactant. U.S. Pat. No. 4,478,909 (Taniguchi et al.) discloses a cured anti-fogging coating film which comprises-polyvinyl alcohol, a finely divided silica, and an organic silicon compound, the carbon/silicon weight ratio apparently being important to the film's reported anti-fogging properties. Various surfactants, include fluorine-containing surfactants, may be used to improve the surface smoothness of the coating. Other anti-fog coatings incorporating surfactants are described in U.S. Pat. Nos. 2,803,552; 3,022,178; and 3,897,356. World Patent No. PCT 96/18,691 (Scholtz et al.) discloses means by which coatings may impart both anti-fog and anti-reflective properties.

F5. UV Protective Layers

The films and optical devices of the present invention may be protected from UV radiation through the use of UV stabilized films or coatings. Suitable UV stabilized films and coatings include those which incorporate benzotriazoles or hindered amine light stabilizers (HALS) such as Tinuvin™ 292, both of which are available commercially from Ciba Geigy Corp., Hawthorne, N.Y. Other suitable UV stabilized films and coatings include those which contain benzophenones or diphenyl acrylates, available commercially from BASF Corp., Parsippany, N.J. Such films or coatings will be particularly important when the optical films and devices of the present invention are used in outdoor applications or in luminaires where the source emits significant amount of light in the UV region of the spectrum.

G. Additives

G1. Lubricants

Various lubricants may be used during the processing (e.g., extrusion) of the films of the present invention. Suitable lubricants for use in the present invention include calcium stearate, zinc stearate, copper stearate, cobalt stearate, molybdenum neodocanoate, and ruthenium (II) acetylacetonate.

G2. Antioxidants

Antioxidants useful in the present invention include 4,4'-thiobis-(6-t-butyl-m-cresol), 2,2'-methylenebis-(4-methyl-6-t-butyl-butylphenol), octadecyl-3,5-di-t-butyl-4-hydroxy-hydrocinnamate, bis-(2,4-di-t-butylphenyl) pentaerythritol diphosphite, Irganox™ 1093 (1979)(((3,5-bis(1,1-dimethylethyl)-4-hydroxyphenyl)methyl)-dioctadecyl ester phosphonic acid), Irganox™ 1098 (N,N'-1,6-hexanediylbis(3,5-bis (1,1-dimethyl)-4-hydroxy-benzenepropanamide), Naugaard™ 445 (aryl amine), Irganox™ L 57 (alkylated diphenylamine), Irganox™ L 115 (sulfur containing bisphenol), Irganox™ LO 6 (alkylated phenyl-delta-napthylamine), Ethanox 398 (flourophosphonite), and 2,2'-ethylidenebis(4,6-di-t-butylphenyl)fluorophosnite.

A group of antioxidants that are especially preferred are sterically hindered phenols, including butylated hydroxytoluene (BHT), Vitamin E (di-alpha-tocopherol), Irganox™ 1425WL(calcium bis-(O-ethyl(3,5-di-t-butyl-4-hydroxybenzyl))phosphonate), Irganox™ 1010 (tetrakis(methylene (3,5,di-t-butyl-4-hydroxyhydrocinnamate))methane), Irganox™ 1076 (octadecyl 3,5-di-tert-butyl-4-hydroxyhydrocinnamate), Ethanox™ 702 (hindered bis phenolic), Etanox 330 (high molecular weight hindered phenolic), and Ethanox™ 703 (hindered phenolic amine).

G3. Dyes, Pigments, Inks

The films and optical devices of the present invention may be treated with inks, dyes, or pigments to alter their appearance or to customize them for specific applications. Thus, for example, the films may be treated with inks or other printed indicia such as those used to display product identification, advertisements, warnings, decoration, or other information. Various techniques can be used to print on the film, such as screen printing, letterpress, offset, flexographic printing, stipple printing, laser printing, and so forth, and various types of ink can be used, including one and two component inks, oxidatively drying and UV-drying inks, dissolved inks, dispersed inks, and 100% ink systems.

The appearance of the optical film may also be altered by coloring the film, such as by laminating a dyed film to the optical film, applying a pigmented coating to the surface of the optical film, or including a pigment in one or more of the materials used to make the optical film.

Both visible and near IR dyes and pigments are contemplated in the present invention, and include, for example, optical brighteners such as dyes that absorb in the UV and fluoresce in the visible region of the color spectrum. Other additional layers that may be added to alter the appearance of the optical film include, for example, opacifying (black) layers, diffusing layers, holographic images or holographic diffusers, and metal layers. Each of these may be applied directly to one or both surfaces of the optical film, or may be a component of a second film or foil construction that is laminated to the optical film. Alternately, some components such as opacifying or diffusing agents, or colored pigments, may be included in an adhesive layer which is used to laminate the optical film to another surface.

The films and devices of the present invention may also be provided with metal coatings. Thus, for example, a metallic layer may be applied directly to the optical film by pyrolysis, powder coating, vapor deposition, cathode sputtering, ion plating, and the like. Metal foils or rigid metal plates may also be laminated to the optical film, or separate polymeric films or glass or plastic sheets may be first metallized using the aforementioned techniques and then laminated to the optical films and devices of the present invention.

Dichroic dyes are a particularly useful additive for many of the applications to which the films and optical devices of the present invention are directed, due to their ability to absorb light of a particular polarization when they are molecularly aligned within the material. When used in a film or other optical body, the dichroic dye causes the material to absorb one polarization of light more than another. Suitable dichroic dyes for use in the present invention include Congo Red (sodium diphenyl-bis-α-naphthylamine sulfonate), methylene blue, stilbene dye (Color Index (CI)=620), and 1,1'-diethyl-2,2'-cyanine chloride (CI=374 (orange) or CI=518 (blue)). The properties of these dyes, and methods of making them, are described in E. H. Land, Colloid Chemistry (1946). These dyes have noticeable dichroism in polyvinyl alcohol and a lesser dichroism in cellulose. A slight dichroism is observed with Congo Red in PEN. Still other dichroic dyes, and methods of making them, are discussed in the Kirk Othmer Encyclopedia of Chemical Technology, Vol. 8, pp. 652–661 (4th Ed. 1993), and in the references cited therein.

When a dichroic dye is used in an optical body made in accordance with the present invention which includes a disperse phase, the dye may be incorporated into either the continuous or disperse phase. However, it is preferred that the dichroic dye is incorporated into the disperse phase.

Dychroic dyes in combination with certain polymer systems exhibit the ability to polarize light to varying degrees. Polyvinyl alcohol and certain dichroic dyes may be used to make films with the ability to polarize light. Other polymers, such as-polyethylene terephthalate or polyamides, such as nylon-6, do not exhibit as strong an ability to polarize light when combined with a dichroic dye. The polyvinyl alcohol and dichroic dye combination is said to have a higher dichroism ratio than, for example, the same dye in other film forming polymer systems. A higher dichroism ratio indicates a higher ability to polarize light.

Molecular alignment of a dichroic dye within an optical body made in accordance with the present invention is preferably accomplished by stretching the optical body after the dye has been incorporated into it. However, other methods may also be used to achieve molecular alignment. Thus, in one method, the dichroic dye is crystallized, as through sublimation or by crystallization from solution, into a series of elongated notches that are cut, etched, or otherwise formed in the surface of a film or other optical body, either before or after the optical body has been oriented. The treated surface may then be coated with one or more surface layers, may be incorporated into a polymer matrix or used in a multilayer structure, or may be utilized as a component of another optical body. The notches may be created in accordance with a predetermined pattern or diagram, and with a predetermined amount of spacing between the notches, so as to achieve desirable optical properties.

In another embodiment, the dichroic dye is disposed along the layer interface of a multilayer construction, as by sublimation onto the surface of a layer before it is incorporated into the multilayer construction. In still other embodiments, the dichroic dye is used to at least partially backfill the voids in a film made in accordance with the present invention and having one or more voided layers.

G4. Adhesives

Adhesives may be used to laminate the optical films and devices of the present invention to another film, surface, or substrate. Such adhesives include both optically clear and diffuse adhesives, as well as pressure sensitive and non-pressure sensitive adhesives. Pressure sensitive adhesives are normally tacky at room temperature and can be adhered to a surface by application of, at most, light finger pressure, while non-pressure sensitive adhesives include solvent, heat, or radiation activated adhesive systems. Examples of adhesives useful in the present invention include those based on general compositions of polyacrylate; polyvinyl ether; diene-containing rubbers such as natural rubber, polyisoprene, and polyisobutylene; polychloroprene; butyl rubber; butadiene-acrylonitrile polymers; thermoplastic elastomers; block copolymers such as styrene-isoprene and styrene-isoprene-styrene block copolymers, ethylene-propylene-diene polymers, and styrene-butadiene polymers; polyalpha-olefins; amorphous-polyolefins; silicone; ethylene-containing copolymers such as ethylene vinyl acetate, ethylacrylate, and ethylmethacrylate; polyurethanes; polyamides; polyesters; epoxies; polyvinylpyrrolidone and vinylpyrrolidone copolymers; and mixtures of the above.

Additionally, the adhesives can contain additives such as tackifiers, plasticizers, fillers, antioxidants, stabilizers, pigments, diffusing particles, curatives, and solvents. When a laminating adhesive is used to adhere an optical film of the present invention to another surface, the adhesive composition and thickness are preferably selected so as not to interfere with the optical properties of the optical film. For example, when laminating additional layers to an optical polarizer or mirror wherein a high degree of transmission is desired, the laminating adhesive should be optically clear in the wavelength region that the polarizer or mirror is designed to be transparent in.

G5. Other Additives

In addition to the films, coatings, and additives noted above, the optical materials of the present invention may also comprise other materials or additives as are known to the art. Such materials include binders, coatings, fillers, compatibilizers, surfactants, antimicrobial agents, foaming agents, reinforcers, heat stabilizers, impact modifiers, plasticizers, viscosity modifiers, and other such materials.

H. Treatments

H1. Microvoiding

In some embodiments, the films of the present invention may be provided with one or more layers having continuous and disperse phases in which the interface between the two phases will be sufficiently weak to result in voiding when the film is oriented. The average dimensions of the voids may be controlled through careful manipulation of processing parameters and stretch ratios, or through selective use of compatibilizers. The voids may be back-filled in the finished product with a liquid, gas, or solid. Voiding may be used in conjunction with the specular optics of the optical stack to produce desirable optical properties in the resulting film.

H2. Surface Treatments

The films and other optical devices made in accordance with the present invention may be subjected to various treatments which modify the surfaces of these materials, or any portion thereof, as by rendering them more conducive to subsequent treatments such as coating, dying, metallizing, or lamination. This may be accomplished through treatment with primers, such as PVDC, PMMA, epoxies, and aziridines, or through physical priming treatments such as corona, flame, plasma, flash lamp, sputter-etching, e-beam treatments, or amorphizing the surface layer to remove crystallinity, such as with a hot can.

I. End Uses

The optical bodies of the present invention are particularly useful as color mirror films. The term reflective color mirror or reflective color film refers to multilayer optical interference stacks which create color by reflecting only a chosen portion of the electromagnetic spectrum of interest. However, optical bodies may also be made in accordance with the invention which operate as reflective polarizers. In these applications, the construction of the optical material is similar to that in the mirror applications described above. However, these reflectors will generally have a much larger difference in the index of refraction between alternating material layers along one in-plane axis compared to the index difference along the orthogonal in-plane axis. This larger index difference is typically at least about 0.1, more preferably greater than about 0.15, and most preferably greater than about 0.2.

Reflective polarizers have a refractive index difference between layers along one axis, and substantially matched indices along another. Reflective mirror films, on the other hand, have alternating layers that differ substantially in refractive index along any in-plane axis. The two in-plane optical axes chosen for reference are typically the two directions of stretch, and the film exhibits the maximum and minimum index differentials between the alternating layers along these chosen axes. However, the reflective properties of these embodiments need not be attained solely by reliance on large refractive index mismatches. Thus, for example, more layers could be used to increase the degree of reflection.

The reflective polarizer of the present invention has many different applications, and is useful in liquid crystal display panels. In particular, the reflective polarizer can be used as an efficient color polarizer having high color saturation and high out-of-band transmission for high brightness displays. In addition, the polarizer can be constructed out of PEN or similar materials which are good ultraviolet filters and which absorb ultraviolet light efficiently up to the edge of the visible spectrum. The reflective polarizer can also be used as a thin infrared sheet polarizer. The reflective polarizers of this invention are useful as security devices, with visible (overt) and IR or UV (covert) devices both feasible.

Additionally, high color saturation in transmission can be achieved by having an optical film which reflects nearly all of the visible spectrum except a narrow spike of, for example, about 50 nm. When viewed in reflection, the film will appear colorless due to the relatively small amount of a particular wavelength of light absent from the spectrum. However, when the film is viewed in transmission with the aid of a backlight, the eye will detect a very pure color. The contrast between reflected and transmitted viewing of the film will be between that of a colorless (e.g., chrome or silver appearing) film, and a very pure, highly saturated color which changes with angle.

I1. Backlit Displays

Backlit displays having a variety of optical arrangements may be made using the color shifting films of the present invention. Typically, such displays will include a light source and a portion of color shifting film which is situated between the light source and the viewer. In a typical application, most of at least one polarization of light will pass through the film only once before proceeding on to the viewer.

The color shifting film may be planar, or it may be shaped into other geometries such as, for example, cones, cylinders, or spheres. The multilayer film may cover the open face of a backlight, may completely surround a light source, or may form a geometric shape having one or more apertures through which light is injected. Any of these arrangements can be used to create a display which will separate light into colors that are visible from various angles of view of the article, or a display in which many colors will be visible from one viewing angle due to the various angles the shaped article presents to the viewer from different areas of its surface. If the display comprises a backlight which in turn comprises a light source and a reflective material which directs the light through the optical film to a viewer, the portions of the spectrum that the optical film returns to the backlight can be recycled until that light encounters the film at angles at which it can pass through. The actual device need not necessarily be a display, but could be a luminaire or a light source which uses the combination of film spectral-angular properties and wavelength emission from a lamp to create a desired light distribution pattern. This recycling, coupled with the high reflectivity of the color shifting films, produces a much brighter color display than is seen with conventional displays. The above listed features are illustrated by the following several examples.

I2. Backlit Signs

The films of the present invention may be used in conjunction with a distributed light source or several point sources, just as conventional backlights are now used for advertising signs or computer backlights. A flat reflective film, uniformly colored by optical interference, which covers the open face of a backlight will change color as the viewer passes by the sign. Opaque or translucent lettering of a chosen dyed or pigmented color can be applied to the reflective cover film via laser or screen printing techniques. Alternatively, interference reflective lettering composed of a different colored reflective film than the cover film can also be applied over cutouts made in the cover film, with the lettering displaying the opposite change in color from the cover film, e.g., cover film displays a green to magenta change with angle, while the lettering shows a magenta to green change over the same angles. Many other color combinations are possible as well.

The color changes in the cover film can also be used to "reveal" lettering, messages, or even objects that are not visible through the film at large angles of incidence, but become highly visible when viewed at normal incidence, or vice-versa. This "reveal" effect can be accomplished using specific color emitting lights in the backlight, or by dyed colored lettering or objects under the reflective cover film.

The brightness of the display can be enhanced by lining the inside of the backlight cavity with highly reflective multilayer film. In this same manner, the overall color balance of the display can be controlled by lining a low reflectance cavity with a multilayer reflective film that preferentially reflects only certain colors. The brightness of the chosen color may suffer in this case because of its transmission at certain angles through the lining. If this is undesirable, the desired color balance can be effected by coating a broadband multilayer liner film with a dye of the appropriate color and absorbance.

The reflective colored film may also be used in combination with dyed or pigment colored films with the latter on the viewer side to achieve a desired color control such as, e.g., eliminating a color shift on the lettering while producing a color shifting background.

The backlit sign need not be planar, and the colored film could be applied to more than one face of the sign, such as an illuminated cube, or a two sided advertising display.

I3. Non-Backlit Displays

The color shifting films of the present invention may also be used to create a variety of non-backlit displays. In these displays, at least one polarization of light from an external light source, which may be sunlight, ambient lighting, or a dedicated light source, is made to pass through the color shifting film twice before the transmission spectrum is seen by the viewer. In most applications, this is accomplished by using the color shifting film in combination with a reflective or polarizing surface. Such a surface may be, for example, a conventional mirror of the type formed through deposition of metals, a polished metal or dielectric substrate, or a multilayer polymeric mirror or polarizing film.

While the color shifting films of the present invention may be used advantageously in combination with either specularly reflective or diffusely reflective surfaces, a diffusely reflecting substrate is preferred. Such a substrate causes the colors transmitted by the film (and subsequently reflected by the substrate) to be directed out of the plane of incidence, or at a different angle of reflection in the plane of incidence, than the colored light that is specularly reflected by the film, thereby allowing the viewer to discriminate between the transmitted and reflected colors. Diffuse white surfaces, such as card stock or surfaces treated with a diffusely reflective white paint, are especially advantageous in that they will create a display that changes color with angle.

In other embodiments, the diffuse surface, or portions thereof, may themselves be colored. For example, a diffuse surface containing ink characters may be laminated with a color shifting film that has at least one optical stack tuned to reflect light over the same region of the spectrum over which the ink absorbs. The characters in the resulting article will then be invisible at certain angles of viewing but clearly visible at other angles (a similar technique may be used for backlit displays by matching the reflective bandwidth of the color shifting film to the adsorption band of the ink). In still other embodiments, the color shifting film itself can be printed on with a diffuse white or colored ink, which may be either opaque or translucent. Translucent is defined in this context as meaning substantially transmissive with a substantial diffusing effect. Alternatively, the color shifting film can be laminated to a white or colored surface, which can itself also be printed on.

In still other embodiments, the films of the invention may be used in combination with a substrate that absorbs the wavelengths transmitted by the film, thereby allowing the color of the display to be controlled solely by the reflectivity spectrum of the film. Such an effect is observed, for example, when a colored mirror film of the present invention, which transmits certain wavelengths in the visible region of the spectrum and reflects other wavelengths in the visible region, is used in combination with a black substrate.

I4. Fenestrations

The optical films and devices of the present invention are suitable for use in fenestrations, such as skylights or privacy windows. In such applications, the optical films of the present invention may be used in conjunction with, or as components in, conventional glazing materials such as plastic or glass. Glazing materials prepared in this manner can be made to be polarization specific, so that the fenestration is essentially transparent to a first polarization of light but substantially reflects a second polarization of light, thereby eliminating or reducing glare. The physical properties of the optical films can also be modified as taught herein so that the glazing materials will reflect light of one or both polarizations within a certain region of the spectrum (e.g., the UV region), while transmitting light of one or both polarizations in another region (e.g., the visible region). This is particularly important in greenhouse applications, where reflection and transmission of specific wavelengths can be utilized to control plant growth, flowering, and other biological processes.

The optical films of the present invention may also be used to provide decorative fenestrations which transmit light of specific wavelengths. Such fenestrations may be used, for example, to impart a specific color or colors to a room (e.g., blue or gold), or may be used to accent the decor thereof, as through the use of wavelength specific lighting panels.

The optical films of the present invention may be incorporated into glazing materials in various manners as are known to the art, as through coating or extrusion. Thus, in one embodiment, the optical films are adhered to all, or a portion, of the outside surface of a glazing material, for example, by lamination with the use of an optical adhesive. In another embodiment, the optical films of the present invention are sandwiched between two panes of glass or plastic, and the resulting composite is incorporated into a fenestration. Of course, the optical film may be given any additional layers or coatings (e.g., UV absorbing layers, antifogging layers, or antireflective layers) as are described herein to render it more suitable for the specific application to which it is directed.

One particularly advantageous use of the colored films of the present invention in fenestrations is their application to sunlit windows, where reversible coloring is observed for day vs. night. During the day, the color of such a window is dictated primarily by the transmissive properties of the film toward sunlight. At night, however, very little light is seen in transmission through the films, and the color of the films is then determined by the reflectivity of the film toward the light sources used to illuminate the room. For light sources which simulate daylight, the result is the complimentary color of the film appearance during the day.

I5. Light Fixtures

The color shifting films of the present invention may be used in various light fixture applications, including the backlit and non-backlit displays described earlier. Depending on the desired application, the color shifting film may be uniformly colored or iridescent in appearance, and the spectral selectivity can be altered to transmit or reflect over the desired wavelength range. Furthermore, the colored film can be made to reflect or transmit light of only one polarization for polarized lighting applications such as-polarized office task lights or polarized displays incorporating light recycling to increase brightness, or the film can be made to transmit or reflect both polarizations of light when used in applications where colored mirrors or filters are desirable.

In the simplest case, the color shifting film of the present invention is used as a filter in a backlit light fixture. A typical fixture contains a housing with a light source and may include a diffuse or specular reflective element behind the light source or covering at least some of the interior surfaces of the optical cavity. The output of the light fixture typically contains a filter or diffusing element that obscures the light source from direct viewing. Depending upon the particular application to which the light fixture is directed, the light source may be a fluorescent lamp, an incandescent lamp, a solid-state or electroluminescent (EL) light source, a metal halide lamp, or even solar illumination, the latter being transmitted to the optical cavity by free space propagation, a lens system, a light pipe, a polarization preserving light guide, or by other means as are known to the art. The source may be diffuse or specular, and may include a randomizing, depolarizing surface used in combination with a point light source. The elements of the light fixture may be arranged in various configurations and may be placed within a housing as dictated by aesthetic and/or functional considerations. Such fixtures are common in architectural lighting, stage lighting, outdoor lighting, backlit displays and signs, and automotive dashboards. The color shifting film of the present invention provides the advantage that the appearance of the output of the lighting fixture changes with angle.

I5(a) Direction Dependent Light Sources

The color shifting films of the present invention are particularly advantageous when used in directional lighting. High efficiency lamps, such as sodium vapor lamps commonly used in street or yard lighting applications, typically have spectral emissions at only one major wavelength. When such a source which emits over a narrow band is combined with the color shifting film of the present invention, highly directional control of the emitted light can be achieved. For example, when a color shifting film is made with a narrow passband which coincides with the emission peak of the lamp, then the lamp emission can pass through the film only at angles near the design angle; at other angles, the light emitted from the source is returned to the lamp, or lamp housing. Typical monochromatic and polychromatic spikey light sources include low pressure sodium lamps, mercury lamps, fluorescent lamps, compact fluorescent lamps, and cold cathode fluorescent lamps. Additionally, the reflecting film need not necessarily be of a narrow pass type since, with monochromatic sources, it may only be necessary to block or pass the single wavelength emission at a specific angle of incidence. This means that a reflective film having, for example, a square wave reflection spectrum which cuts on or off at a wavelength near that of the lamp emission can be used as well. Some specific geometries in which the light source and color shifting film of the present invention can be combined include, but are not limited to, the following:

(a) A cylindrical bulb, such as a fluorescent tube, is wrapped with film designed for normal incidence transmission of the bulb's peak emitted radiation, i.e., the film is designed with a passband centered at the wavelength of the lamp emission. In this geometry, light of the peak wavelength is emitted mainly in a radial direction from the bulb's long axis.

(b) An arbitrary bulb geometry in a reflective lamp housing can be made to radiate in a direction normal to the plane of the housing opening by covering the opening with a film selected to transmit at the bulb's peak emitted radiation. The opening can face downward or in any other direction, and the light will be viewable at angles in a direction normal to the plane of the opening but not at angles of incidence substantially away from normal.

(c) Alternately, the combination described in (b) can use a color shifting film that is designed to transmit the lamp emission at one or more angles of incidence away from the normal angle by providing one or more appropriate passbands, measured at normal incidence, at wavelengths greater than the lamp emission wavelength. In this way, the lamp emission is transmitted at angles where the blue shift of the passband is sufficient to align the emission peak with the passband.

(d) Combining the angular distribution film described in (c) with the geometry described in (a) will give a cylindrical bulb in which one can have direction control of the emitted light in a plane parallel to the long axis of the bulb.

(e) A polychromatic spikey light source, for example, one having emission spikes at three different wavelengths, can be combined with a color shifting film having only one passband, and such that the film transmits only one of the three color spikes at a given angle of incidence and each emission peak is transmitted at a different angle. Such a film can be made using multiple groups of layers, each of which reflect at different wavelength regions, or it can be made using one group of layers and their higher order harmonics. The width of the first order bandwidth region and consequently the width of the harmonic bandwidths, can be controlled to give desired transmission gaps between the first order and harmonic reflection bands. The combination of this film with the polychromatic spikey light source would appear to split light from an apparently "white" light source into its separate colors.

Since the rate of spectral shift with angle is small near normal incidence, the angular control of light is less effective at normal incidence compared to high angles of incidence on the color shifting film. For example, depending on the width of the lamp emission lines, and the bandwidth of the passband, the minimum angular control may be as small as +/−10 degrees about the normal, or as great as +/−20 degrees or +/−30 degrees. Of course, for single line emitting lamps, there is no maximum angle control limit. It may be desirable, for either aesthetic or energy conservation reasons, to limit the angular distribution to angles less than the free space available to the lamp, which is typically +/−90 degrees in one or both of the horizontal and vertical planes. For example, depending on customer requirements, one may wish to reduce the angular range to +/−45, +/−60 or only +/−75 degrees. At high angles of incidence, such as 45 degrees or 60 degrees to the normal of the color shifting film, angular control is much more effective. In other words, at these angles, the passband shifts to the blue at a higher rate of nm/degree than it does at normal incidence. Thus, at these angles, angular control of a narrow emission peak can be maintained to within a few degrees, such as +/−5 degrees, or for very narrow passbands and narrow emission lines, to as small as +/−2 degrees.

The color shifting films of the present invention can also be shaped in a pre-designed fashion to control the angular out put of the lamp in the desired pattern. For example, all or part of the color shifting film placed near the light source may be shaped to corrugated or triangular waveforms, such that the axis of the waveform is either parallel or perpendicular to the axis of the lamp tube. Directional control of different angles in orthogonal planes is possible with such configurations.

While the combination of a narrow band source and a color shifting film works well to control the angle at which light is emitted or detected, there are only a limited number of sources with narrow emission spectra and therefore limited color options available. Alternately, a broadband source can be made to act like a narrow band source to achieve similar directional control of the emitted light. A broadband source can be covered by a color selective film that transmits in certain narrow band wavelength regions, and that modified source can then be used in combination with a second film having the same transmission spectrum so that the light emitted from the source/color selective film combination can again pass through the color shifting film only at the design angle. This arrangement will work for more than one color, such as with a three color red-green-blue system. By proper selection of the films, the emitted colors will be transmitted at the desired angle. At other angles, the emitted wavelengths will not match every or any passband, and the light source will appear dark or a different color. Since the color shifting films can be adapted to transmit over a broad range of wavelengths, one can obtain virtually any color and control the angular direction over which the emitted light is observed.

Direction dependent light sources have utility in many applications. For example, the light sources of the present invention can be used for illuminating automobile instrument panels so that the driver, who is viewing the instruments at a normal angle, can view the transmitted light, but the light would not be reflected off the windshield or viewable be a passenger because they would be at off angles to the instruments. Similarly, illuminated signs or targets can be constructed using the direction dependent light sources of the present invention so that they can be perceived only at certain angles, for example, normal to the target or sign, but not at other angles. Alternately, the color shifting film can be designed so that light of one color is transmitted at one angle, but a different color is detectable at another angle. This would be useful, for example, in directing the approach and stopping point for vehicles, such as for a carwash or emission check station. The combination of color shifting film and light source can be selected so that, as a vehicle approached the illuminated sign and was viewing the film at non-normal angles to the sign, only green light would be visible, but the perceived transmitted light would shift to red at the angle where the vehicle was to stop, for example, normal to the sign. The combination of color shifting film and a narrow band source is also useful as a security device, wherein the color shifting film is used as a security laminate, and a light source wrapped with the same film is used as a simple verification device. Other examples of the direction dependent light source of the present invention are described in more detail in the following examples.

EXAMPLE I5-1

The following example illustrates the use of the films of the present invention in making multi-colored neon-like tubes.

A bright, colorful display light can be constructed by wrapping a white fluorescent light bulb with a reflective colored film. Several lights were made in this fashion, each with a different colored film, several with a uniformly colored film and two with variably colored film. Samples were made using the films described in EXAMPLES B1-1, E1-1, E1-2, and I6-1. The film was cut to the length of the tube, and was wide enough to wrap around the circumference of the tube once or twice. The number of wraps affects the brightness and the saturation of the colors achieved by controlling the overall transmission of the covering if one wrap is not sufficiently reflective. The variable colored films were made from film of the same run as for EXAMPLE I6-1, but the 49 inch lengths were cut crossweb from the roll instead of down-web. The nonuniformly colored film appeared to shimmer as the viewer walks past, looking like an unstable plasma in a vacuum tube. The purity of the colors in all of the lamps was high enough to give the fluorescent tubes a decidedly "neon" look, with the added effect of a change in color from the center to the periphery of the tube. Only at the center was the normal incidence spectrum observable, even if the viewer were able to walk around the tube and view it from all sides; e.g., a viewer can indefinitely "chase" a peripheral color around a tube and never view that color in the center of the tube. The colored films can be loosely attached or laminated with an adhesive. It was noted that the use of an adhesive to remove the air gap between bulb and film had no noticeable effect on the appearance of the colored tube.

EXAMPLE I5-2

The following example illustrates the use of the films of the present invention in making flexible neon-like tubes.

Most fluorescent bulbs manufactured are straight tubes, with a few being circular or u-shaped. The utility of the above described "neon" like tubes would be enhanced for many applications if they could be shaped arbitrarily, and even further enhanced if they were based on a flexible tubular light source. The development of a large core optical fiber by 3M provides such a light source. This product, called the "3M Light Fiber", is available commercially from the Minnesota Mining and Manufacturing Co., St. Paul, Minn. A certain percentage of light in the fiber is scattered past the TIR angle and escapes the fiber. This process can be enhanced by increasing the density of scattering centers in the core or sheath. Also, microstructured film can be attached to the sides of the tube to direct light out of the tubes.

Samples of both clear and microstructured optical "fiber" of nominally 1 cm diameter was covered with the green/magenta film of EXAMPLE E1-2. The film was first coated with a clear adhesive to make 1 inch wide rolls of colored tape. The adhesive was a hot melt adhesive compounded from a synthetic SIS block copolymer and a hydrocarbon tackifier plus stabilizers. This tape was both spirally wound onto the optical fiber, and linearly applied. Since the 1 inch width did not cover the entire circumference, a strip was applied from both sides in the latter case. The linearly applied strips of tape tended to wrinkle when the fiber was coiled with a radius of less than about ⅓ meter. No wrinkling was observed with the tape on spirally wound fiber, even at ⅙ meter radius of curvature. The colors of the large core optical fibers covered with color shifting tape were the same as observed on the fluorescent tubes. The fibers were illuminated with a small battery powered light. Two or more alternating colors can also be wound with separate spirals, or colored films can be alternated with a broadband "silver" film or alternated with conventional (dye or pigment) colored films or coatings.

With small light sources, a variety of circularly shaped articles can be given this neon look, including hula-hoops and neckbands. Particularly useful light sources include broadband fluorescing dyes, or combinations of narrower band dyes, which can be placed in the polymer core of the optical fiber.

EXAMPLE I5-3

The following example illustrates the use of the film of the present invention to create an attachment for a flashlight.

Several sheets of the color shifting film of the present invention, as described in EXAMPLES B1-1, E1-1, E1-2, and I6-1, were rolled into conic sections having open circular or elliptical ends. The larger diameter end of each cone was adjusted to fit the outside diameter of the end of the flashlight. A variety of flashlight and cone sizes were employed. The larger diameter cones were 2 to 3 feet in length, and the small ones ranged from 6 to 24 inches in length. In cases where the cone was large or the multilayer film was thin (one mil or less), the film was rolled with a 4 mil clear PET base and attached with tape at one edge to add mechanical integrity.

The flashlight and the film cone in combination were found to form an optical cavity that efficiently distributes light at all angles of incidence onto the film. Light in a diverging beam that is proceeding towards the small end of the cone increases its divergence angle upon each reflection, and can easily reverse direction (divergence angle greater than 90 degrees) after several reflections even without reaching the end of the cone. Thus, a given ray of light from the source will continually traverse the length of the cone until it is transmitted by the film, is absorbed by either the source or the film, or escapes from the open end opposite the source. The attachments exhibited a number of unexpected properties. For example, the periphery of the cone is a different color than the center of the cone, and the cone changes suddenly in color when a person holding the cone swings it in an arc towards the observer.

A particularly interesting effect was observed when the colored film is highly reflective for a certain color at all angles of incidence. The spectrum of a film with this property for green light is shown in FIG. 21. A cone was made from a film having these properties, and the cone was attached to a Maglight flashlight. When viewed at 90 degrees to the longitudinal axis of the cone, the cone was blue with a red periphery. Viewed toward either end, the cone was red, and then yellow at extreme angles. Green light can escape easily only through the hole at the smaller (open) end of the cone. The green light is most visible when the cone is viewed from the side because of the divergence effect described above. To enhance the view of the light escaping from the small end, various shaped reflectors can be attached or positioned near the open end of the conic section.

Many other color combinations are possible. Green/magenta cones were also fabricated, as well as cones that changed from blue to red to green at successively higher angles. The spectra of these films are shown in FIGS. 22 and 1. The cones are not as bright at all angles when illuminated from the smaller end.

Other articles were made using a collapsible cone of white translucent plastic which was purchased at a toy store and which was made of successively smaller conic sections with the largest attached to a flashlight. Each section was wrapped with colored film of the type described in EXAMPLE B1-1. Alternatively, each section can be wrapped with a different colored film to form a specified color scheme such as, for example, a rainbow sequence. The colored film can also be inserted inside the pre-formed conic sections to better protect the optical film. To retain the angular color change with this latter configuration, optically clear conic sections are preferred.

EXAMPLE I5-4

The following example illustrates the use of the films of the present invention in making a 3-dimensional ornament.

A three dimensional shaped, faceted star ornament was covered with the film of EXAMPLE E1-2 (green pass filter). The star, purchased from a Christmas ornament shop, was made from clear plastic, and all facets were essentially planar. The colored film was attached with a clear adhesive to each facet. The colors reflected by the film are complimentary to those transmitted by the film, e.g., the film reflects red and blue light (magenta) at normal incidence, and transmits green light at the same angle, magenta being the complimentary color to green. However, as shown in FIG. 22, the film provides a double complimentary effect. At an angle of incidence of about 60 degrees, the colors are reversed, with green being reflected and magenta transmitted.

Two versions of the star ornament were constructed. Both had a small 7/16 inch (11 mm) diameter hole cut into one edge to allow for injection of light into the optical cavity formed by the star. In the first construction, a small uncolored Christmas tree light was inserted into the hole. In the second construction, a small flashlight was connected to the star with a tapered tube of broadband mirror film which had about 99% reflectivity for visible light (the broadband mirror film was of the type described in U.S. Pat. No. 5,882,774 (Jonza et al.)). The flashlight was of the variable focus type sold by the Maglite corporation. A wide beam was selected as that was observed to provide the most even illumination of all facets on the star. As discussed above, the slight conical taper of the tube can be shown by simple geometry to further widen the beam from a partially directed source such as the flashlight. Surprisingly, only green and magenta are perceived substantially anywhere on the star at any angle of view. In certain very narrow angular ranges, a blue color is observable on the facets.

Any geometrical shape can be utilized in a similar manner to create other visually attractive articles. In addition, the article could be rotated. In this case, the facets of the shaped article will change color as the article is rotated. Light, or electric power, can be injected at the point of rotation. The geometry of the given example has broad application for colorful displays of a wide range of sizes. For example, an advertising display, up to many meters in length or height, could be illuminated through one or more hollow support tubes.

I5(b) Polarized Light Fixtures

Many applications require polarized light to function properly. Examples of such applications include optical displays, such as liquid crystal displays (LCDs), which are widely used for lap-top computers, hand-held calculators, digital watches, automobile dashboard displays and the like, and polarized luminaires and task lighting which make use of polarized light to increase contrast and reduce glare. For some specialized lighting applications, colored polarized light output may be desirable, such as, for example, where both glare reduction and colored "mood" lighting are required. In these situations, polarized task light fixtures with light recycling are preferred for enhanced efficiency. A polarized light fixture generally consists of a housing containing a light source and a polarizing element, and may additionally include a reflecting element and/or a diffusing element. The color shifting film of the present invention can be used as both the polarizing element, and in particular as a reflecting polarizing film (RPF) or as the reflecting element, when present, and particularly as a reflective mirror film (RMF), as described in applicant's U.S. Ser. No. 08/418,009 titled "Polarized Light Sources" (now abandoned), and U.S. Pat. No. 6,297,906 (Allen et al.), both of which are herein incorporated by reference. For polarized light fixtures incorporating light recycling, a diffuse light source is preferred, which typically includes a light emitting region and a light reflecting, scattering, and/or depolarizing region. The light emitting region may serve both as the light source and the depolarizing region, or the light source may comprise a light emitting region and a separate randomizing reflector. Depending upon the particular application to which the light fixture is directed, the diffuse source may be a fluorescent lamp, an incandescent lamp, a solid-state electroluminescent (EL) light source, or a metal halide lamp, or a separate randomizing, depolarizing surface may be used in combination with a point light source, a distant light source, or even solar illumination, the later being transmitted to the diffuse polarizer by free space propagation, a lens system, a light pipe, a polarization preserving light guide, or by other means as are known to the art.

As described previously, the color shifting films of the present invention may be used both as a reflective polarizing film (RPF) positioned in front of the light source, in which light of one plane of polarization is transmitted and light of the other plane of polarization is reflected, or it may be a reflective mirror film (RMF) positioned behind the light source, in which both planes of polarization are reflected from the film. In operation, light produced by a diffuse source is randomly polarized, having polarization components (a) and (b) present, and this light is incident on the RPF. The RPF element is adapted to transmit light having a first polarization component (polarization component (a) in this example), and reflect light having the orthogonal polarization component ((b) in this example) over the wavelengths of interest. The film will furthermore transmit only the desired wavelengths of light, which will shift as a function of viewing angle. Consequently, light of a desired color having polarization component (a) is transmitted by the RPF while light of polarization component (b) is reflected back into the light fixture where it is randomized. Some of the initially rejected light is thus converted into the desired polarization and is transmitted through the reflective polarizing element on a subsequent pass. This process continues, and the repeated reflections and subsequent randomization of light of the undesired polarization increases the amount of light of the desired polarization that is emitted from the diffuse polarized light fixture. The result is a very efficient system for producing light of a desired polarization. The system is efficient in the sense that light which would otherwise have been absorbed in a typical dichroic polarizer, and therefore would be unavailable, is instead converted to the desired polarization. As a result, the total amount of light emitted from the fixture in the desired polarization is increased.

In the light fixtures described herein, the light source may be coupled with the polarizing element and reflecting element in a variety of configurations. As described, configurations are envisioned using the colored shifting reflecting polarizing film RPF of the present invention as the polarizing element and the color shifting reflecting mirror film RMF of the present invention as the reflecting element, but it should be recognized that various combinations of RPF with other materials as the reflecting element and RMF with other materials as the polarizing element are envisioned. For example, in one configuration, the RPF may be wrapped around such that it completely encloses the diffuse source. A separate reflector may be used in addition to the light source and RPF. The reflector may be a diffuse reflective film which randomizes the light of polarization (b) that is reflected from the RPF, or it may be a specular reflector which redirects light to the light emitting region of a diffuse randomizing light source. The RMF may be oriented around one side of the light source and may be laminated or otherwise attached to the light source. In this configuration, the RPF may also be laminated or otherwise attached so that it partially encloses the other side of the light source. Applications are also possible with the color shifting polarizing films of the present invention in which one piece of the film is rotatable with respect to another, the combination being used in lighting fixtures so that the intensity, color, and/or degree of polarized light could be controlled or tuned for the specific needs of the immediate environment.

I6. Horticultural Applications

Spectrally selective films and other optical bodies can be made in accordance with the teachings of the present invention which are ideally suited for applications such as horticulture. A primary concern for the growth of plants in greenhouse environments and agricultural applications is that of adequate levels and wavelengths of light appropriate for plant growth. Insufficient or uneven illumination can result in uneven growth or underdeveloped plants. Light levels that are too high can excessively heat the soil and damage plants. Managing the heat generated by ambient solar light is a common problem, especially in southern climates.

The spectrally selective color films and optical bodies of the present invention can be used in many horticultural applications where it is desired to filter out or transmit specific wavelengths of light that are optimal for controlled plant growth. For example, a film can be optimized to filter out heat producing infrared and non-efficient visible solar wavelengths in order to deliver the most efficient wavelengths used in photosynthesis to speed plant growth and to manage soil and ambient temperatures.

Figure 35:
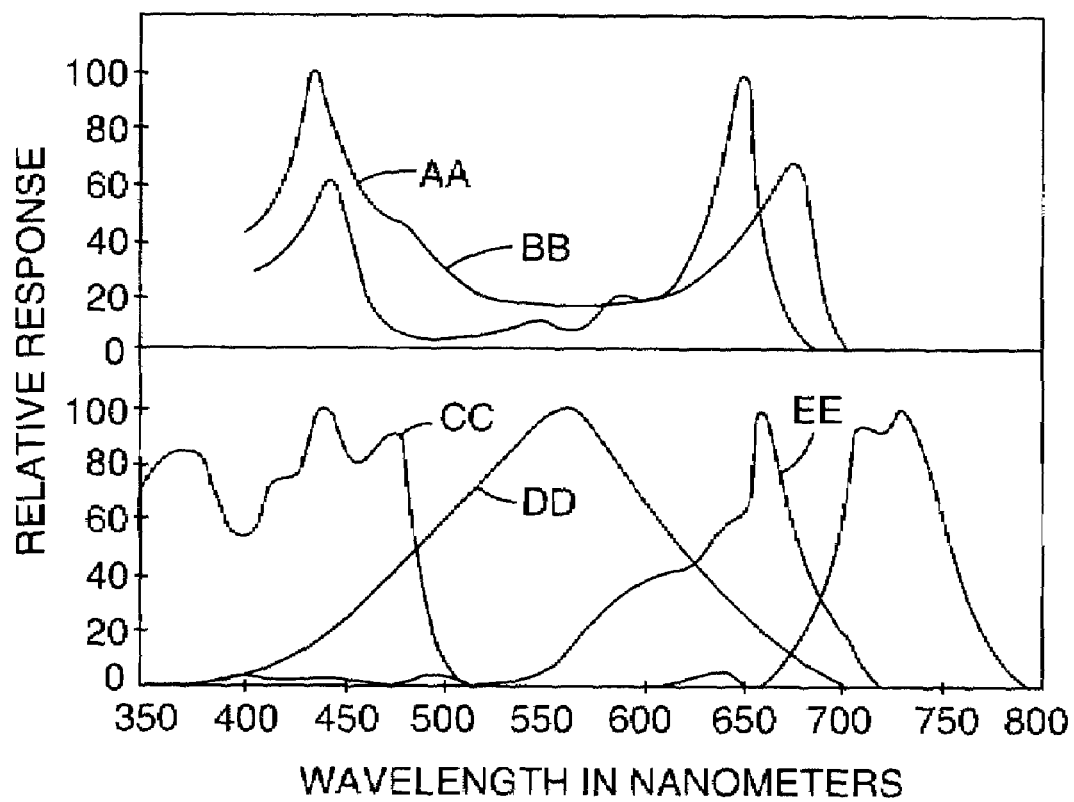
FIG. 35 is a graph of relative plant response as a function of wavelength.
Figure 36:
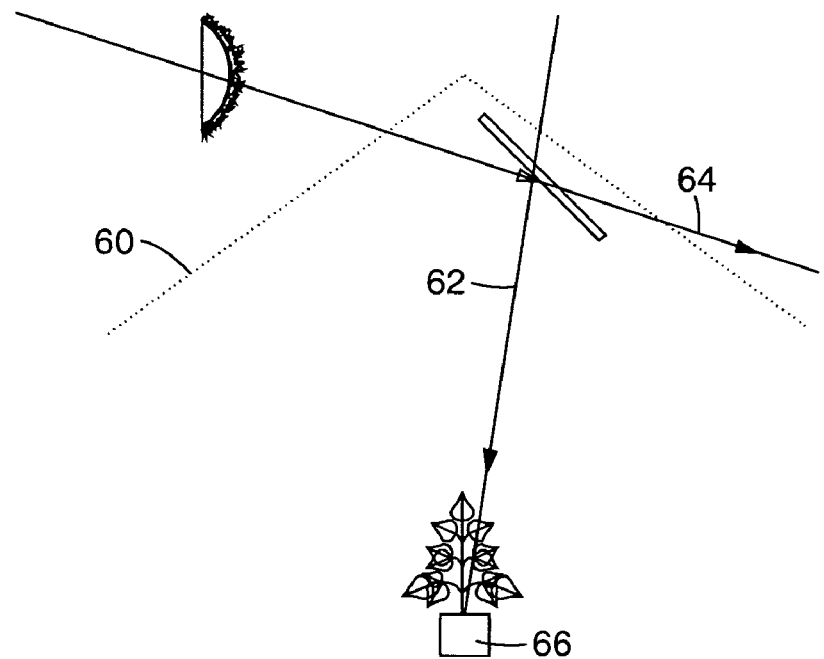
FIG. 36 is a schematic diagram illustrating a cold mirror reflector/IR transmitter horticultural assembly.
Figure 37:
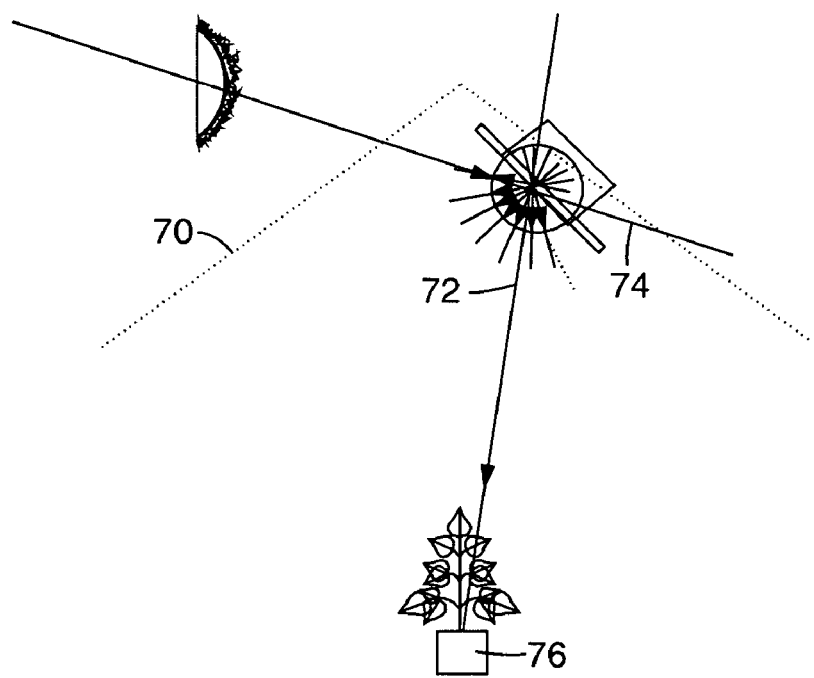
FIG. 37 is a schematic diagram illustrating a cold mirror specular reflector/IR diffuse reflector horticultural assembly.

It is known that plants respond to different wavelengths during different parts of their growth cycle, as shown in FIG. 35. Throughout the growth cycle, the wavelengths in the 500–580 nm range are largely inefficient, while wavelengths in the 400–500 nm and 580–800 nm ranges illicit a growth response. Similarly, plants are insensitive to IR wavelengths past about 800 nm, which comprise a significant part of solar emission, so removal of these wavelengths from the solar spectrum can significantly reduce heating and allow for concentration of additional light at wavelengths useful for plant growth.

Commercial lamps used in greenhouses are effective in accelerating photosynthesis and other photoresponses of plants. Such lamps are most commonly used as supplements to natural, unfiltered solar light. Lamps that emit energy in the blue (about 400–500 nm), red (about 600–700 nm), or near IR (about 700–800 nm) are used in accelerating growth. One common commercial grow-lamp has its emission maxima at 450 and 660 nm, with little emission of wavelengths beyond 700 nm. Another common source has high emission in the blue and red, and high emission in the near IR wavelengths. Lamps which emit wavelengths in the range of 500–580 nm are referred to as "safe lights" because their emission is in a low response region and does not significantly affect plant growth, either beneficially or detrimentally.

Light sources used in general lighting are often paired to accomplish similar results to the "grow lights". The output wavelengths from some sources actually retard growth, but this can be compensated for by pairing with other sources. For example, low pressure sodium used alone can inhibit synthesis of chlorophyll but when the low pressure sodium is combined with fluorescent or incandescent lamps, normal photosynthesis occurs. Examples of common pairings of commercial lights used in greenhouses include (i) high pressure sodium and metal halide lamps; (ii) high pressure sodium and mercury lamps; (iii) low pressure sodium and fluorescent and incandescent lamps; and (iv) metal halide and incandescent lamps.

In a greenhouse environment, the color selective films and optical bodies of the present invention, when used alone as color filters or in combination with reflective backings, are useful for concentrating light of the desired wavelengths for optimal plant growth. The films and optical bodies may be used with normal unfiltered solar light, or they may be combined with artificial broadband light sources to control the wavelength of light emitted from the source. Such light sources include, but are not limited to, incandescent lamps, fluorescent lamps such as hot or cold cathode lamps, metal halide lamps, mercury vapor lamps, high and low pressure sodium lamps, solid-state or electroluminescent (EL) lights, or natural or filtered solar light that is optically coupled to the color selective film. Several filtration/concentration systems will be described in more detail that may be used to manage heat in the greenhouse environment, while delivering an increased amount of light at wavelengths optimized for photosynthesis and other plant photoresponses.

Figure 38:
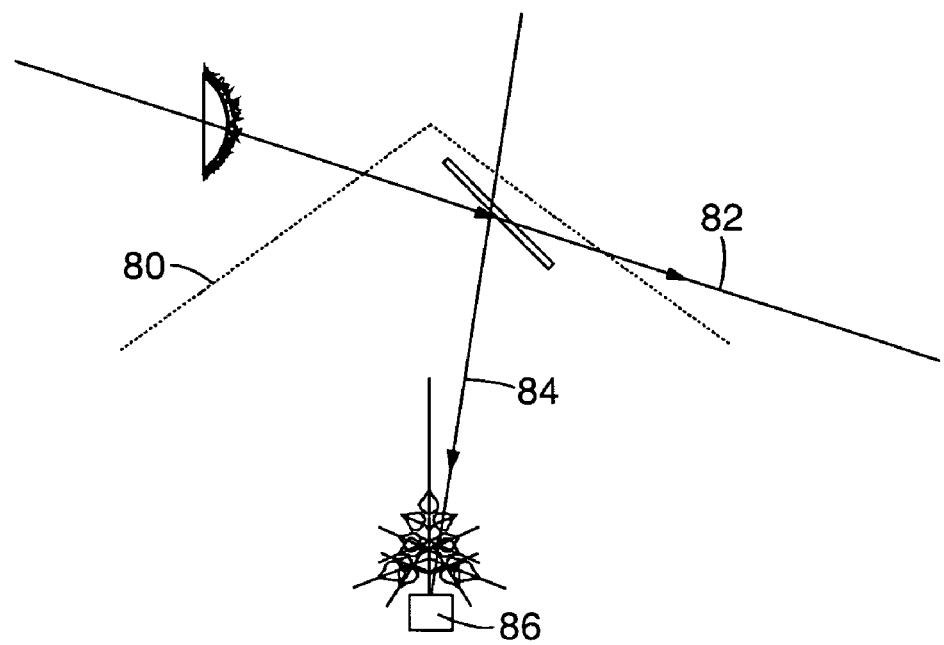
FIG. 38 is a schematic diagram illustrating a magenta reflector (concentrator) horticultural assembly.
Figure 39:
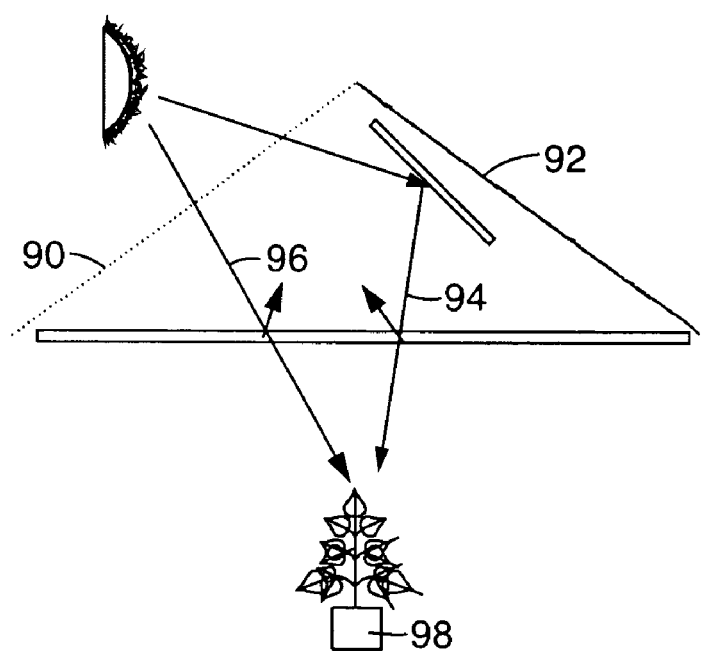
FIG. 39 is a schematic diagram illustrating a green reflector (shade) horticultural assembly.

FIGS. 36 to 39 show useful designs of cold mirrors and color selective mirrors wherein the mirror is used to reflect desired components of solar radiation into a building while passing infrared radiation not useful for plant growth out of the building. The figures also illustrate an alternative strategy of passing the desired radiation and reflecting the undesired components of sunlight. The mirror may be a broadband mirror which reflects essentially all of the solar spectrum of wavelength less than about 800 nm into the building as in FIGS. 36 and 37, or the mirror may spectrally filter out both infrared radiation and components of the visible spectrum that are not desired for plant growth. FIGS. 38 and 39 show constructions in which green light (from about 500–600 nm) and infrared light (from about 800–2000 nm) are transmitted or reflected by the film to exit the building, while magenta light composed of blue light (from about 400–500 nm) and red light (from about 600–800 mm) is reflected or directly transmitted into the building. The film shown would have a bimodal layer thickness distribution to produce the necessary reflective properties (e.g., one set of layers of the film illustrated in FIG. 39 would reflect green wavelengths, and the other set would be a 2 or 3 material IR reflecting/visible transmitting stack design as described in U.S. Pat. No. 6,207,260 (Wheatley et al.) titled "Multicomponent Optical Body". In FIG. 38, one reflectance band of the dual band reflecting film would reflect blue light (400–500 mm) and the other band red light (600–800 nm), at the designed angle of incidence. Depending on the required range of angles, a film designed to function in the mode shown in FIG. 39 could also function in the mode illustrated in FIG. 38. An example of such a film and the approximate required angles is given below. Also in FIG. 38, the color selective film is laminated or supported by a transparent base or open frame so the unwanted wavelengths can pass through. Two different types of systems are illustrated in FIG. 39, where the film can be used alone or in combination with a broadband reflector and the films works to filter both the direct solar light impinging on the film as well as redirected light reflected from the broadband reflector. Other filters can be made in accordance with the present invention which provide wavelengths that promote growth of specific plant parts. For example, a color selective film can be tailored to transmit primarily those wavelengths that promote flower growth rather than stem growth. Selective wavelengths of light can also be used to control plant movement. A common practice in raising plants is to rotate the plant periodically due to the tendency of the plant to move toward the light source (phototropism). Some commercial products address this issue by using light sources that physically rotate around the plant. Films can be made in accordance with the teachings of the present invention which are tailored to filter out the wavelengths used by plant photoreceptors to sense and move toward the light (primarily blue), while allowing other useful wavelengths to pass.

While FIGS. 36 to 39 demonstrate color selective films used with solar light as the radiation source, the color selective films and optical bodies of the present invention can also be used with one or more direct or pre-filtered artificial light sources so as to optimize the spectra afforded by these films even further. In some cases, it may be desirable to wrap or otherwise couple the color selective film directly to the artificial source so that in effect the light source emits primarily the wavelengths desired for controlled plant growth. The color selective film may also be laminated directly to the clear panels which make up the roof and/or walls of a typical greenhouse so that much of the light that enters the building is of the desired spectral composition, or else such panels may be extruded to include one or more color selective multilayer stacks within the panel itself. In order that all of the light entering the building would be of a precise wavelength range, it would be desirable to have the films mounted on a heliostat or other mechanism that moves to compensate for the angle of the sun's ray throughout the day. Simpler mechanisms such as south facing panels with only a weekly or monthly change in the angle from the horizontal or vertical can perform quite well also.

One or more reflectors can also be used to direct the filtered light to desired locations, and it is understood that various physical shapes of the deflector and/or color selective film can be used to aim or spread light across desired portions of the room. In addition to these described modes of use, the film can be used as a filtered wrapping for individual plants, as a reflector placed between plants and soil either in film form or as slit or chopped mulch, or as reflectors and filters for use in aquarium lighting for aquatic plants.

In addition to the previously described spectrally selective films that can be tailored to transmit or reflect infrared and/or green light that is not useful for plant growth, a film designed to control the amount of red light, typically from about 660–680 nm, and the amount of far red light, typically from about 700–740 nm, is especially useful to control plant growth. It has been shown that the ratio of red to far red light should be maintained at a level of 1.1 or higher in order to reduce elongation and force plants to branch or propagate, resulting in thicker, denser plant growth. Additionally, by precisely controlling the red/far red ratio and the sequencing of wavelength exposure, many plants can be forced into a flowering state or held in the vegetative state. Some plant varieties can be controlled with as little as 1 minute of red or far red doping. Plant responses to red and far red light have been described in J. W. Braun, et al., "Distribution of Foliage and Fruit in Association with Light Microclimate in the Red rasberry Canopy, 64(5) Journal of Horticultural Science 565–72 (1989) and in Theo J. Blow, "New Developments in Easter Lilly Height Control" (Hort. Re. Instit. Of Ontario, Vineland Station, Ont. LOR 2EO.

Previous attempts to control the red/far red ratio have utilized light blocking liquids that are pumped into the cavity between panes in greenhouse twin wall constructions. This has not been satisfactory because of the difficulty in adding and removing the liquid. Other attempts have been made to use colored film for the roof glazing, but it is difficult to control if the plant variety in the greenhouse changes frequently or if outdoor weather conditions change. The color selective film of the present invention is ideally suited for this application. The red/far red ratio can be controlled by varying the thickness gradient or by changing the angle of the film to permit the desired wavelengths to reach the plants. To compensate for varying outdoor conditions or varying needs of different plant varieties, the film is preferably positioned within the greenhouse in such a way that it can be either used or stored, for example, by a rolling shade along the roof line which can be drawn down or rolled up, or by a shade cloth pulled horizontally above the plant height. Alternately, individual enclosures of the film can be constructed for separate plants or groups of plants.

The film of the present invention can also be used in conjunction with conventional mirrors to control the intensity of any desired portion of the sunlight spectrum that reaches the plants. Generally, it is desirable to expose plants to a constant level of the wavelengths and intensity of light useful for plant growth throughout the entire day. On a typical sunny day, however, the light level peaks at about noon, and this light level may be excessive for many plants; the leaf temperature often rises, which decreases the plant efficiency. It is preferable to reduce the level of light reaching the plant during mid-day to provide a more uniform level throughout the day. For example, roses flower most efficiently when exposed to a maximum light level of 600 µmol/sec-m², and this level is often achieved by 11:00 am during the winter months at a latitude of 45 degrees. Reducing the light level between 11:00 and 1:00 improves the plant yield. The combined usage of conventional mirrors with our wavelength selective mirrors, as illustrated in FIG. 39, can be used to change the intensity of light directed to plants during different hours of the day. For example, the use of the visible mirror in FIG. 39 can be discontinued during the hours of highest solar incidence by redirecting its angle of reflection to reject that portion of light from the sun. Other combinations of baffles and curtains can also be used with our wavelength selective films to control the intensity of light.

EXAMPLE I6-1

The following example illustrates a color shifting film (in particular, a magenta pass filter) made in accordance with the present invention which is especially suitable for horticultural applications.

A multilayer film containing about 417 layers was made on a sequential flat-film making line via a coextrusion process. This multilayer polymer film was made from PET and Ecdel 9967. A feedblock method (such as that described by U.S. Pat. No. 3,801,429) was used to generate about 209 layers with an approximately linear layer thickness gradient from layer to layer through the extrudate.

The PET, with an Intrinsic Viscosity (IV) of 0.60 dl/g, was delivered to the feedblock by an extruder at a rate of about 34.5 kg/hr and the Ecdel at about 41 kg/hr. After the feedblock, the same PET extruder delivered PET as protective boundary layers (PBL's) to both sides of the extrudate at about 6.8 kg/hr total flow. The material stream then passed though an asymmetric two times multiplier (U.S. Pat. Nos. 5,094,788 and 5,094,793) with a multiplier design ratio of about 1.50. The multiplier ratio is defined as the average layer thickness of layers produced in the major conduit divided by the average layer thickness of layers in the minor conduit. This multiplier ratio was chosen so as to leave a spectral gap between the two reflectance bands created by the two sets of 209 layers. Each set of 209 layers has the approximate layer thickness profile created by the feedblock, with overall thickness scale factors determined by the multiplier and film extrusion rates. The Ecdel melt process equipment was maintained at about 250° C., the PET (optics layers) melt process equipment was maintained at about 265° C., and the feedblock, multiplier, skin-layer meltstream, and die were maintained at about 274° C.

The feedblock used to make the film for this example was designed to give a linear layer thickness distribution with a 1.3:1 ratio of thickest to thinnest layers under isothermal conditions. To achieve a smaller ratio for this example, a thermal profile was applied to the feedblock. The portion of the feedblock making the thinnest layers was heated to 285° C., while the portion making the thickest layers was heated to 265° C. In this manner, the thinnest layers are made thicker than with isothermal feedblock operation, and the thickest layers are made thinner than under isothermal operation. Portions intermediate were set to follow a linear temperature profile between these two extremes. The overall effect is a narrower layer thickness distribution which results in a narrower reflectance spectrum. Some layer thickness errors are introduced by the multipliers, and account for the minor differences in the spectral features of each reflectance band (see FIG. 40). The casting wheel speed was adjusted for precise control of final film thickness, and therefore, final color.

After the multiplier, thick symmetric PBL's (skin layers) were added at about 28 kg/hour (total) that was fed from a third extruder, after which the material stream passed through a film die and onto a water cooled casting wheel. The inlet water temperature on the casting wheel was about 7° C. A high voltage pinning system was used to pin the extrudate to the casting wheel. The pinning wire was about 0.17 mm thick and a voltage of about 5.5 kV was applied. The pinning wire was positioned manually by an operator about 3 to 5 mm from the web at the point of contact to the casting wheel to obtain a smooth appearance to the cast web. The cast web was continuously oriented by conventional sequential length orienter (LO) and tenter equipment. The web was length oriented to a draw ratio of about 3.3 at about 100° C. The film was preheated to about 100° C. in about 26 seconds in the tenter and drawn in the transverse direction to a draw ratio of about 3.5 at a rate of about 16% per second. The finished film had a final thickness of about 0.06 mm.

Figure 40:
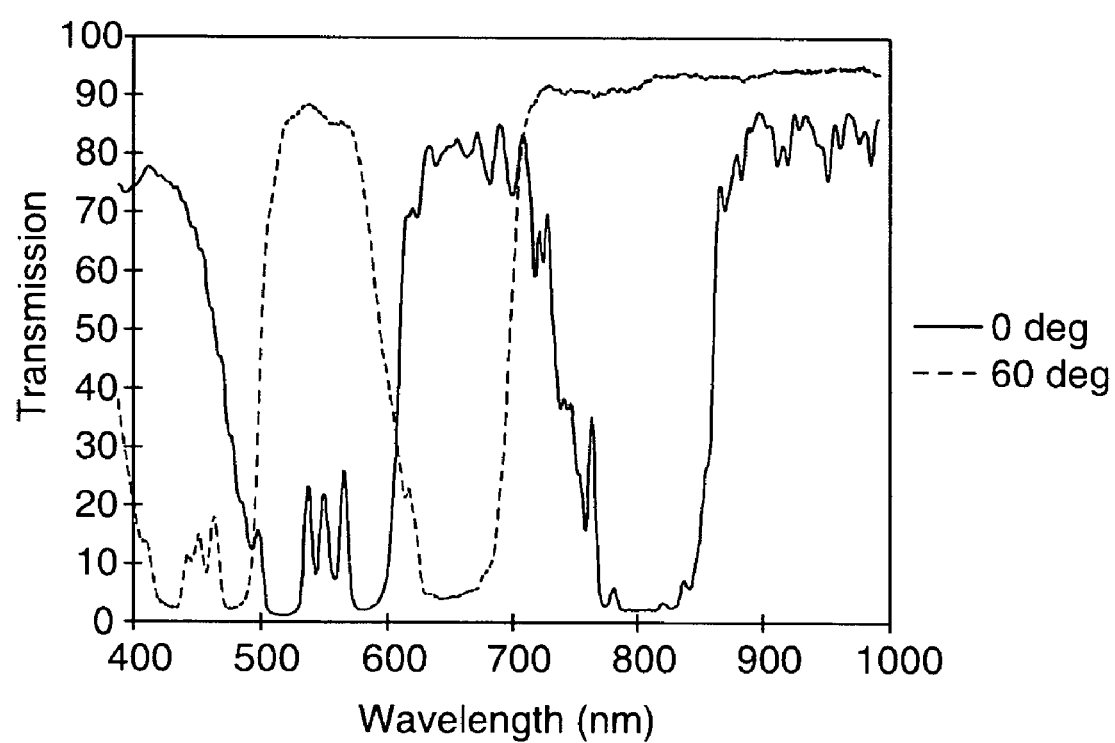
FIG. 40 is a transmission spectrum at normal incidence and at 60° for a horticultural film of the present invention.

The spectrum (at normal incidence) for the finished film is shown in FIG. 40. Note that the spectrum has two extinction bands centered at approximately 550 and 800 nm. The ratio of 800 to 550 is 1.45, which is close to the intended multiplier design of 1.50. Also note that this film has the approximate complementary colors of example E1-2, at all angles of incidence. Improvements on the construction of this film for horticultural applications may be desirable, such as adding more layers to the red reflecting band to broaden its coverage to include the near infrared portion of the spectrum. Optimum performance at both normal incidence and at high angles of incidence may require separate films designed for use at those angles. In addition, UV protection in the form of additional coatings or layers may be desirable.

I7. Spectral Bar Codes for Security Applications

Counterfeiting and forgery of documents and components, and the illegal diversion of controlled materials such as explosives, is a serious and pervasive problem. For example, commercial aircraft maintenance crews regularly encounter suspected counterfeit parts, but lack a reliable means to distinguish between high-grade parts and counterfeit parts that are marked as meeting specifications. Similarly, it is reported that up to ten percent of all laser printer cartridges that are sold as new are actually refurbished cartridges that have been repackaged and represented as new. Identification and tracking of bulk items such as ammonium nitrate fertilizer usable in explosives is also highly desirable, but current means of identification are prohibitively expensive.

Several means exist to verify the authenticity of an item, the integrity of packaging, or to trace the origin of parts, components, and raw materials. Some of these devices are ambient verifiable, some are verifiable with separate lights, instruments, etc., and some combine aspects of both. Examples of devices used for the verification of documents and package integrity include iridescent inks and pigments, special fibers and watermarks, magnetic inks and coatings, fine printings, holograms, and Confirm® imaged retroreflective sheeting available from 3M. Fewer options are available for authentication of components, mostly due to size, cost, and durability constraints. Proposed systems include magnetic films and integrated circuit chips.

Microtaggants have been used to trace controlled materials such as explosives. These materials are typically multilayer polymers that are ground up and dispersed into the product. The individual layers in the microtaggant can be decoded using an optical microscope to yield information pertaining to the date and location of manufacture. There has been a long unmet need for a security film product that is both ambient verifiable and machine readable, that is manufacturable but not easily duplicated, that is flexible and can be used on a variety of part sizes ranging from near microscopic to large sheets, and that may be coded with specific, machine-readable information.

The color selective films and optical bodies of the present invention can be tailored to provide a security film or device useful as a backing, label, or overlaminate that meets all of these needs. The color shifting feature and high reflectivity and color saturation at oblique angles are properties that can be exploited to uniquely identify a document or package, and spectral detail can be designed into the films to provide unique spectral fingerprints that may be used to identify specific lots of security film to code individual applications. The security films and optical bodies can be tailored to reflect over any desired portion of the spectrum, including visible, infrared, or ultraviolet. When only covert identification is desired, a film can be made that appears transparent in the visible region of the spectrum but that has varying transmission and reflections bands in the infrared region to impart a covert spectral fingerprint.

Figure 41:
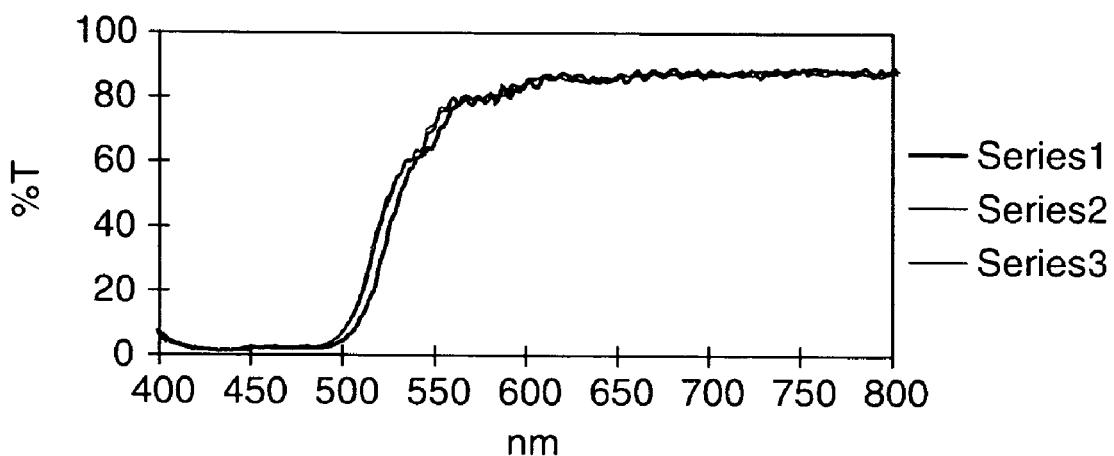
FIG. 41 is a transmission spectrum of a narrow passband polarizer security film made in accordance with the present invention, taken at several points in the crossweb direction.
Figure 42:
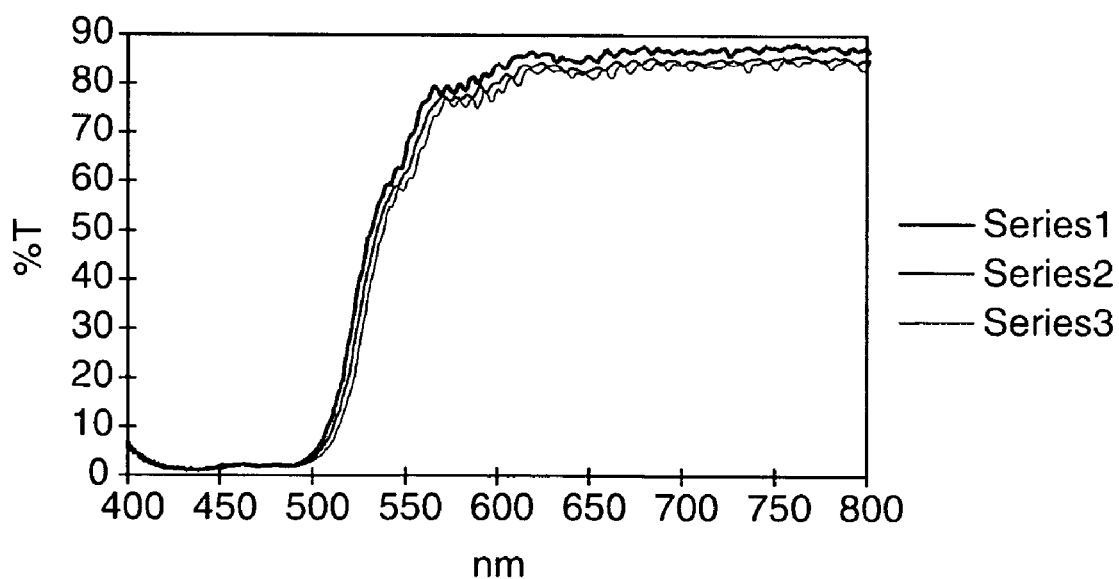
FIG. 42 is a transmission spectrum of a narrow passband polarizer security film made in accordance with the present invention, taken at several points in the crossweb direction.

One example of a colored security film is depicted by the transmission spectrum shown in FIG. 41, which shows the transmission spectrum of a 900 layer PEN:CoPEN polarizer designed to reflect broadband light within one plane of polarization. The blue bandedge is near 400 nm, but could easily be made to be at 500 nm so the article would be a bright blue-colored polarizer, which would shift to gray at oblique angles. The film of FIG. 41 shows a series of very narrow passbands, the major ones near 500 and 620 nm. These features are reproduced in the 3 spectra overlaid in FIG. 41, with each spectra being taken at 3 cm intervals across the web starting at 20 cm from one edge of the film. FIG. 42 shows the spectra for the 20 cm position from the film edge, but this time for two points separated by 4 meters distance in a downweb direction. The passband at 500 nm has a peak transmission of 38%, and a bandwidth of 8 nm. The bandedge slopes are about 5% per nm. The narrower peak at 620 nm has similar bandedge slopes, but the bandwidth is 4 nm, with a peak transmission value of 27%. The two spectra are almost identical. The reproducibility of the spectra shown in FIGS. 41 and 42 indicate a high level of reproducibility of the layer structure, with the location of the 50% bandedge controlled to better than +/−2 nm, or a range of about +/−0.4%.

The width of constant spectral characteristics is on the order of a few cm. The length of film rolls from standard film making equipment can easily exceed one kilometer. Coupled with the width of a few cm of constant spectral characteristics, large areas of film with a unique spectral "fingerprint" can be made as a label with a security code. Such spectra are very difficult to duplicate because of the complexity of equipment design and implementation of process details, including exact resin viscosity and molecular weight.

More complex spectral fingerprints can be designed into the film to provide unique spectral bar-codes by selectively transmitting and reflecting desired wavelengths over a region of interest. Preferred film layer thickness profiles use the gradient design schemes described in U.S. Pat. No. 6,157,490 (Wheatley et al.) titled "Optical Film with Sharpened Bandedge" to provide sharp band-edges which give sharp transitions between reflecting and transmitting regions.

Figure 43:
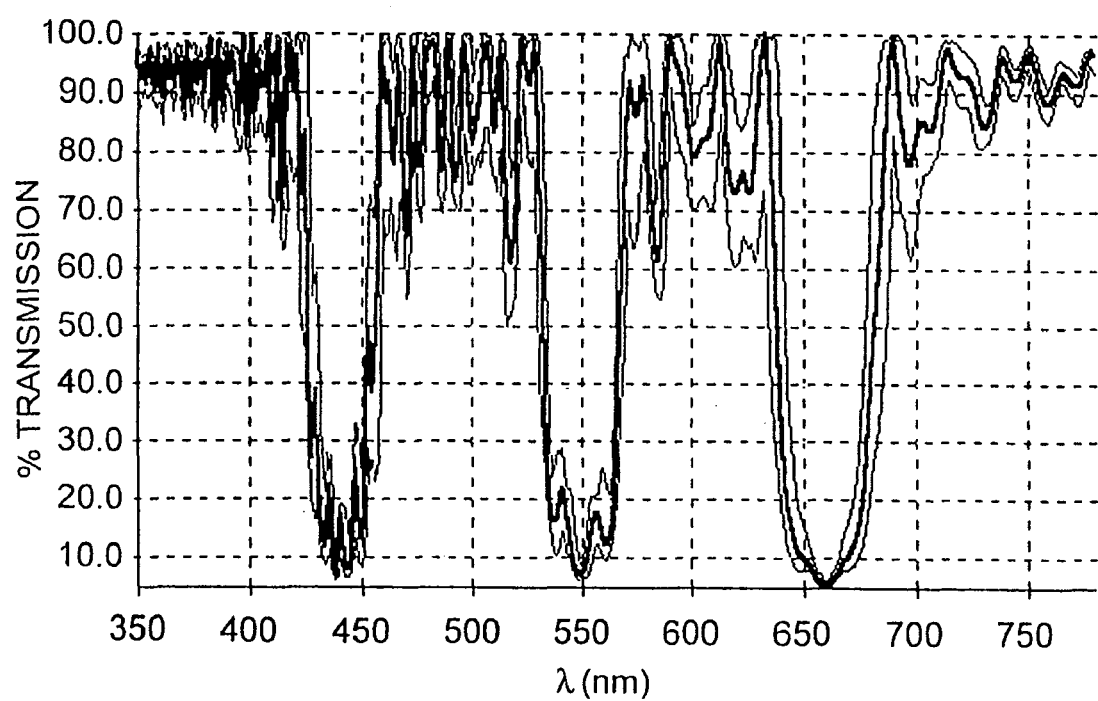
FIG. 43 is a computed transmission spectrum for a PET/co-PEN security film made in accordance with the present invention which consists of three sets of 50 layers.

FIG. 43 shows the computed spectra for a film constructed of three sets of 50 layers of PET and a 1.60 index co-PEN, with each set being either 0.8, 1.0, or 1.2 multiples of a 550 nm design wavelength. The layers in each set of 50 layers has an identical initial optical thickness. The upper and lower curves represent the extreme excursions of the spectra when each layer is varied by a 2% 1-σ standard deviation. This type of film construction is capable of encoding 9 to 10 bits of data over the spectral range of 400 to 1000 nm, which is equivalent to between 512 and 1024 individual codes. Additional codes may generated by varying the intensity of each peak; thus, over one million different codes can be created by using only four different intensity levels.

Figure 44:
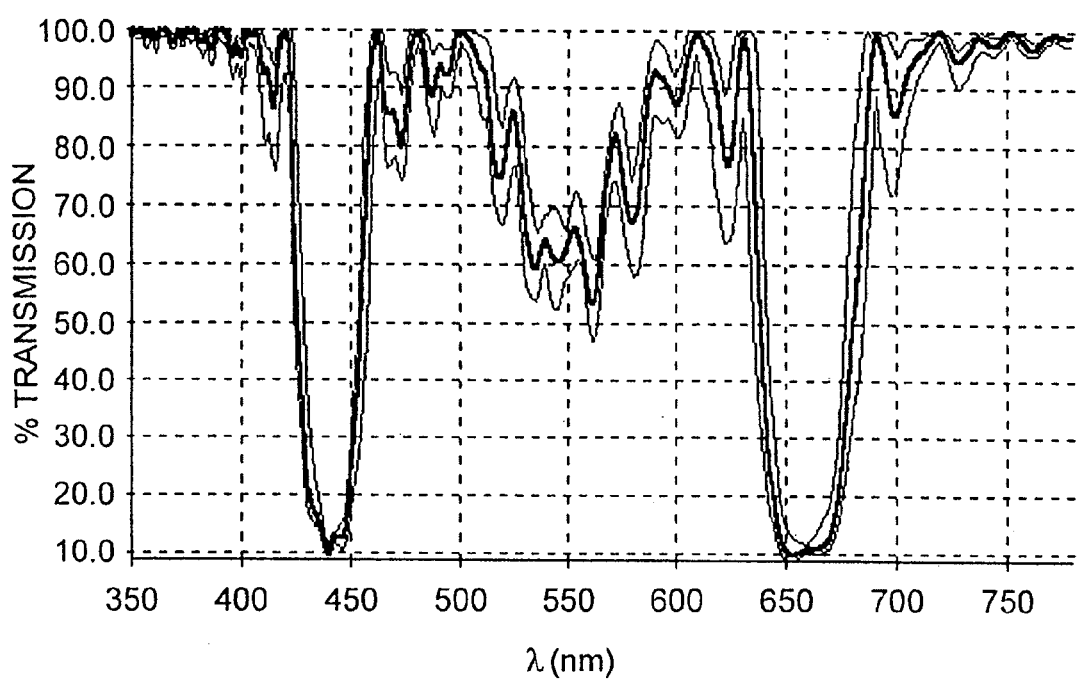
FIG. 44 is a computed transmission spectrum for a PET/co-PEN security film made in accordance with the present invention which consists of two sets of 50 layers and one set of 20 layers.

FIG. 44 shows the spectra as in FIG. 43, except that the packets contain 50, 20, and 50 layers to vary the peak intensities rather than 50, 50, and 50 layers. There is considerable fine structure detail in the spectra of FIGS. 43 and 44, and this detail can be used to specifically identify a particular item. The detail may be achieved by either relying on random variations in the product, or by intentionally varying the thickness of an individual layer or group of layers.

Figure 45:
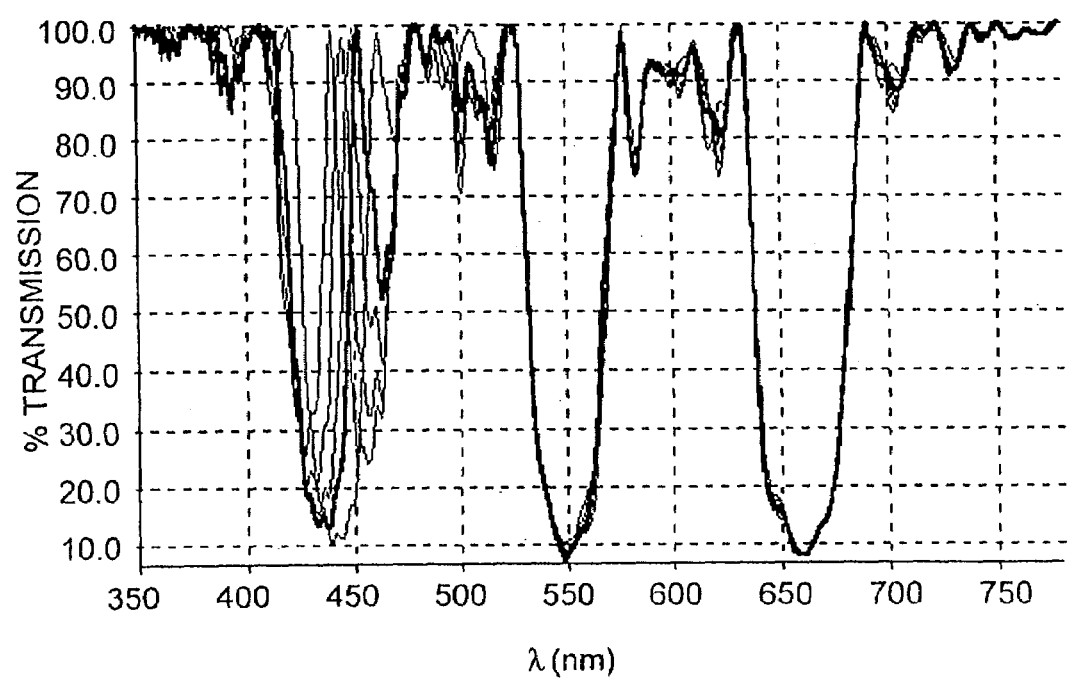
FIG. 45 is a computed transmission spectrum showing the effect of varying layer thickness in the film of FIG. 43.

FIG. 45 shows the potential for individually serializing products with coded films to give a spectral bar-code. The five traces show how the spectrum changes if the system described for FIG. 43 is altered so that layer 25 (CoPEN, nominally 68 nm) is adjusted to be 0 nm, 6.3 nm, 13 nm, 26 nm, and 39 nm, respectively. The reflectivity of the peak at 550 nm is reduced corresponding to the smaller number of layers in that wavelength region. A product may be serialized in this way to the limit of feedblock technology, which has very high potential capability.

Information can also be encoded in the security films and optical bodies of the present invention by several other methods, either alone or in combination with the above described methods of varying the intensity and position of transmission and reflection bands. For example, individual layers may be tuned to the infrared portion of the spectrum, and overtones in the visible region can be controlled to produce unique spectra. The layers would be thicker than those used to produce the spectra of FIG. 44, but there would be fewer layers needed, as more than one overtone can be created from a single stack in the infrared.

The use of extremely high or low f-ratios allows the production of very narrow band reflectors; alternately, reflecting bands can be made narrow by using a smaller refractive index difference between the materials making up the optical stack. The ratio of the optical thickness of the low and high index materials, which determines the f-ratio and the bandwidth of the first order peak, also controls the magnitude of the overtones. This design method can be used to produce narrow higher order harmonics that can be changed by process controls without the need for hardware changes in a feedblock.

As an example of how f-ratios can be varied to give a variety of spectral bar-codes from a single feed block, an infrared stack can be made with the $1^{st}$ order peak placed at 1300 nm so that $2^{nd}$ and $3^{rd}$ order peaks will occur at approximately 650 and 450 nm. If another first order stack is added at 550 nm, three peaks appear in the visible region with varying intensity, depending on the f-ratio chosen during the manufacturing run.

Figure 46:
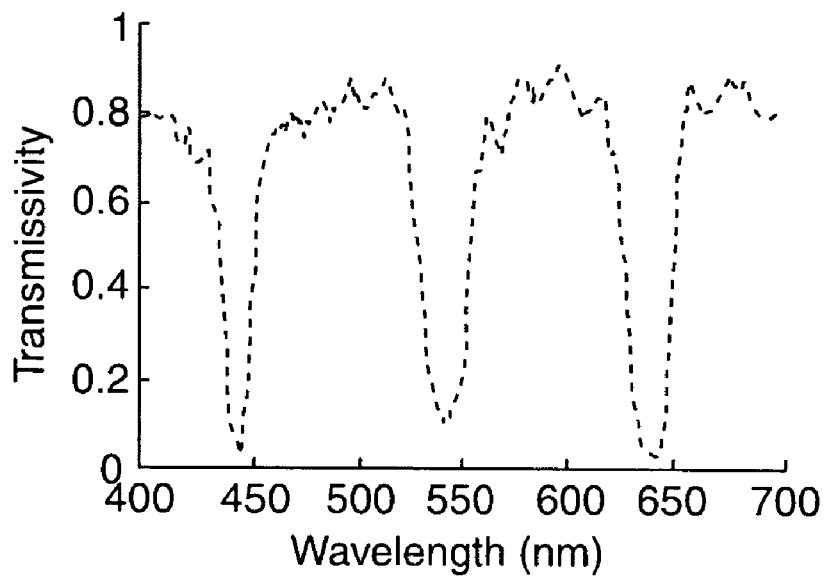
FIG. 46 is a transmission spectrum (spectral bar code) of a multilayer film with an f-ratio of 0.18.
Figure 47:
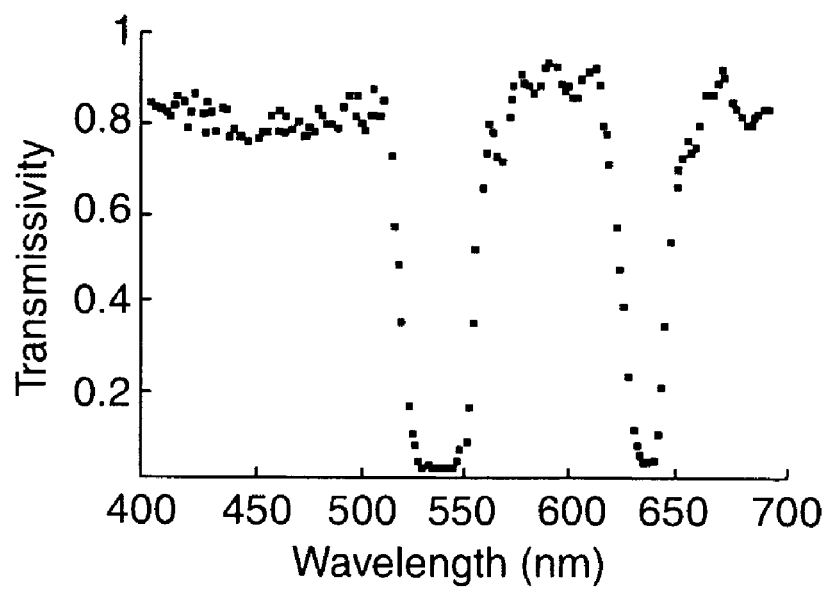
FIG. 47 is a transmission spectrum (spectral bar code) of a multilayer film with at an f-ratio of 0.33.
Figure 48:
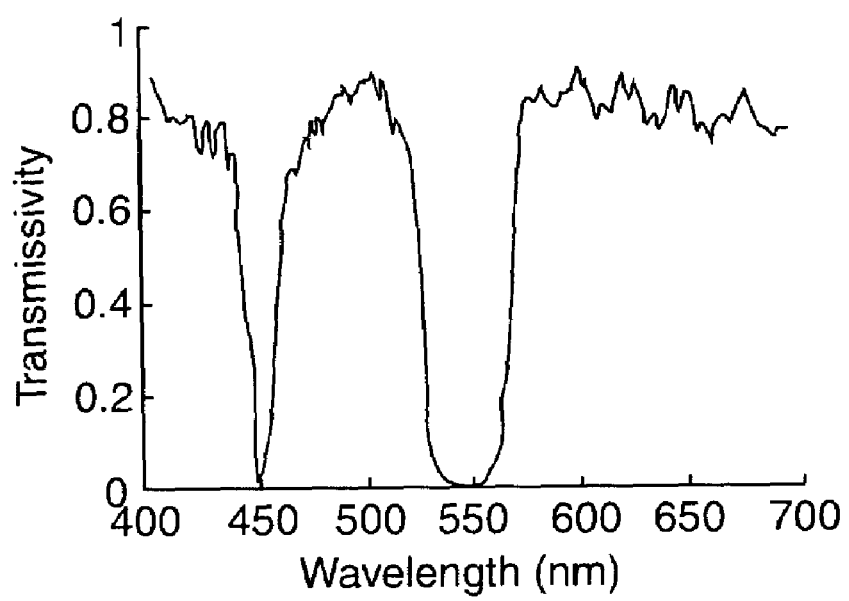
FIG. 48 is a transmission spectrum (spectral bar code) of a multilayer film with an f-ratio of 0.5.
Figure 49:
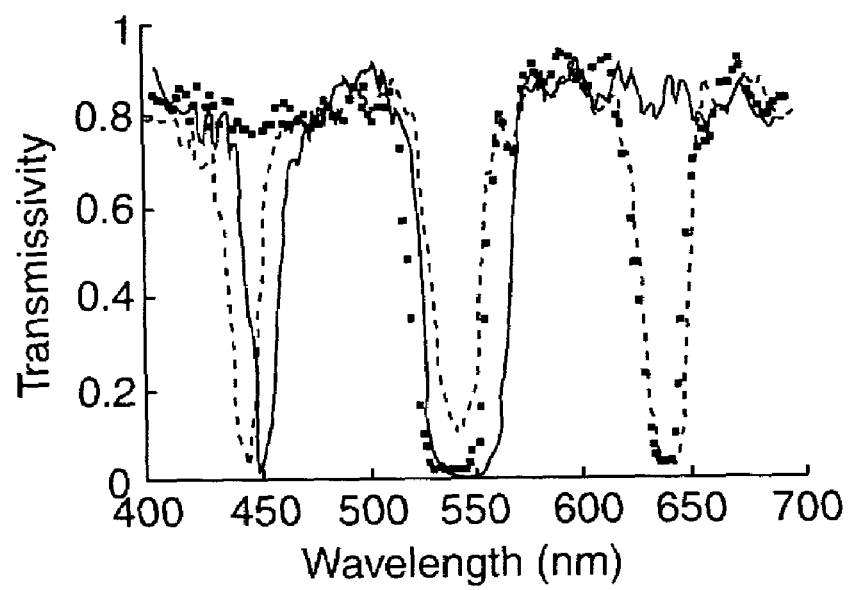
FIG. 49 is a composite graph of FIGS. 46, 47 and 48.

Spectra for f=0.18, 0.33, and 0.5 are shown in FIGS. 46 to 48, respectively, and in the composite graph in FIG. 49. In FIG. 46, with an f-ratio of 0.18, 3 peaks are visible: a $3^{rd}$ order peak at 440 nm, a first order peak at 550, and a second order peak at 640. With an f-ratio of 0.33, it is seen from FIG. 47 that the $3^{rd}$ order peak has disappeared, just as predicted from the graph in FIG. 5, and the first order peak at 550 is stronger. In FIG. 48, two peaks are visible again, but in this case, the second order peak at 640 is absent as expected, and the first order peak at 550 is at its highest reflectivity. As a variation of this scheme, the feedblock can be cut so that one of the stacks has a different f-ratio than the other and the first order peaks of both stacks can be placed in the IR, in which case changes in the high index/low index meltstream flow ratio will have different optical effects on the two stacks and their higher orders.

Another method of providing unique spectral information is to control the oblique angle spectra, as through modification of the z-axis index mismatch. Authenticity may then be verified by using a spectral reader that samples the film at off-normal angles. The multilayer structure can also be combined with one or more ultraviolet, visible, and/or infrared absorbing dyes or polymers on one or both sides of the optical stack, or within the optical stack. In this construction, the appearance of the film can be controlled to reflect at one angle, but not at another due to the absorption of light by the dye. For example, if the film of FIG. 46 is examined at 60 degrees, the low wavelength reflectance band will shift into the portion of the spectrum where PEN is highly absorbing and would not be detectable. A machine reader equipped to measure at two different angles can be used to verify the authenticity of such a film.

The spectrally selective security films and optical bodies of the present invention may also include relatively thick layers either within the optical stack or adjacent to the optical stack, and these layers may also be used to impart information that can be decoded by optical inspection of a cross-section of the film. The films may also be combined with colored printing or graphics printed on a substrate below the film to provide indicia that may be hidden or viewable depending on the angle of observation. Color contrast may be achieved by thinning the optical layers locally. Within this affected region, a new color that also color shifts is evident against the unaffected region. To affect a localized thinning of layers, the preferred method is embossing at temperatures above the glass transition temperatures of all of the polymers in the film and/or with suitable pressure. Localized thinning of layers could also be achieved by bombardment with high energy particles, ultrasonics, thermoforming, laser pulsing and stretching. As with the other color selective films already described, the security film may incorporate a hardcoat, an antireflective surface, or an absorbing coating to improve durability and contrast. The security films may also incorporate a heat activated or pressure sensitive adhesive to function as a label or die-cut.

For most applications, the security films or other optical bodies of the present invention can be appropriately sized and laminated directly to a document or packaging material. The spectral features of these films are typically very narrow to reflect the minimum amount of light. While the spectral features of the film will typically be limited to the infrared so as not to occlude the document or package, the character and color of the film may also be used to enhance the appearance of the article.

For some applications, the security film may be used in a bulk material by grinding the film into a powder and dispersing the powder into the material. Paints, coatings and inks can be formulated from ground up platelets utilizing the films of this invention. In cases where the bulk material may be an explosive, it may be desirable to avoid using oriented material if substantial relaxation would occur during an explosion. Optionally, the multilayer powder may be coated with an ablative material such as an acrylate to absorb energy during an explosive event.

The security films and optical bodies of the present invention may be read by a combination of ambient verification (for example, the presence of a colored, reflective film on an article, possibly combined with identifiable performance an non-normal angles) and instrument verification. A simple machine reader may be constructed using a spectrophotometer. Several low cost spectrophotometers based on CCD detector arrays are available which meet the needs of this invention; preferably, these include a sensor head connected to the spectrophotometer with a fiber optic cable. The spectrophotometer is used to determine the spectral code of the film by measuring light incident on the article at a predetermined angle or angles, which can be normal to the film, at oblique angles, or a combination of both.

In addition to exploiting the optical properties of the films of the present invention for security applications, the mechanical properties of these films can also be utilized. Thus, for example, the films of the present invention can be intentionally designed to have low resistance to interlayer delamination, thereby providing anti-tampering capabilities.

I8. Decorative Applications

As noted elsewhere herein, the color shifting properties of the films of the present invention may be used advantageously in numerous decorative applications. Thus, for example, the films of the present invention may be used, either alone or in combination with other materials, films, substrates, coatings, or treatments, to make wrapping paper, gift paper, gift bags, ribbons, bows, flowers, and other decorative articles. In these applications, the film may be used as is or may be wrinkled, cut, embossed, converted into glitter, or otherwise treated to produce a desired optical effect or to give the film volume.

The preceding description of the present invention is merely illustrative, and is not intended to be limiting. Therefore, the scope of the present invention should be determined solely by reference to the appended claims.

What is claimed is:

1. An article, comprising:
a film comprising alternating polymeric layers configured to selectively reflect and
transmit visible light at a design angle of incidence, the selective reflection comprising a
red reflection band, a green reflection band, and a blue reflection band.

2. The article of claim 1, wherein the blue reflection band is disposed at about 450 nm, the green reflection band is disposed at about 550 nm, and the red reflection band is disposed at about 650 nm.

3. The article of claim 1, wherein the selective reflection for visible light consists essentially of the red, green, and blue reflection bands.

4. The article of claim 1, wherein at least one of the reflection bands is a first-order reflection.

5. The article of claim 4, wherein at least another of the reflection bands is an overtone of a reflection band disposed in the infrared portion of the spectrum.

6. The article of claim 1, wherein the alternating polymeric layers comprise a first, second, and third distinguishable set of such alternating polymeric layers, and wherein the reflection bands correspond respectively to such first, second, and third sets of layers.

7. The article of claim 1, wherein the alternating polymer layers further reflect infrared light in an infrared reflection band at the design angle of incidence.

8. The article of claim 7, wherein at least one of the reflection bands is an overtone of the infrared reflection band.

9. The article of claim 8, wherein two of the reflection bands are overtones of the infrared reflection band.

10. The article of claim 9, wherein the blue reflection band and the red reflection band are overtones of the infrared reflection band.

11. The article of claim 1, wherein the reflection bands have bandwidths of about 50 nm or less.

12. The article of claim 1, wherein the film further comprises a hardcoat.

13. The article of claim 1, wherein the film further comprises an antireflective surface.

14. The article of claim 1, wherein the film further comprises an absorbing coating.

15. The article of claim 1, wherein the film further comprises an adhesive.

16. The article of claim 15, wherein the adhesive is a pressure sensitive adhesive.

17. The article of claim 1, further comprising a substrate that absorbs the wavelengths transmitted by the film.

18. The article of claim 1, wherein the film is a reflective polarizer.

* * * * *

UNITED STATES PATENT AND TRADEMARK OFFICE
CERTIFICATE OF CORRECTION

PATENT NO. : 7,138,173 B2
APPLICATION NO. : 10/952335
DATED : November 21, 2006
INVENTOR(S) : John A. Wheatley It is certified that error appears in the above-identified patent and that said Letters Patent is hereby corrected as shown below:

Column 22
Line 35, Delete "142.86 mm" and insert -- 142.86 nm --, therefor.
Line 35, Delete "166.67 mm." and insert -- 166.67 nm. --, therefor.
Line 38, Delete "run" and insert -- nm --, therefore.
Line 41, Delete "124 mm." and insert -- 124 nm. --, therefor.
Line 58, Delete "$n_{2z}1.50$," and insert -- $n_{2z}=1.50$, --, therefor.
Lines 58-59, Delete "214.29 mm" and insert -- 214.29 nm --, therefor.
Line 59, Delete "83.33 mm," and insert -- 83.33 nm, --, therefor.
Line 60, Delete "967 mm" and insert -- 967 nm --, therefor.
Line 60, Delete "1037 mm" and insert -- 1037 nm --, therefor.
Line 63, Delete "70 mm" and insert -- 70 nm --, therefor.
Line 64, Delete "86 mm." and insert -- 86 nm. --, therefor.

Column 23,
Line 5, Delete "71.43 mm" and insert -- 71.43 nm --, therefor.
Line 7, Delete "1037 mm" and insert -- 1037 nm --, therefor.

Column 28,
Line 3, Delete "2000 mm." and insert -- 2000 nm. --, therefor.

Column 34,
Line 1, Delete "Theological" and insert -- rheological --, therefore.

Column 43,
Line 27, Delete "Theological" and insert -- rheological --, therefore.

Column 45,
Line 1, Delete "To" and insert -- $T_0$ --, therefore.

Column 60,
Line 62, Delete "600," and insert -- 60°, --, therefore.

Column 80,
Line 32, Delete "(II)" and insert -- (III) --, therefore.

UNITED STATES PATENT AND TRADEMARK OFFICE
CERTIFICATE OF CORRECTION

PATENT NO. : 7,138,173 B2
APPLICATION NO. : 10/952335
DATED : November 21, 2006
INVENTOR(S) : John A. Wheatley It is certified that error appears in the above-identified patent and that said Letters Patent is hereby corrected as shown below:

Column 95,
Line 9, Delete "chlorophyll" and insert -- chlorophyl --, therefore.
Line 51, Delete "800 mm)" and insert -- 800 nm) --, therefor.
Line 61, Delete "500 mm)" and insert -- 500 nm) --, therefor.

Signed and Sealed this

Tenth Day of April, 2007

JON W. DUDAS
*Director of the United States Patent and Trademark Office*